United States Patent
Inoue et al.

(10) Patent No.: US 8,792,261 B2
(45) Date of Patent: Jul. 29, 2014

(54) POWER CONVERSION DEVICE

(75) Inventors: Shigenori Inoue, Hitachi (JP); Shuji Katoh, Hitachiota (JP); Jun Narushima, Hitachi (JP); Tetsuya Kato, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 13/202,676

(22) PCT Filed: Feb. 24, 2010

(86) PCT No.: PCT/JP2010/052833
§ 371 (c)(1),
(2), (4) Date: Sep. 14, 2011

(87) PCT Pub. No.: WO2010/116806
PCT Pub. Date: Oct. 14, 2010

(65) Prior Publication Data
US 2012/0026767 A1    Feb. 2, 2012

(30) Foreign Application Priority Data

Mar. 30, 2009 (JP) ................................. 2009-080856
Mar. 31, 2009 (JP) ................................. 2009-083978

(51) Int. Cl.
*H02M 7/17* (2006.01)
(52) U.S. Cl.
USPC ............................................. 363/129; 363/70
(58) Field of Classification Search
USPC .................................. 363/34–37, 69–70, 129
See application file for complete search history.

(56) References Cited

U.S. PATENT DOCUMENTS

| 4,870,558 | A * | 9/1989 | Luce ................................. 363/87 |
| 2005/0083716 | A1 | 4/2005 | Marquardt |
| 2008/0205093 | A1 | 8/2008 | Davies et al. |
| 2009/0262477 | A1 | 10/2009 | Dorn |
| 2010/0321038 | A1 | 12/2010 | Dommaschk et al. |

FOREIGN PATENT DOCUMENTS

| JP | 04-271281 | 9/1992 |
| JP | 11-187576 | 7/1999 |
| JP | 2003-143863 | 5/2003 |
| JP | 2005-528870 | 9/2005 |

(Continued)

OTHER PUBLICATIONS

Hagiwara, Makoto et al; 'PWM Control and Experiment of Modular Multilevel Converters', (in Japanese, with English language Abstract), pp. 957-965; The Institute of Electrical Engineers of Japan, 2008.

(Continued)

*Primary Examiner* — Harry Behm
*Assistant Examiner* — Matthew Grubb
(74) *Attorney, Agent, or Firm* — Antonelli, Terry, Stout & Kraus, LLP.

(57) ABSTRACT

A power conversion device connected with a three-phase power system through a transformer, including unit converters cascade-connected so that reactors are unnecessary, and volume and weight are reduced. The secondary winding of the transformer is an open winding having six terminals. A first converter group, includes a circuit which has three converter arms, which are star-connected, connected to three of the terminals of the secondary winding. A second converter group, having three different converter arms which are star-connected, is connected to three other terminals of the secondary winding. A neutral point (the point where the star connection is made) of the first converter group, and a neutral point of the second converter group are made to be the output terminals of the power conversion device.

11 Claims, 38 Drawing Sheets

(56) References Cited

FOREIGN PATENT DOCUMENTS

| WO | WO 2007/028349 | 3/2007 |
| WO | WO 2008/028435 | 3/2008 |
| WO | WO 2008/067787 | 6/2008 |

OTHER PUBLICATIONS

Ronstrom, Leif et al; 'The Estlink HVDC Light Transmission System', pp. 1-7, Security and Reliability of Electric Power Systems, CIGRE Regional Meeting, Jun. 18-20, 2007, Tallinn, Estonia.
Office Action in JP 2009-080856, dated Oct. 12, 2012 (in Japanese, 4 pgs.).

* cited by examiner

POWER CONVERSION DEVICE

TECHNICAL FIELD

The present invention relates to a power conversion device, and more particularly to the power conversion device interconnected with a three-phase system through a transformer and a DC transmission system using the power conversion system.

BACKGROUND ART

A non-patent document 1 listed below proposes a modular multilevel converter (MMC) by using a switching device (for example, IGBT: Insulated-gate bipolar transistor) capable of ON/OFF control, as a method of a power conversion device which can output a high voltage higher than a breakdown voltage of the switching device.

First, a name of each part of MMC is defined in order to explain a circuit configuration of MMC.

In MMC, a bidirectional chopper circuit shown in FIG. 4 forms a unit converter.

Each unit converter is connected to an external circuit through at least two terminals. In the present embodiment, the two terminals are called an x-terminal and a y-terminal, respectively. In addition, a voltage of the x-terminal against a standard voltage of the y-terminal is called a cell voltage.

If a voltage of an energy storage device 405 of the bidirectional chopper circuit shown in FIG. 4 is denoted by VC, an available value of the cell voltage is two, VC and zero.

In the embodiment, a circuit that cascade-connects the x-terminal and the y-terminal of one or a plurality of the unit converters is called a converter arm.

Each converter arm has at least two terminals. In the embodiment, the two terminals are called a a-terminal and a b-terminal, respectively. In addition, a voltage of the a-terminal against a standard voltage of the b-terminal is called an arm voltage. The arm voltage is a sum of cell voltages of unit converters included in the converter arm.

Since the arm voltage is the sum of cell voltages, the arm voltage becomes multiples of a voltage VC of an energy storage device provided in each cell.

In the embodiment, a circuit where one terminal of a first reactor is connected in series to the b-terminal of a first converter arm, one terminal of a second reactor is connected in series to the other terminal of the first reactor, and the a-terminal of a second converter arm is connected in series to the other terminal of the second reactor, is called a leg.

The a-terminal of the first converter arm is called a P-terminal, a connection point of the two reactors is called a M-terminal of the leg, and the b-terminal of the second converter arm is called a N-terminal of the leg. Therefore, each leg has at least three terminals that are the P-terminal, M-terminal and the N-terminal. In addition, in the embodiment, a sum of arm voltages of the two converter arms included in the leg is called a leg voltage.

Since the leg voltage is a sum of arm voltages, the leg voltage also becomes multiples of the voltage VC of the energy storage device provided in each cell.

Next, an explanation will be given of a circuit configuration of MMC. Here, as an example, a three-phase MMC will be described.

The P-terminals of three legs are connected to each other and one terminal is drawn out from the connection point, similarly, the N-terminals of the three legs are connected to each other and the other terminal is drawn out from the connection point, then, a three-phase MMC can be configured. In the embodiment, the drawn out terminal from the three P-terminals connected to each other is called a positive output terminal of MMC and the drawn out terminal from the three N-terminals connected to each other is called a negative output terminal of MMC.

A DC load can be connected between the positive output terminal and the negative output terminal of MMC.

A three-phase power system can be connected to three M-terminals of the three legs. In the embodiment, the three M-terminals of the three legs are generally called a three-phase terminal.

Hereinafter, a brief explanation will be given of an operation of MMC. It is assumed that the three-phase terminal is interconnected with a three-phase power system through a transformer or an interconnection reactor.

Voltages among three-phase terminals can be controlled by controlling an arm voltage of each converter arm configuring the MMC.

For example, if a system frequency component of a voltage among the three-phase terminals is controlled to be identical to a frequency and amplitude of a system line voltage and only a phase thereof is slightly delayed in comparison with that of the system line voltage, an active power flows into the three-phase MMC from the power system.

In addition, if a system frequency component of a voltage among the three-phase terminals is controlled to be identical to a frequency and amplitude of a system line voltage and only a phase thereof is slightly advanced in comparison with that of the system line voltage, an active power flows into the power system from the three-phase MMC.

If a system frequency component of a voltage among the three-phase terminals is controlled to be identical to a frequency and phase of a system line voltage and only an amplitude thereof is slightly increased in comparison with that of the system line voltage, an advanced reactive power is generated between the three-phase MMC and the power system.

If a system frequency component of a voltage among the three-phase terminals is controlled to be identical to a frequency and phase of a system line voltage and only an amplitude thereof is slightly decreased in comparison with that of the system line voltage, a delayed reactive power is generated between the three-phase MMC and the power system.

However, there are two problems in MMC described later.

The first problem is that a reactor is required for each leg.

In the three-phase MMC, if an energy storage device included in each unit converter is an ideal DC voltage source and if voltages of all ideal DC voltage sources are equal to each other, leg voltages of three legs can be matched by properly controlling a switching timing of each unit converter.

However, in the actual MMC, an electrolytic capacitor or a battery is used as the energy storage device.

Since each unit converter operates as a single phase converter, an instantaneous power flowing into/out from the each unit converter has a double frequency pulsating component of a frequency of power system connected to the three-phase terminals or of a frequency of a three-phase load.

In addition, since MMC transmits and receives a DC power to and from a DC load which is connected between a positive output terminal and a negative output terminal, an instantaneous power flowing into/out from each unit converter also has a pulsating power component accompanying the transmission and reception of the electric power to and from the DC load.

Therefore, a voltage between both ends of an energy storage device (for example, an electrolytic capacitor or battery)

included in each unit converter is pulsating, and an instantaneous value of the pulsating component is different for each leg.

As described above, a leg voltage is multiples of the voltage VC of the energy storage device included in the leg.

When the voltage VC of the energy storage device is different for each leg, it is impossible to always and completely match leg voltages of three legs even if a switching timing of the unit converter is properly controlled.

During a period that the leg voltages of the three legs are not matched, a difference among the leg voltages is absorbed by only two reactors included in each leg.

When an inductance of the two reactors included in each leg is zero, the difference among the leg voltages is absorbed by only a wiring that connects among legs during the period. Since an impedance of the wiring is small, an overcurrent flows into the three legs.

Therefore, a reactor is essential for each leg in order to control the overcurrent.

The second problem is that the reactor becomes large when MMC transmits a DC power to a DC load.

When MMC transmits a DC power to a DC load, it is required to apply a zero-phase DC current to a converter arm of each phase and a reactor. Therefore, a current that the zero-phase DC current is superimposed on a normal-phase/reverse-phase current flows in the reactor.

In this case, a maximum current value becomes large in comparison with the case that only the normal-phase/reverse-phase current flows in the reactor. In order to prevent a magnetic saturation even in the maximum current value, an increase of iron core cross section of the reactor is required, and thereby the reactor becomes large.

In addition, a non-patent document 2 discloses an illustration of DC transmission system shown in FIG. 35 with one line.

The DC transmission system of FIG. 35 includes three-phase AC power systems 3100, 3170, a breaker 3124 that is disposed in order to disconnect a DC transmission system 3800 from the three-phase AC power systems 3100, 3170, a conversion transformer 3805 that transforms an AC voltage, a three-phase full-bridge power conversion device 3801 that uses a plurality of semiconductor switching devices, and capacitors 3802, 3803 that are connected in parallel with the three-phase full-bridge power conversion device 3801, and a neutral point 3806 that is connected to the capacitors 3802, 3803 is grounded. In addition, the DC transmission system includes a DC transmission cable 3807 and a DC reactor 3804 that is connected to the power conversion device 3801 and the DC transmission cable 3807 in series.

Generally, a DC transmission system transmits electric power from a three-phase AC power system to another three-phase AC power system.

PRIOR ART DOCUMENT

Non-Patent Document

[Non-Patent Document 1]
Makoto Hagiwara, Hirofumi Akagi, "PWM Control and Experiment of Modular Multilevel Converters", IEEJ Trans. IA, Vol. 128, No. 7, PP.957-965 (2008)
[Non-Patent Document 2]
L Ronstrom, M L Hoffstein, R Pajo, M Lahtinen "The Estlink HVDC Light Transmission System" SECURITY AND RELIABILITY OF ELECTRIC POWER SYSTEMS, CIGRE Regional Meeting, Jun. 18-20, 2007, Tallinn, Estonia, 21, rue d'Artois, F-75008 PARIS

SUMMARY OF THE INVENTION

Problems to be Solved by the Invention

When various kinds of power conversion devices are interconnected with a special high-voltage system, generally, a transformer is disposed in order to increase/decrease a voltage and to secure an electric insulation.

With respect to a power conversion device that is interconnected with an electric power system through a transformer and configured by cascade-connecting unit converters, it is an object of the present invention to provide the power conversion device that can eliminate a reactor and can reduce in volume and weight.

In addition, in a DC transmission system shown in FIG. 35, a short-circuiting in a DC zone (hereinafter, referred to as DC line) that connects between DC output terminals of respective three-phase full-bridge power conversion devices 3801, which configure the DC transmission system 3800 and located on both sides thereof, will be explained, that is, for example, the short-circuiting at a connection point 3901 between a DC reactor 3804 and a DC transmission cable 3807 will be explained, using FIG. 36.

If the connection points 3901 are short-circuited, charges of capacitors 3802, 3803 are discharged, and an excessive current flows transiently in the DC transmission cable 3807. Therefore, there is a possibility that the DC transmission cable 3807 is burn out. The discharge paths are a path of capacitor 3802-DC reactor 3804-connection point 3901-DC reactor 3804-capacitor 3083 and a path of capacitor 3802-DC reactor 3804-DC transmission cable 3807-connection point 3901-DC transmission cable 3807-DC reactor 3804-capacitor 3083.

The discharge current is suppressed by the DC reactor 3804. However, in order to increase the suppression effect, an increase of inductance of the DC reactor is required, thereby resulting in large size and heavy weight.

In a DC transmission system that converts AC power to DC power once and transmits it from one AC system to the other AC system, the present invention provides a power conversion device and a DC transmission system having a function that prevents an overcurrent when charges are discharged from a DC capacitor (energy storage device) to a DC line.

Means for Solving the Problem

In order to achieve the foregoing purposes, according to the present invention, there is provided a power conversion device comprising a series circuit of a voltage source and a controlled current source, in which at least two series circuits of the voltage source and the controlled current source are connected in parallel, and parallel connection points of the series circuits connected in parallel form output terminals.

In addition, in order to achieve the foregoing purposes, according to the present invention, there is provided a power conversion device configured by connecting a circuit that star-connects three controlled current sources to respective phases of a three-phase voltage source from which a neutral point of the three-phase voltage source is drawn out, in which a neutral point of the three controlled current sources and the neutral point of the three-phase voltage source form output terminals.

Furthermore, according to the present invention, there is provided a power conversion device, in which the voltage source contains only a differential mode (or normal phase/reverse phase) component, and the controlled current source transmits and receives electric power to and from the voltage source by controlling the differential mode (or normal phase/reverse phase) component and transmits and receives electric power to and from a load device connected to the output terminals or a power source by controlling a common mode (or zero-phase) component.

In addition, in order to achieve the foregoing purposes, according to the present invention, there is provided a power conversion device comprising a single-phase or multiphase transformer and a converter arm, in which in the power conversion device, each phase of a primary winding of the single-phase or multiphase transformer forms an input terminal; a neutral point is drawn out from a secondary winding of the single-phase or multiphase transformer; series circuits of the secondary winding of the transformer and the converter arm are connected in parallel; and a parallel connection point of the series circuits and the neutral point of the secondary winding form output terminals.

In addition, in order to achieve the foregoing purposes, according to the present invention, there is provided a power conversion device configured by connecting a three-phase transformer, where a neutral point is drawn out from a secondary winding of the three-phase transformer, and a circuit that star-connects three converter arms to respective phases of the secondary winding, in which each phase of a primary winding of the three-phase transformer forms an input terminal, and a neutral point of the three converter arms and the neutral point of the secondary winding form output terminals.

In addition, in order to achieve the foregoing purposes, according to the present invention, there is provided a power conversion device interconnected with a three-phase power system through a transformer, in which a primary winding of the transformer is connected to the three-phase power system; a secondary winding of the transformer forms an open winding having six terminals; a first converter group consisting of a circuit that star-connects three converter arms is connected to a first to a third terminals of the secondary winding; a second converter group consisting of a circuit that star-connects other three converter arms is connected to a fourth to a sixth terminals of the secondary winding; and a neutral point of the first converter group and a neutral point of the second converter group form output terminals of the power conversion device.

In addition, in order to achieve the foregoing purposes, according to the present invention, there is provided a power conversion device interconnected with a three-phase power system through a transformer, in which a primary winding of the transformer is connected to the three-phase power system; a neutral point of a secondary winding of the transformer is drawn out, forming four terminals; a circuit that star-connects three converter arms is connected to respective phases of the secondary winding other than the neutral point; and a neutral point of the three converter arms and the neutral point of the secondary winding form output terminals of the power conversion device.

Furthermore, according to the present invention, there is provided a power conversion device, in which the converter arm transmits and receives an electric power to and from a single-phase or multiphase power system connected to the primary winding of the transformer by controlling a differential mode (normal phase/reverse phase) current, and transmits and receives an electric power to and from a load device connected to the output terminal or a power source by controlling a common mode (zero-phase) component.

Furthermore, according to the present invention, there is provided a power conversion device, in which the transformer comprises a method that makes a magnetomotive force caused by a common mode (zero-phase) current flowing in the secondary winding be substantially zero.

Furthermore, according to the present invention, there is provided a power conversion device, in which the primary winding and the secondary winding are exchanged with each other.

According to a power conversion device of the present invention, since an exciting inductance and a leakage inductance of the transformer combine the role of the reactor in MMC of Non-patent document 1, the reactor is unnecessary in the present invention, thereby resulting in reduction in size and weight of the power conversion device.

In addition, in order to achieve the foregoing purposes, according to the present invention, there is provided a power conversion device having a function to convert AC power of an AC system to DC power, in which when a DC line, where the DC power flows, is short-circuited, a current flowing in the DC line is controlled by electrically insulating a DC voltage of an energy storage device of the power conversion device from the DC line.

In addition, in order to achieve the foregoing purposes, according to the present invention, there is provided a power conversion device comprising a transformer, a first converter group consisting of a circuit that star-connects three converter arms and a second converter group consisting of a circuit that star-connects other three converter arms, in which a primary winding of the transformer is connected to a three-phase AC power system; a winding structure or a method that makes a magnetomotive force caused by a common mode (zero-phase) current flowing in the secondary winding be substantially zero is provided and the secondary winding of the transformer forms an open winding having six terminals; the first converter group consisting of the circuit that star-connects the three converter arms is connected to a first to a third terminals of the secondary winding; the second converter group consisting of the circuit that star-connects the other three converter arms is connected to a fourth to a sixth terminals of the secondary winding; and a neutral point (star-connected point) of the first converter group and a neutral point (star-connected point) of the second converter group form output terminals of the power conversion device, and the converter arm has a configuration that cascade-connects one or a plurality of unit chopper cells, and when a DC line of the power conversion device is short-circuited, a low-side switching device constituting the unit chopper cell is turned ON and a high-side switching device constituting the unit chopper cell is turned OFF, in order to control a current flowing in the DC line.

In addition, in order to achieve the foregoing purposes, according to the present invention, there is provided a power conversion device comprising a transformer, a first converter group consisting of a circuit that star-connects three converter arms and a second converter group consisting of a circuit that star-connects other three converter arms, in which a primary winding of the transformer is connected to a three-phase AC power system; a method that makes a magnetomotive force caused by a common mode (zero-phase) current flowing in a secondary winding be substantially zero is provided and the secondary winding of the transformer forms an open winding having six terminals; the first converter group consisting of the circuit that star-connects the three converter arms is connected to a first to a third terminals of the secondary winding; the second converter group consisting of the circuit that star-connects the other three converter arms is connected to a fourth to a sixth terminals of the secondary winding; and a neutral point (star-connected point) of the first converter group and a neutral point (star-connected point) of the second converter group form output terminals of the power conversion device, and the converter arm has a configuration that cascade-connects one or a plurality of unit full-bridge cells, and when a DC line of the power conversion device is short-circuited, two low-side switching devices constituting the unit full-bridge cell are turned ON and two high-side switching devices constituting the unit full-bridge cell are turned OFF, or the two low-side switching devices are turned OFF and the two high-side switching devices are turned ON, in order to control a current flowing in the DC line.

Furthermore, according to the present invention, there is provided a power conversion device that sets a leakage impedance of the transformer so that when a DC line of the power conversion device is short-circuited, a short-circuit current flowing into the DC line from a three-phase AC power system becomes smaller than a saturation current of a switching device constituting the power conversion device during a time until the power conversion device is disconnected from the three-phase AC power system.

Furthermore, according to the present invention, there is provided a power conversion device that disposes a cooling system of the switching device so that when a DC line of the power conversion device is short-circuited, a junction temperature of the switching device constituting the power conversion device does not exceed a predetermined value by a short-circuit current flowing into from the three-phase AC power system during a time until the power conversion device is disconnected from the three-phase AC power system.

Furthermore, according to the present invention, there is provided a power conversion device, in which when the DC line of the power conversion device is short-circuited, the power conversion device has a function to make a sum of voltages of the first converter group and the second converter group be substantially equal to a voltage having a reverse phase of a voltage of the three-phase AC power system.

In addition, in order to achieve the foregoing purposes, according to the present invention, there is provided a power conversion device connected to an AC power system and comprising a positive converter group, a negative converter group, a positive reactor group and a negative reactor group, in which one end of the positive converter group forms a positive DC output terminal; the other end of the positive converter group is connected in series to one end of the positive reactor group; the other end of the positive reactor group is connected in series to one end of the negative reactor group; the other end of the negative reactor group is connected in series to one end of the negative converter group; and the other end of the negative converter group forms a negative DC output terminal, and a converter arm of the power conversion device has a configuration that cascade-connects one or a plurality of unit chopper cells and when a DC line of the power conversion device is short-circuited, a low-side switching device constituting the unit chopper cell is turned ON and a high-side switching device constituting the unit chopper cell is turned OFF, in order to control a current flowing in the DC line.

In addition, in order to achieve the foregoing purposes, according to the present invention, there is provided a power conversion device connected to an AC power system and comprising a positive converter group, a negative converter group, a positive reactor group and a negative reactor group, in which one end of the positive converter group forms a positive DC output terminal; the other end of the positive converter group is connected in series to one end of the positive reactor group; the other end of the positive reactor group is connected in series to one end of the negative reactor group; the other end of the negative reactor group is connected in series to one end of the negative converter group; and the other end of the negative converter group forms a negative DC output terminal, and a converter arm of the power conversion device has a configuration that cascade-connects one or a plurality of unit full-bridge cells, and when a DC line of the power conversion device is short-circuited, two low-side switching devices constituting the unit full-bridge cell are turned ON and two high-side switching devices constituting the unit full-bridge cell are turned OFF, or the two low-side switching devices are turned OFF and the two high-side switching devices are turned ON, in order to control a current flowing in the DC line.

Furthermore, according to the present invention, there is provided a power conversion device which is connected to a three-phase AC power system.

Furthermore, according to the present invention, there is provided a power conversion device, in which a short-circuiting of an AC output terminal and a short-circuiting of the DC line are distinctly detected.

Furthermore, according to the present invention, there is provided a power conversion device which includes a current detector in the DC line of the power conversion device and has a function to determine a short-circuiting of the DC line if a current value detected by the current detector exceeds a predetermined threshold value.

Furthermore, according to the present invention, there is provided a power conversion device which has a function to distinctly detect the short-circuiting of the AC output terminal of the power conversion device and the short-circuiting of the DC line, and includes a current detector for detecting a current status of a converter arm of the power conversion device, in which the short-circuiting of the DC line is determined if a sum of currents of the converter arms for three phases exceeds a predetermined threshold value.

Furthermore, according to the present invention, there is provided a power conversion device, in which the short-circuiting of the AC output terminal of the power conversion device is determined based on a fact that a current detected by the current detector set in a primary side or secondary side of a transformer exceeds a predetermined threshold value.

Furthermore, according to the present invention, there is provided a power conversion device, in which the short-circuiting of the AC output terminal of the power conversion device is determined based on a fact that a difference between current values detected by a current detector set in a converter arm of the positive converter group of the power conversion device and the current detector set in the converter arm of the negative converter group of the power conversion device exceeds a predetermined threshold value.

Effects of the Present Invention

According to the present invention, there is provided a power conversion device which can eliminate a reactor and is reduced in size and weight.

In addition, in the power conversion device of the present invention, a zero-phase DC current flows in the secondary winding of the transformer when the power conversion device transmits and receives active power to and from a power system. However, since a magnetomotive force to be caused by the zero-phase DC current becomes zero, a magnetic flux does not generated.

In addition, according to the power conversion device and DC transmission system of the present invention, electric charges of the energy storage device of the power conversion device are not discharged when the DC line is short-circuited, and an overcurrent does not flow in the DC transmission cable, accordingly.

EMBODIMENTS OF THE INVENTION

Figure 1:
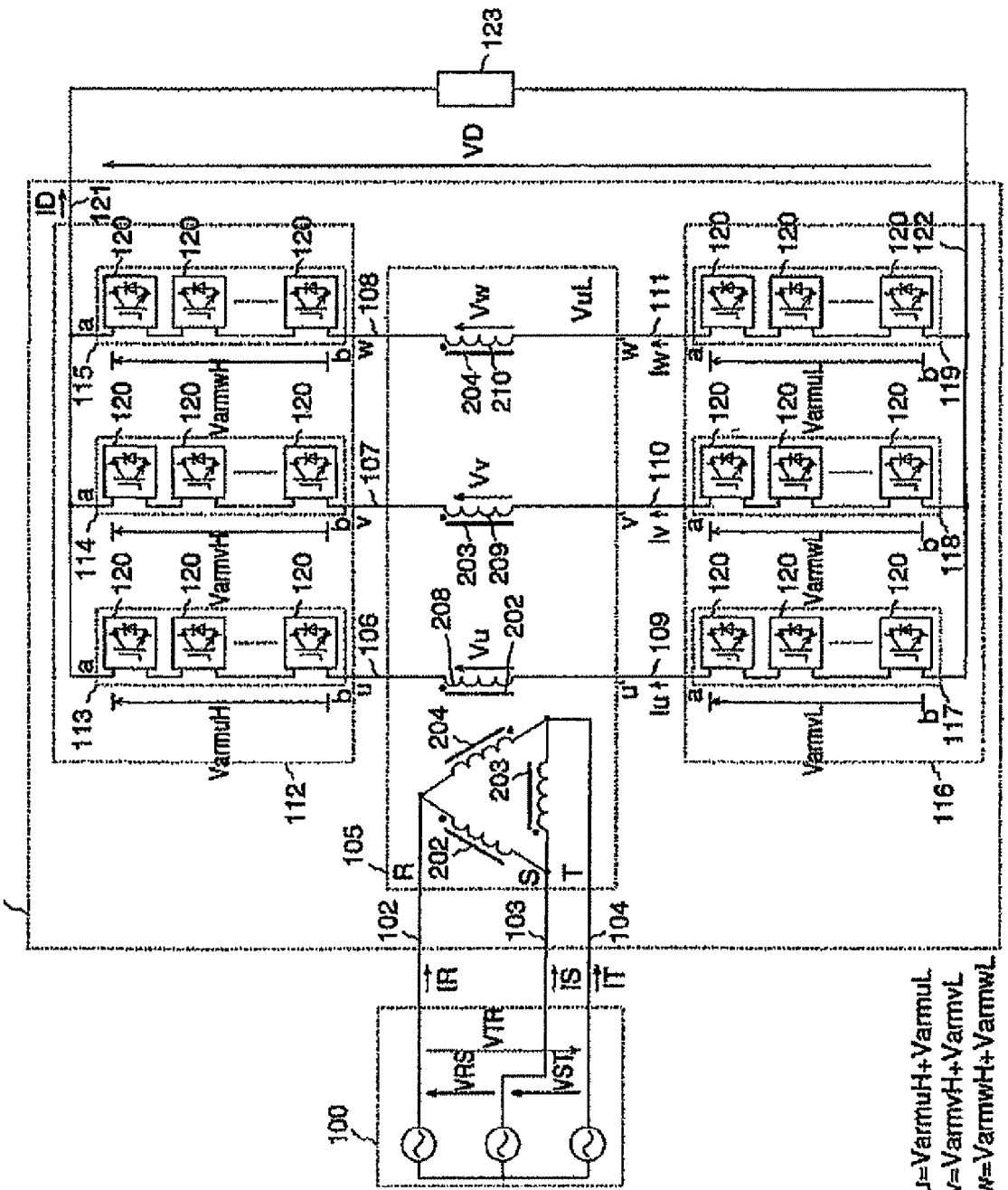
FIG. 1 is a circuit diagram showing a first embodiment of the present invention.

Hereinafter, explanations for embodiments of the present invention will be given using drawings.

<First Embodiment>

An explanation will given of a first embodiment embodying the present invention.

A configuration of a power conversion device 101 according to the present invention will be explained using FIG. 1.

The power conversion device 101 consists of a transformer 105, a positive converter group 112 and a negative converter group 116.

In the present embodiment, each phase of a three-phase power system 100 is called an R-phase, an S-phase and a T-phase. In addition, line voltages are denoted by VRS, VST and VTR, respectively. Furthermore, a current flowing in each phase of the three-phase power system 100 is called a system current and denoted by IR, IS and IT.

Next, a configuration of the transformer 105 will be explained using FIG. 1 and FIG. 2.

The transformer 105 includes nine terminals in total that are an R-phase terminal 102, an S-phase terminal 103, a T-phase terminal 104, a u-phase positive terminal 106, a v-phase positive terminal 107, a w-phase positive terminal 108, a u-phase negative terminal 109, a v-phase negative terminal 110 and a w-phase negative terminal 111.

Figure 2:
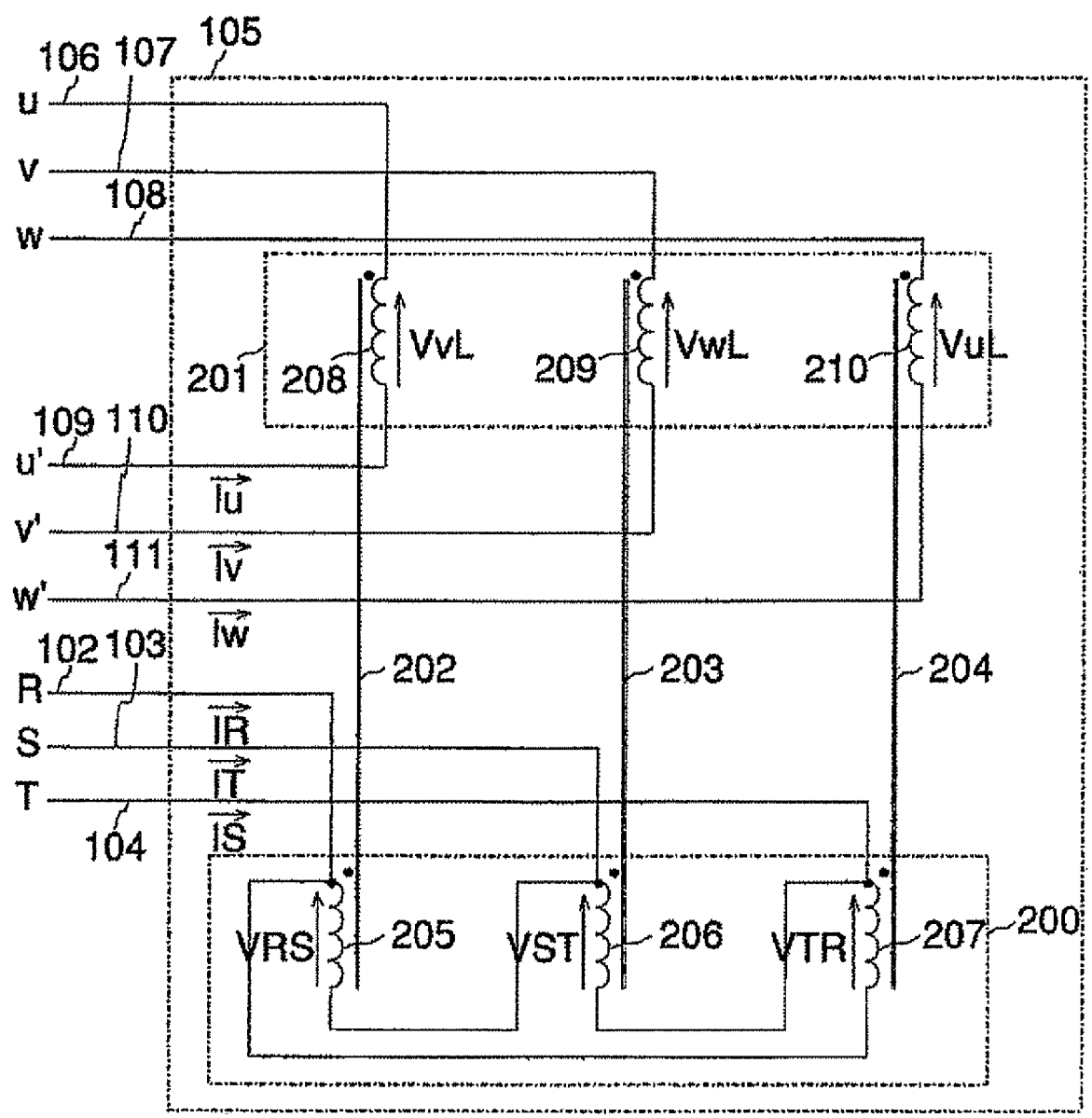
FIG. 2 is a transformer in the first embodiment of the present invention.

FIG. 2 shows a polarity of a magnetomotive force that is generated in each iron core by each winding of the transformer 105, and a wire connection of the each winding. The transformer 105 includes iron cores 202 to 204, and these iron cores 202 to 204 configure a three-legged core. A primary winding 200 is delta-connected, and windings 205, 206 and 207 each corresponding to a winding between the R-phase and the S-phase, between the S-phase and the T-phase, and between the T-phase and the R-phase are wound on iron cores 202, 203 and 204, respectively. The number of winding of each of the windings 205 to 207 is substantially the same.

A secondary winding 201 includes a u-phase winding 209, a v-phase winding 209 and a w-phase winding 210. The number of winding of each of the windings 208 to 210 is substantially the same.

In the first embodiment, a voltage between both ends of the u-phase winding 208 is denoted by Vu, a voltage between both ends of the v-phase winding 209 is denoted by Vv and a voltage between both ends of the w-phase winding 210 is denoted by Vw.

A load device 123 is connected between a positive output terminal 121 and a negative output terminal 122 of the power conversion device. In the specification, a voltage applied to the load device 123 is denoted by VD and a current flowing in the load device 123 is denoted by ID.

Next, configurations of the positive converter group 112 and the negative converter group 116 will be explained.

The positive converter group 112 consists of a u-phase positive converter arm 113, a v-phase positive converter arm 114 and a w-phase positive converter arm 115. In addition, the negative converter group 116 consists of a u-phase negative converter arm 117, a v-phase negative converter arm 118 and a w-phase negative converter arm 119.

Each of the converter arms 113 to 115 and 117 to 119 is provided with an a-terminal and a b-terminal.

In the embodiment, a voltage of the a-terminal against a standard voltage of the b-terminal is called an arm voltage. In addition, each of the converter arms 113 to 115 and 117 to 119 is a circuit that cascade-connects one or a plurality of unit converters 120.

The a-terminal of the u-phase positive converter arm 113 is connected to a positive output terminal 121, and the b-terminal thereof is connected to the u-phase positive terminal 106 of the transformer 105. In addition, in the embodiment, an arm voltage of the u-phase positive converter arm 113 is denoted by VarmuH.

The a-terminal of the v-phase positive converter arm 114 is connected to the positive output terminal 121, and the b-terminal thereof is connected to the v-phase positive terminal 107 of the transformer 105. In addition, in the embodiment, an arm voltage of the v-phase positive converter arm 114 is denoted by VarmvH.

The a-terminal of the w-phase positive converter arm 115 is connected to the positive output terminal 121, and the b-terminal thereof is connected to the w-phase positive terminal 108 of the transformer 105. In addition, in the embodiment, an arm voltage of the w-phase positive converter arm 115 is denoted by VarmwH.

The a-terminal of the u-phase negative converter arm 117 is connected to the u-phase negative terminal 109 of the transformer 105, and the b-terminal thereof is connected to a negative output terminal 122. In addition, in the embodiment, the arm voltage of the u-phase negative converter arm 117 is denoted by VarmuL.

The a-terminal of the v-phase negative converter arm 118 is connected to the v-phase negative terminal 110 of the transformer 105, and the b-terminal thereof is connected to the negative output terminal 122. In addition, in the embodiment, an arm voltage of the v-phase negative converter arm 118 is denoted by VarmvL.

The a-terminal of the w-phase negative converter arm 119 is connected to the w-phase negative terminal 111 of the transformer 105, and the b-terminal thereof is connected to the negative output terminal 122. In addition, in the embodiment, an arm voltage of the w-phase negative converter arm 119 is denoted by VarmwL.

In the first embodiment, a sum of VarmuH and VarmuL is described by a u-phase arm voltage Varmu. In addition, a sum of VarmvH and VarmvL is described by a v-phase arm voltage Varmv. Similarly, a sum of VarmwH and VarmwL is described by a w-phase arm voltage Varmw.

In addition, in the embodiment, a current flowing in the u-phase positive converter arm 113 and u-phase negative converter arm 117 is described by a u-phase arm current Iu, a current flowing in the v-phase positive converter arm 114 and v-phase negative converter arm 118 is described by a v-phase arm current Iv, and a current flowing in the w-phase positive converter arm 115 and w-phase negative converter arm 119 is described by a w-phase arm current Iw.

Next, a configuration of a unit converter 120 will be explained, using FIG. 3 and FIG. 4.

Figure 3:
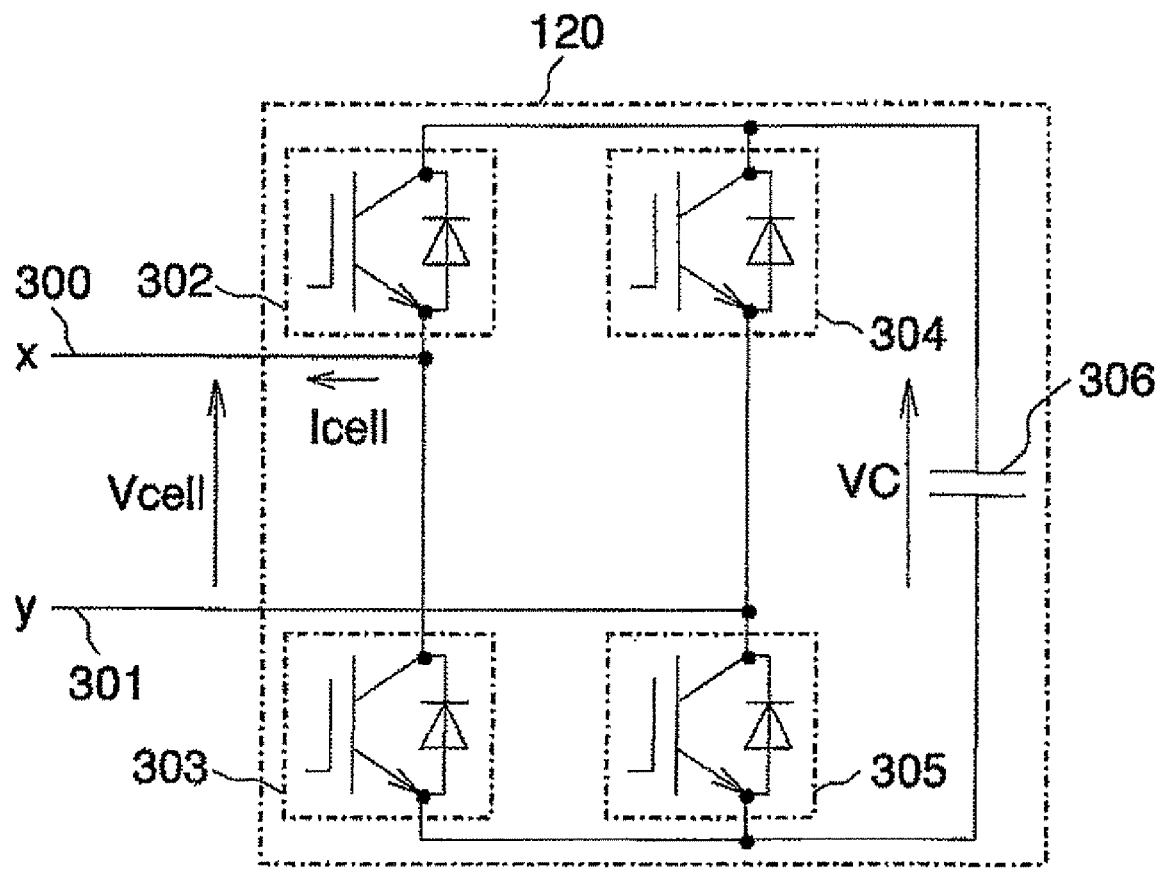
FIG. 3 is a unit full-bride converter.

FIG. 3 shows an example of internal configuration of the unit converter 120. The unit converter of FIG. 3 is a full-bridge circuit. The unit converter 120 is a two-terminal circuit having an x-terminal 300 and a y-terminal 301, and consists of a x-phase high-side switching device 302, a x-phase low-side switching device 303, a y-phase high-side switching device 304, a y-phase low-side switching device 305 and an energy storage device 306. The switching devices 302 to 305 are an ON/OFF control power semiconductor device represented by IGBT. In addition, the energy storage device 306 is, for example, a capacitor or a battery. In the embodiment, a voltage of the x-terminal against a standard voltage of the y-terminal is called a cell voltage Vcell of the unit converter.

Figure 4:
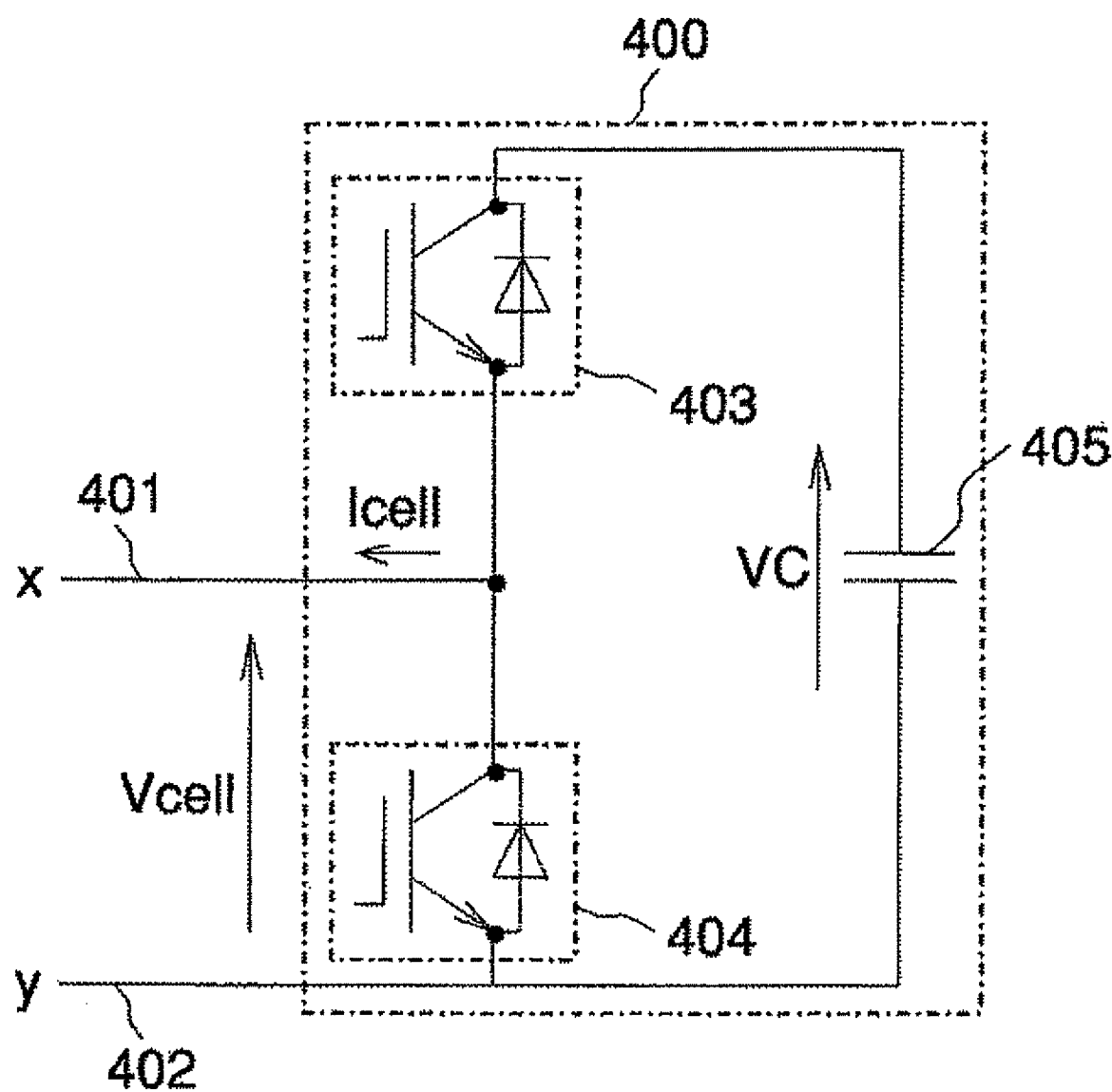
FIG. 4 is a unit bidirectional chopper converter.

On the other hand, the unit converter 120 may be configured with a bidirectional chopper shown in FIG. 4.

The bidirectional chopper shown in FIG. 4 consists of a high-side switching device 403, a low-side switching device 404 and an energy storage device 405. The switching devices 403, 404 are an ON/OFF control power semiconductor device represented by IGBT. In addition, the energy storage device 405 is, for example, a capacitor or a battery. In the embodiment, the voltage shown in FIG. 4 is also described by the cell voltage Vcell.

Next, operations of the power conversion device 101 will be explained for three cases below.

(1) A case to supply single-phase AC power or DC power to the load device 123 by receiving active power from the three-phase power system 100
(2) A case to supply active power to the three-phase power system 100 by receiving single-phase AC power or DC power from the load device 123
(3) A case to transmit and receive reactive power to and from the three-phase power system 100

Next, an explanation will be given of the operations in the case that the power conversion device 101 receives active power from the three-phase power system 100 and supplies single-phase AC power or DC power to the load device 123. Here, for example, the following cases are supposed that the load device 123 is a DC transmission line and the power conversion device 101 is a power conversion device on the power transmitting side as seen from the DC transmission line, or the load device 123 is a motor drive inverter and the motor drive inverter is operated with power running, or the load device 123 is a single-phase AC load.

In the embodiment, voltages of the line voltages VRS, VST and VTR of the three-phase power system 100 converted to the voltages on the secondary side of the transformer are denoted by aVRS, aVST and aVTR, respectively. Here, a is a turn ratio of a secondary winding to a primary winding of the transformer.

Here, an explanation will be given of a relationship among voltages Vu, Vv, Vw of the secondary winding of the transformer, the arm voltages Varmu, Varmv, Varmw and the voltage VD of the load device 123.

A relationship among Vu, Varmu and VD is expressed by the following formula.

$$Vu = VD - Varmu \quad \text{(Number 1)}$$

A relationship among Vv, Varmv and VD is expressed by the following formula.

$$Vv = VD - Varmv \quad \text{(Number 2)}$$

A relationship among Vw, Varmw and VD is expressed by the following formula.

$$Vw = VD - Varmw \quad \text{(Number 3)}$$

According to the Numbers 1 to 3, the voltages Vu, Vv, Vw of the secondary winding of the transformer can be controlled by controlling the u-phase arm voltage Varmu, the v-phase arm voltage Varmv and the w-phase arm voltage Varmw.

Here, the reason why a reactor is unnecessary in the first embodiment will be explained.

A sum aVRS+Varmu that is the sum of the voltage aVRS, which is the voltage of the line voltage VRS between the R-phase and the S-phase of the three-phase power system 100 converted to the voltage on the secondary side of the transformer, and the u-phase arm voltage Varmu, a sum aVST+Varmv that is the sum of the voltage aVST, which is the voltage of the line voltage VST between the S-phase and the T-phase of the three-phase power system 100 converted to the voltage on the secondary side of the transformer, and the v-phase arm voltage Varmv, and a sum aVTR+Varmw that is the sum of the voltage aVTR, which is the voltage of the line voltage VTR between the T-phase and the R-phase of the three-phase power system 100 converted to the voltage on the secondary side of the transformer, and the u-phase arm voltage Varmw, may be different to each other.

Differences among the aVRS+Varmu, aVST+Varmv and aVTR+Varmw are absorbed by a leakage inductance of the transformer 105.

Then, a reactor is not required in the first embodiment.

If phases of Vu, Vv and Vw are slightly delayed in comparison with the phases of aVRS, aVST and aVTR, while matching frequencies and amplitudes of Vu, Vv and Vw with those of aVRS, aVST and aVTR, an active current flows into the power conversion device 101 from the three-phase power system 100.

Next, an explanation will be given about that the arm voltage can be controlled by a switching condition of a switching device constituting the unit converter 120.

First, an explanation will be given of a case that the unit converter 120 is a full-bridge circuit (FIG. 3).

An x-phase high-side switching device 302 and an x-phase low-side switching device 303 are alternately switched ON/OFF. In addition, a y-phase high-side switching device 304 and a y-phase low-side switching device 305 are alternately switched ON/OFF.

When the x-phase high-side switching device 302 is ON, the x-phase low-side switching device 303 is OFF, the y-phase high-side switching device 304 is OFF and the y-phase low-side switching device 305 is ON, the cell voltage Vcell is substantially equal to the voltage VC of the energy storage device 306 without depending on the current Icell.

When the x-phase high-side switching device 302 is ON, the x-phase low-side switching device 303 is OFF, the y-phase high-side switching device 304 is ON and the y-phase low-side switching device 305 is OFF, the cell voltage Vcell is substantially zero without depending on the current Icell.

When the x-phase high-side switching device 302 is OFF, the x-phase low-side switching device 303 is ON, the y-phase high-side switching device 304 is OFF and the y-phase low-side switching device 305 is ON, the cell voltage Vcell is substantially zero without depending on the current Icell.

When the x-phase high-side switching device 302 is OFF, the x-phase low-side switching device 303 is ON, the y-phase high-side switching device 304 is ON and the y-phase low-side switching device 305 is OFF, the cell voltage Vcell is substantially equal to a voltage that has a reverse polarity of the voltage VC of the energy storage device 306 without depending on the current Icell.

When the x-phase high-side switching device 302, the x-phase low-side switching device 303, the y-phase high-side switching device 304 and the y-phase low-side switching device 305 are all OFF, the cell voltage Vcell is determined depending on a polarity of the current Icell. When the Icell is positive, the cell voltage Vcell is substantially equal to the voltage VC of the energy storage device 306. When the Icell is negative, the cell voltage Vcell is substantially equal to a voltage that has a reverse polarity of the voltage VC of the energy storage device 306.

Next, an explanation will be given of a case that the unit converter 120 is a bidirectional chopper (FIG. 4).

When a high-side switching device 403 is ON and a low-side switching device 404 is OFF, the cell voltage Vcell is substantially equal to the voltage VC of a DC capacitor 405 without depending on the current Icell.

When the high-side switching device 403 is OFF and the low-side switching device 404 is ON, the cell voltage Vcell is substantially zero without depending on the current Icell.

When the high-side switching device 403 and the low-side switching device 404 are both OFF, the cell voltage Vcell is determined depending on a polarity of the current Icell. If the Icell is positive, the cell voltage Vcell is substantially equal to the voltage VC of the energy storage device 405. If the Icell is negative, the cell voltage Vcell is substantially zero.

Next, an explanation will be given of a method for supplying electric power to the load device 123.

A current ID flowing in the load device 123 is a sum (Iu+Iv+Iw) of arm currents Iu, Iv and Iw. When the arm voltages Varmu, Varmv and Varmw do not contain a zero-phase component, the arm currents Iu, Iv and Iw also do not contain a zero-phase component. When the arm currents Iu, Iv and Iw do not contain the zero-phase component, it becomes that Iu+Iv+Iw=ID=0, and transmission of electric power to the load device 123 becomes impossible.

In this case, active power flowing into the power conversion device 101 from the three-phase power system 100 is stored in the energy storage device (for example, electrolytic capacitor) in each of the respective unit converters 120.

In order to supply electric power to the load device 123, the zero-phase component of the arm voltages Varmu, Varmv and Varmw is adjusted and the zero-phase component of the arm currents Iu, Iv and Iw is controlled. According to the Kirchhoff's current law, since it becomes that ID=Iu+Iv+Iw, the current ID can be supplied to the load device 123 by adjusting the zero-phase component of the arm currents Iu, Iv and Iw.

Meanwhile, when active power flowing into the power conversion device 101 from the three-phase power system 100 is equal to the active power consumed by the load device 123, an amount of energy flowing into/out from each unit converter 120 during one cycle of the three-phase power system 100 becomes substantially zero.

In addition, as the current ID, direct current, alternate current and a current that alternate current is superimposed on direct current may be used.

When the power conversion device 101 and the load device 123 transmit and receive only a single-phase reactive power, active power flowing into the power conversion device 101 from the three-phase power system 100 is controlled to be zero.

Below, an explanation will be given of operations in the case that the power conversion device 101 receives active power from the load device 123 and active power is supplied to the three-phase power system 100. Here, for example, the following cases are supposed that the load device 123 is a DC transmission line and the power conversion device 101 is a power conversion device on the power receiving side as seen from the DC transmission line, or the load device 123 is a motor drive inverter and the motor drive inverter is operated on the regenerative braking, or the load device 123 is a single-phase AC source.

If only phases of Vu, Vv and Vw are slightly advanced in comparison with the phases of aVRS, aVST and aVTR, while matching frequencies and amplitudes of Vu, Vv and Vw with those of aVRS, aVST and aVTR, active power can be supplied to the three-phase power system 100 from the power conversion device 101.

Next, an explanation will be given of a method for receiving electric power from the load device 123.

The current ID flowing out from the load device 123 is a sum (Iu+Iv+Iw) of arm currents Iu, Iv and Iw. When the arm voltages Varmu, Varmv and Varmw do not contain a zero-phase component, the arm currents Iu, Iv and Iw also do not contain a zero-phase component. When the arm currents Iu, Iv and Iw do not contain the zero-phase component, it becomes that Iu+Iv+Iw=ID=0, and electric power can not be supplied from the load device 123.

In this case, active power flowing into the three-phase power system 100 from the power conversion device 101 is supplied from the energy storage device (for example, electrolytic capacitor) in each unit converter 120.

In order to have electric power flow into the power conversion device 101 from the load device 123, a zero-phase component of the arm voltages Vsrmu, Varmv and Varmw is adjusted and the zero-phase component of the arm currents Iu, Iv and Iw is controlled. According to the Kirchhoff's current law, since it becomes that ID=Iu+Iv+Iw, the current ID can be supplied to the power conversion device 101 by adjusting the zero-phase component of the arm currents Iu, Iv and Iw.

Meanwhile, when active power flowing into the three-phase power system 100 from the power conversion device 101 is equal to the active power flowing into the power conversion device 101 from the load device 123, an amount of energy flowing into/out from each unit converter 120 during one cycle of the three-phase power system 100 is substantially zero.

Below, an explanation will be given of a case that the power conversion device 101 transmits and receives reactive power to and from the three-phase power system 100 and the load device 123 is opened (ID=0). Here, it is supposed that, for example, the power conversion device 101 operates as a reactive power compensation device.

If only amplitudes of Vu, Vv and Vw are slightly increased in comparison with the amplitudes of aVRS, aVST and aVTR, while matching frequencies and phases of Vu, Vv and Vw with those of aVRS, aVST and aVTR, advanced reactive power can be supplied to the three-phase power system 100 from the power conversion device 101.

In addition, if only amplitudes of Vu, Vv and Vw are slightly decreased in comparison with the amplitudes of aVRS, aVST and aVTR, while matching frequencies and phases of Vu, Vv and Vw with those of aVRS, aVST and aVTR, delayed reactive power can be supplied to the three-phase power system 100 from the power conversion device 101.

Next, an explanation will be given about that in the present embodiment, a series circuit of the secondary winding of the transformer and the converter arm can be considered as a voltage source and a controlled current source.

The three-phase power system 100 is connected to the primary winding of the transformer. Since the three-phase power system 100 can be considered as a voltage source, a voltage induced in the secondary winding by the three-phase power system 100 can also be considered as a voltage source.

In addition, the converter arm can adjust a voltage applied to a leakage inductance and exciting inductance of the secondary winding of the transformer by properly adjusting an arm voltage of the converter arm.

A current flowing in the leakage inductance and the exciting inductance is proportional to a time integration of the voltage applied to the leakage inductance and the exciting inductance. Therefore, the converter arm can control a current flowing in the leakage inductance and the exciting inductance through the arm voltage of the converter arm.

Therefore, the series circuit of the converter arm and the leakage inductance as well as the exciting inductance can be considered as a controlled current source.

In the present embodiment, a power conversion device interconnected with a three-phase power system has been described. In a three-phase system, a positive-phase/negative-phase current corresponds to a differential mode current, and a zero-phase current corresponds to a common current.

In addition, the present embodiment can be applied to a power conversion device interconnected with a single-phase or a multiphase system as well as a three-phase power system by increasing or decreasing the number of converter arms.

Figure 5:
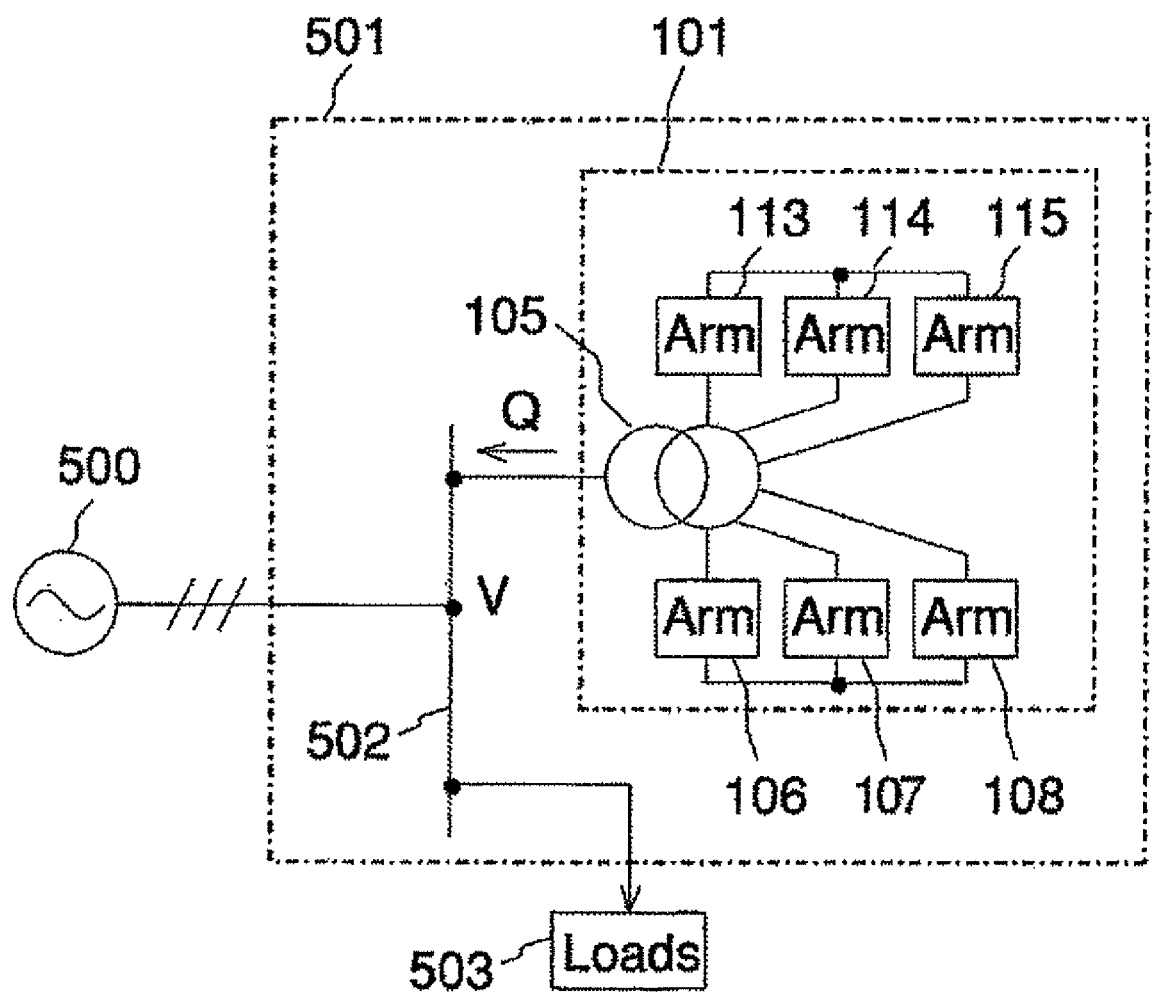
FIG. 5 is an example of a reactive power compensation device to which the first embodiment of the present invention is applied.

As an example of application of the present embodiment, the example where the power conversion device 101 is applied to a reactive power compensation device is shown. FIG. 5 is an example of an electric power substation where the power conversion device 101 is installed. An electric power substation 501 is interconnected with a three-phase power system 500. Loads 503 and the power conversion device 101 according to the present embodiment are connected to an electric power substation busbar 502. By properly adjusting a reactive power Q between the power conversion device 101 and the three-phase power system 500 using the foregoing method, amplitude of a voltage V of the electric power substation busbar 502 is controlled to be constant.

<Second Embodiment>

An explanation will be given of a second embodiment of the present invention. In the first embodiment, the primary winding of the transformer was delta-connected. However, in the second embodiment, the primary winding of the transformer is star-connected.

Hereinafter, the explanation will be given of only a part of configuration of the second embodiment different from the first embodiment.

Figure 6:
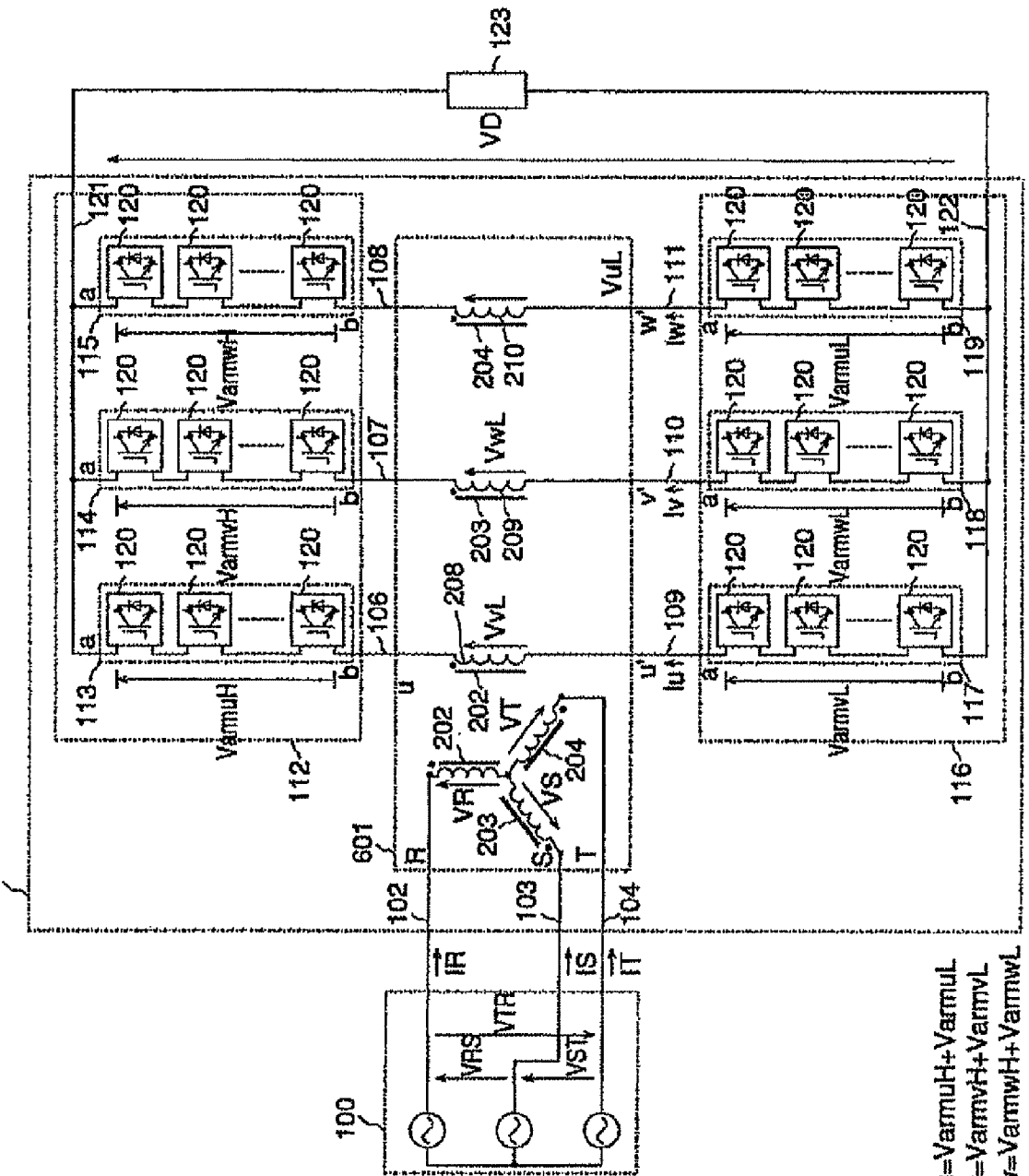
FIG. 6 is a circuit diagram showing a second embodiment of the present invention.

FIG. 6 is a circuit diagram showing the second embodiment of the present invention. A power conversion device 600 is interconnected with the three-phase power system 100 through three-phase AC terminals 102 to 104, and transmits and receives active/reactive power to and from the three-phase power system 100. The power conversion device 600 consists of a transformer 601, a positive converter group 112 and a negative converter group 116 different.

In the embodiment, phase voltages of the R-phase, the S-phase and the T-phase of the three-phase power system 100 are denoted by VR, VS and VT, respectively.

The positive converter group 112 and the negative converter group 116 of FIG. 6 are identical to those in the first embodiment (FIG. 1).

Figure 7:
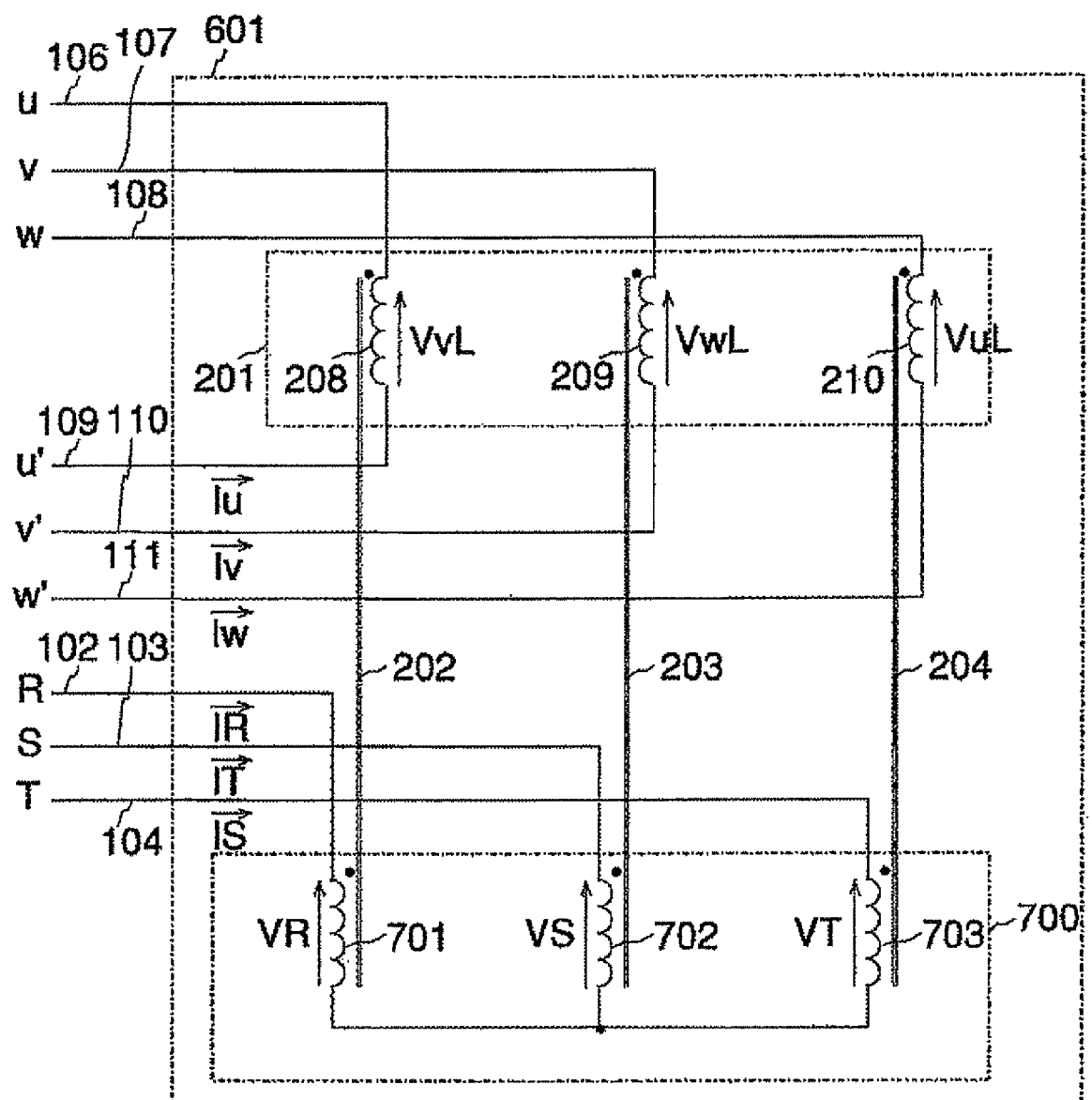
FIG. 7 is a transformer in the second embodiment of the present invention.

FIG. 7 shows a polarity of a magnetomotive force that is generated in each iron core by each winding of the transformer 601, and a wire connection of the each winding. The transformer 601 includes iron cores 202 to 204, and these iron cores 202 to 204 configure a three-legged core. A primary winding 700 is star-connected, and windings 701, 702 and 703 corresponding to the R-phase, the S-phase and the T-phase, respectively are wound on the iron cores 202, 203 and 204, respectively.

The secondary winding 201 of FIG. 7 is identical to that of the secondary winding 201 of FIG. 2.

<Third Embodiment>

An explanation will be given of a third embodiment embodying the present invention. The third embodiment is a modification of the first embodiment. In the first embodiment, two converter groups that are on the positive side and the negative side are used. However, in the third embodiment, only one converter group is used.

In the third embodiment, the number of terminal of the transformer can be reduced from nine terminals to seven terminals, while effects identical to those of the first embodiment can be obtained.

Below, an explanation will be given of only a part of configuration of the third embodiment different from the first embodiment.

Figure 8:
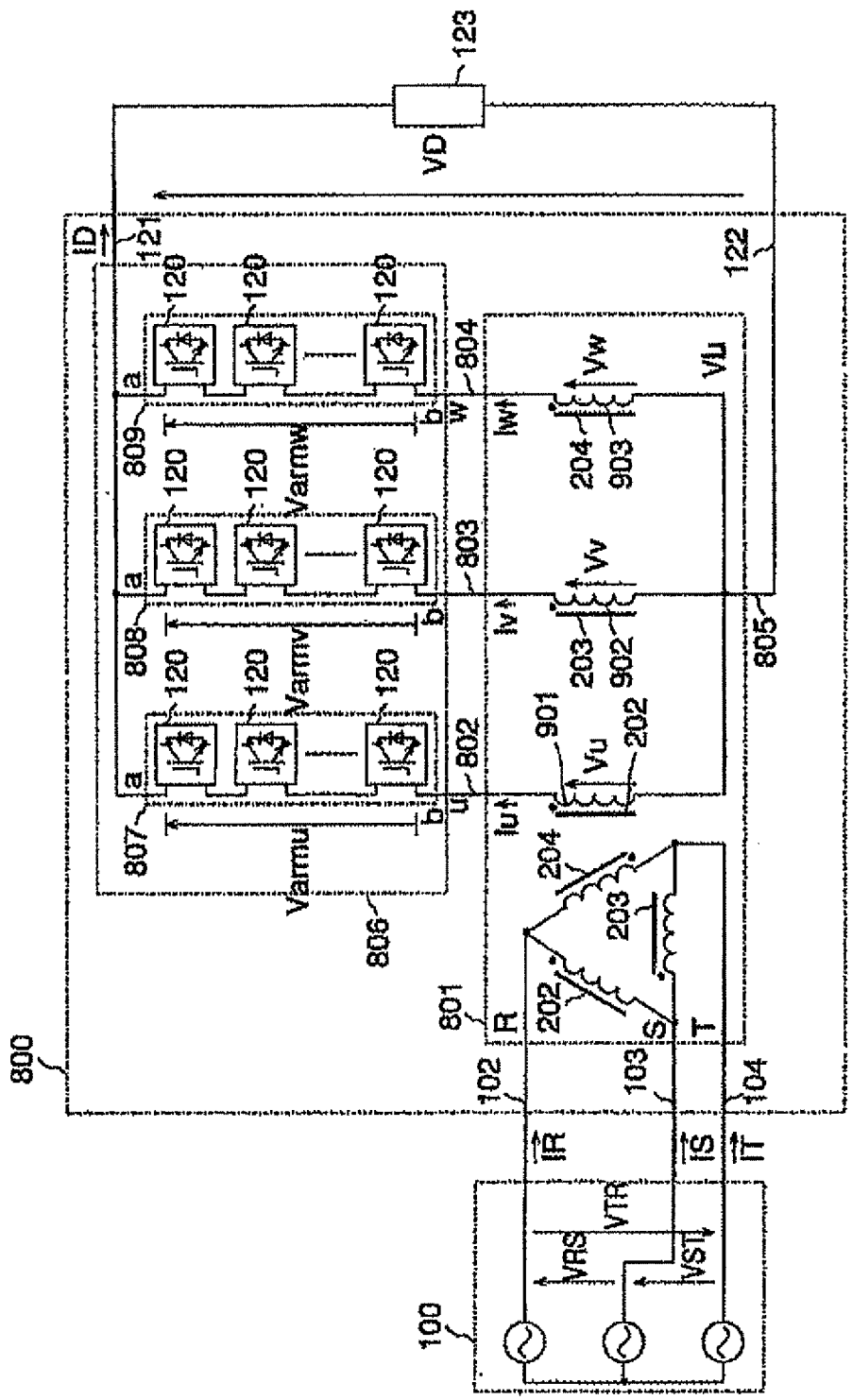
FIG. 8 is a circuit diagram showing a third embodiment of the present invention.

FIG. 8 is a circuit diagram showing a third embodiment of the present invention. A power conversion device 800 is interconnected with the three-phase power system 100 through three-phase AC terminals 102 to 104, and transmits and receives active/reactive power to and from the three-phase power system 100. The power conversion device 800 consists of a transformer 801 and a converter group 806.

The transformer 801 includes seven terminals in total that are an R-phase terminal 102, an S-phase terminal 103, a T-phase terminal 104, an u-phase terminal 802, a v-phase terminal 803, a w-phase terminal 804 and a neutral point terminal 805.

Then, the number of terminal of the transformer can be reduced from nine terminals to seven terminals in comparison with the first and second embodiments.

Figure 9:
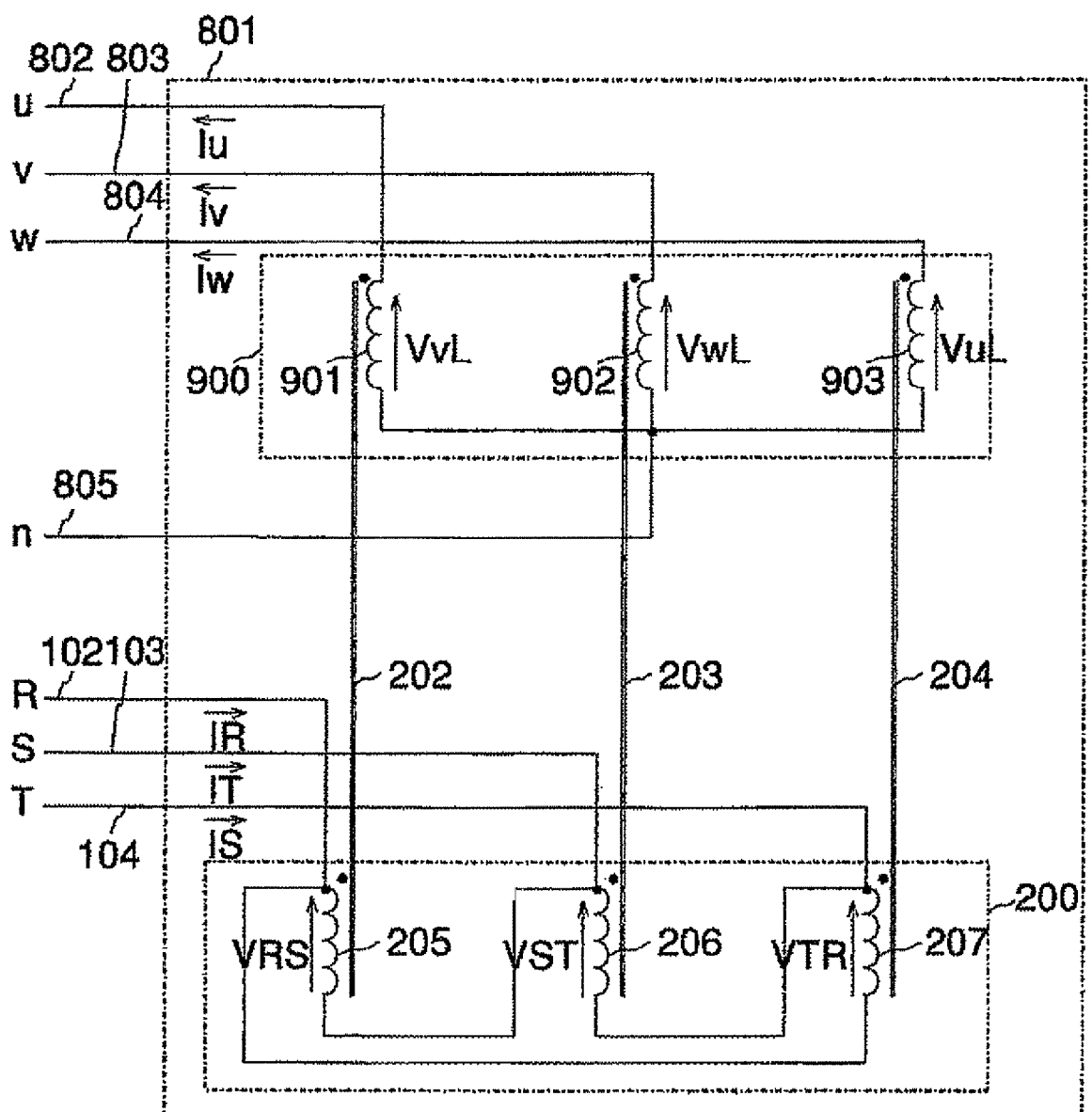
FIG. 9 is a transformer in the third embodiment of the present invention.

FIG. 9 shows a polarity of a magnetomotive force that is generated in each iron core by each winding of the transformer 801, and a wire connection of the each winding. The transformer 801 includes iron cores 202 to 204, and these iron cores 202 to 204 configure a three-legged core. A primary winding 200 has the same configuration with that of the first embodiment (FIG. 2).

A secondary winding 900 includes a u-phase winding 901, a v-phase winding 902 and a w-phase winding 903. The number of winding of each of the windings 901 to 903 is substantially the same. The u-phase winding 901, the v-phase winding 902 and the w-phase winding 903 are star-connected, and a neutral point n is drawn from the neutral point terminal 805.

The converter group 806 consists of a u-phase converter arm 807, a v-phase converter arm 808 and a w-phase converter arm 809.

The a-terminal of the u-phase converter arm 807 is connected to a positive output terminal 121, and the b-terminal is connected to the u-phase terminal 802 of the transformer 801. In addition, in the third embodiment, an arm voltage of the u-phase converter arm 807 is denoted by Varmu.

The a-terminal of the v-phase converter arm 808 is connected to the positive output terminal 121, and the b-terminal is connected to the v-phase terminal 803 of the transformer 801. In addition, in the third embodiment, an arm voltage of the v-phase converter arm 808 is denoted by Varmv.

The a-terminal of the w-phase converter arm 809 is connected to the positive output terminal 121, and the b-terminal is connected to the w-phase terminal 804 of the transformer 801. In addition, in the third embodiment, an arm voltage of the w-phase converter arm 809 is denoted by Varmw.

The converter arms 807 to 809 in the third embodiment (FIG. 8) are substantially identical to the converter arms 113 to 115 and 117 to 119 in FIG. 1 of the first embodiment and in FIG. 6 of the second embodiment. However, the number of unit converter 120 included therein is almost twice.

<Fourth Embodiment>

An explanation will be given of a fourth embodiment of the present invention. The fourth embodiment is a modification of the second embodiment. In the second embodiment, two converter groups that are on the positive side and the negative side are used. However, in the fourth embodiment, only one converter group is used, and effects identical to those of the third embodiment can be obtained. In addition, in the third embodiment, the primary winding of the transformer is delta-connected. However, in the fourth embodiment, the primary winding of the transformer is star-connected.

Below, an explanation will be given of only a part of configuration of the fourth embodiment different from the third embodiment.

Figure 10:
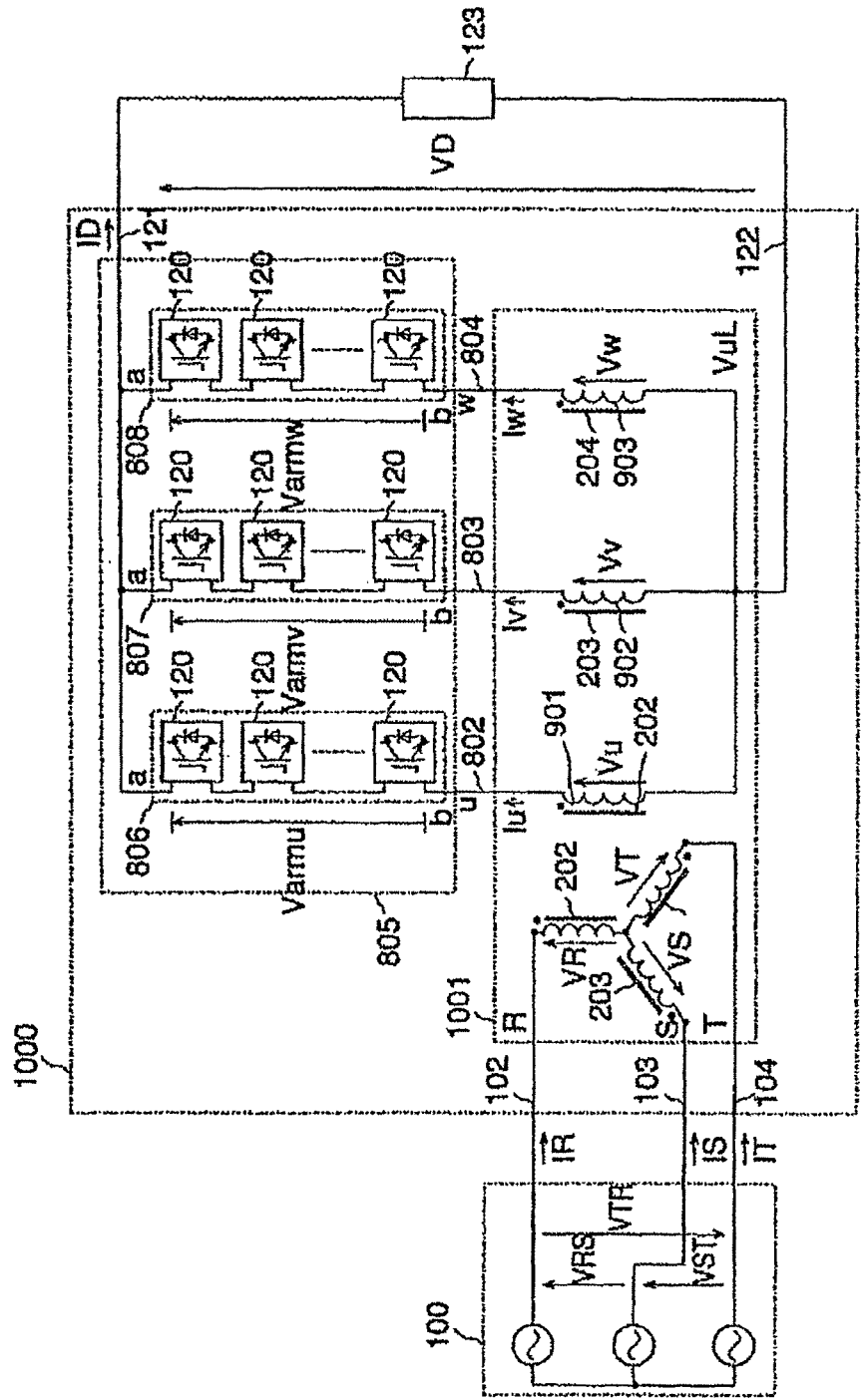
FIG. 10 is a circuit diagram showing a fourth embodiment of the present invention.

FIG. 10 is a circuit diagram showing a fourth embodiment of the present invention. A power conversion device 1000 is interconnected with the three-phase power system 100 through the three-phase AC terminals 102 to 104, and transmits and receives active/reactive power to and from the three-phase power system 100. The power conversion device 1000 consists of a transformer 1001 and a converter group 805.

The transformer 1001 includes seven terminals in total that are the R-phase terminal 102, the S-phase terminal 103, the T-phase terminal 104, the u-phase terminal 802, the v-phase terminal 803, the w-phase terminal 804 and a neutral point terminal 805.

Figure 11:
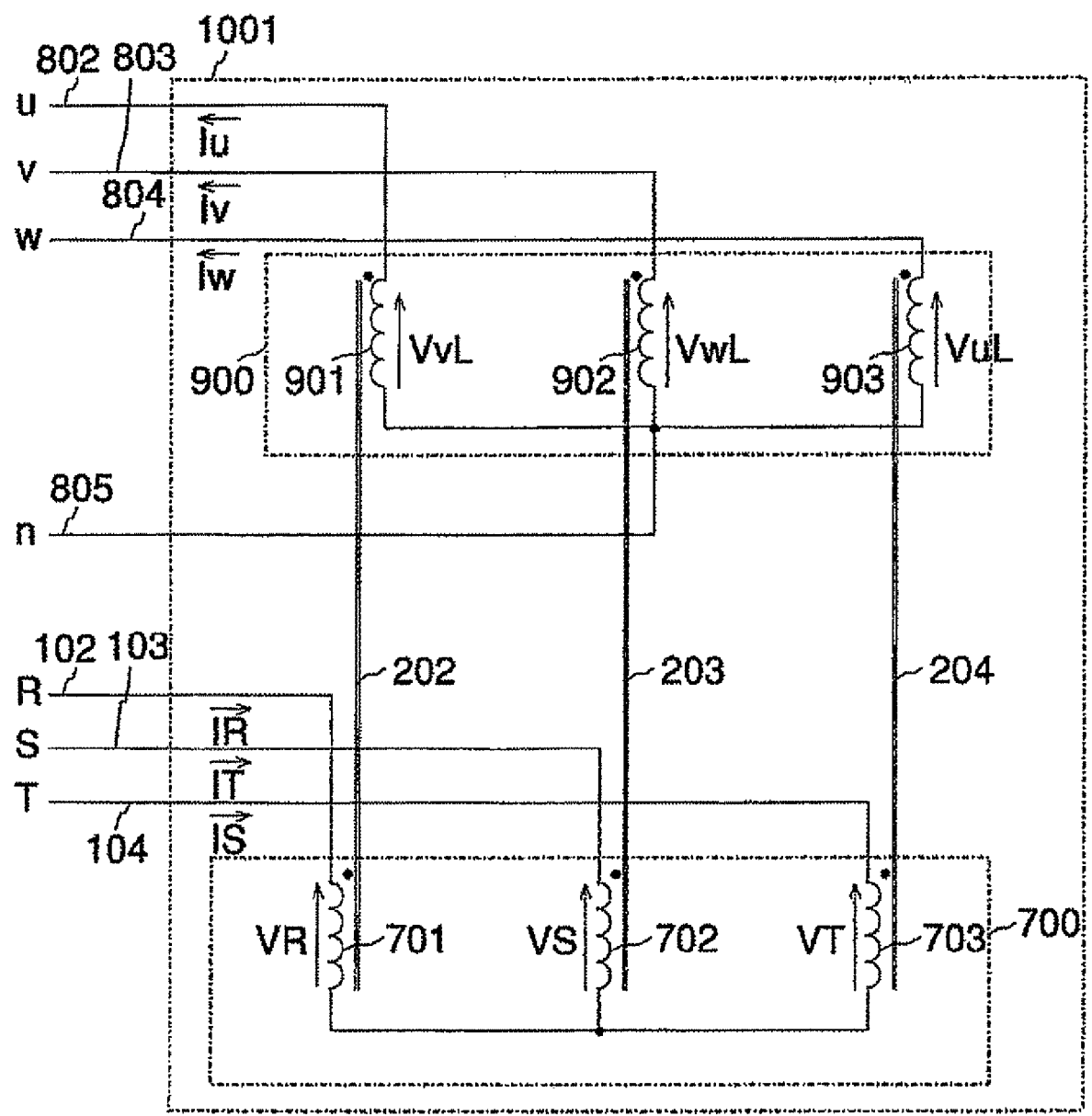
FIG. 11 is a transformer in the fourth embodiment of the present invention.

FIG. 11 shows a polarity of a magnetomotive force that is generated in each iron core by each winding of the transformer 1001, and a wire connection of the each winding. The transformer 1001 includes iron cores 202 to 204, and these iron cores 202 to 204 configure a three-legged core. A primary winding 700 of FIG. 11 is identical to the primary winding 700 in FIG. 7 of the second embodiment.

In addition, a secondary winding 900 is identical to the secondary winding 900 in FIG. 9 of the third embodiment, and a converter group 706 of FIG. 9 is identical to the converter group 706 in FIG. 7 of the second embodiment.

<Fifth Embodiment>

An explanation will be given of a fifth embodiment of the present invention. The fifth embodiment is a modification of the first embodiment. Each phase of the secondary winding of the transformer is divided into two, and a wire is connected so that a magnetomotive force to be caused by a zero-phase current becomes zero.

In the fifth embodiment, effects identical to those of the first embodiment can be obtained. In addition, when the current ID is applied to the load device 123, a cross section of the iron core of the transformer can be reduced in comparison with the embodiments 1 to 4. This is because, as described above, the magnetomotive force to be caused by the zero-phase current is zero.

Figure 12:
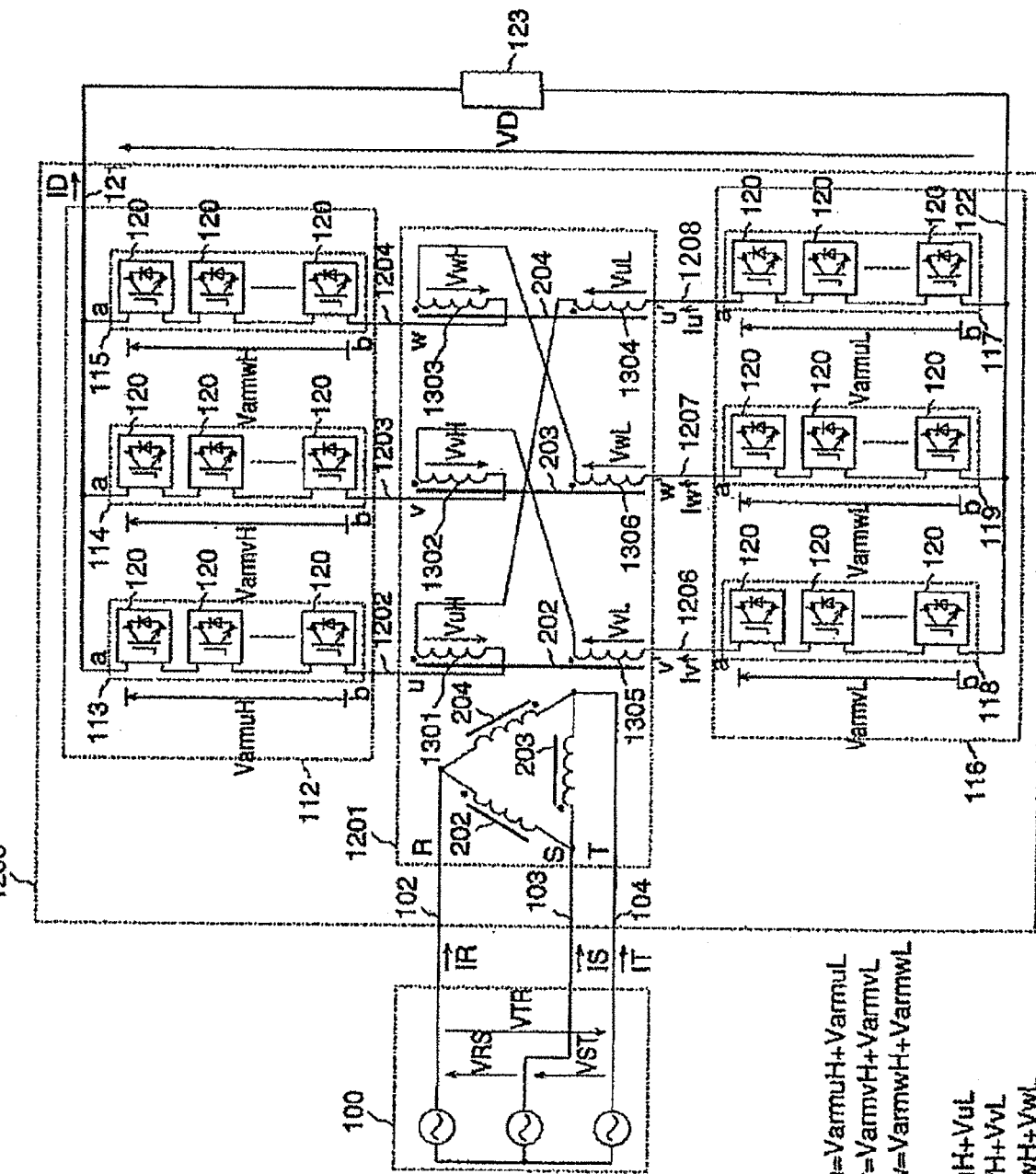
FIG. 12 is a circuit diagram showing a fifth embodiment of the present invention.

FIG. 12 is a circuit diagram showing the fifth embodiment of the present invention. A configuration of FIG. 12 of the fifth embodiment has a circuit configuration that replaces the transformer 105 of FIG. 1 of the first embodiment with a transformer 1201.

The transformer 1201 includes nine terminals in total that are the R-phase terminal 102, the S-phase terminal 103, the T-phase terminal 104, a u-phase positive terminal 1202, a v-phase positive terminal 1203, a w-phase positive terminal 1204, a u-phase negative terminal 1206, a v-phase negative terminal 1207 and a w-phase negative terminal 1208.

Figure 13:
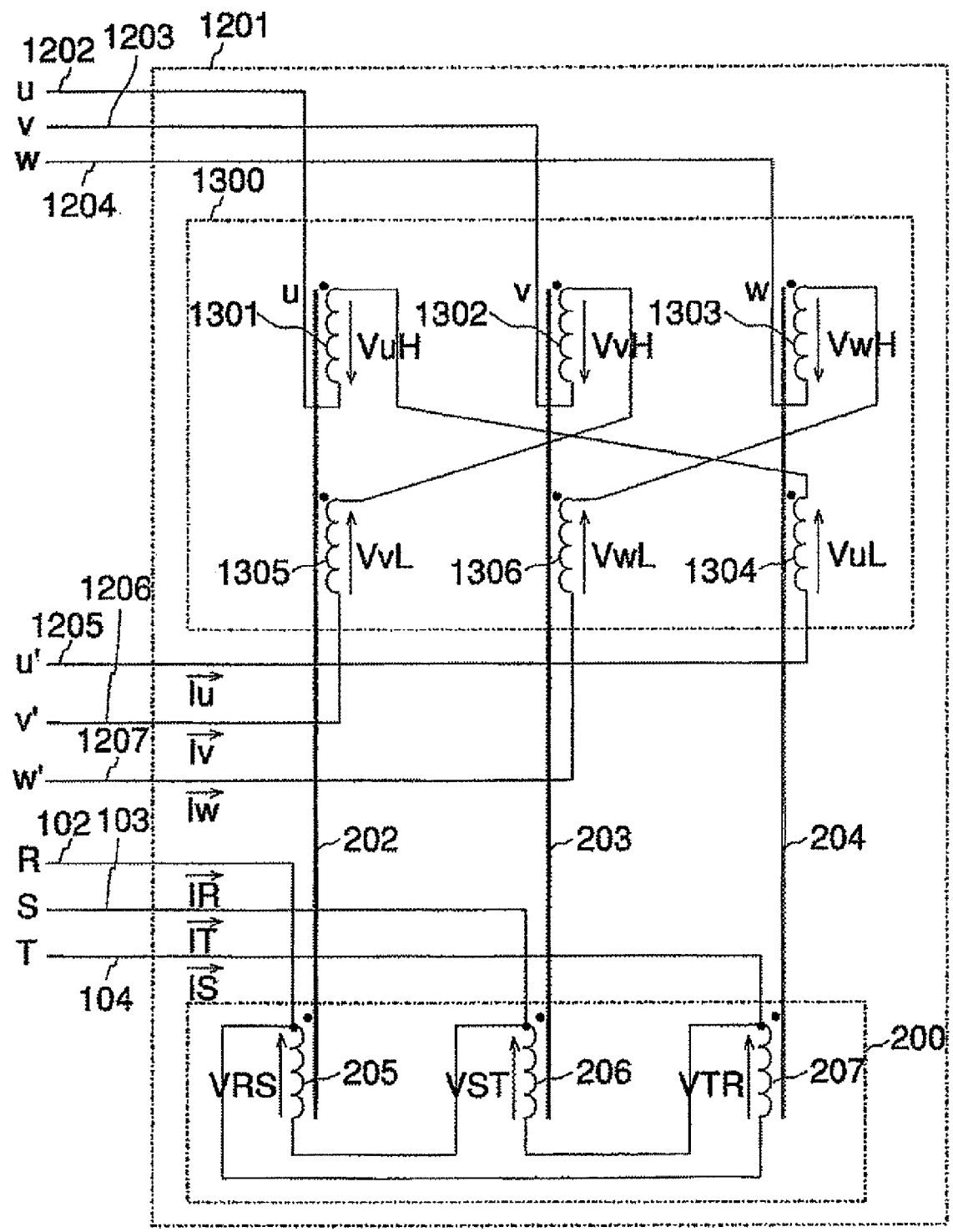
FIG. 13 is a transformer in the fifth embodiment of the present invention.

FIG. 13 shows a polarity of a magnetomotive force that is generated in each iron core by each winding of the transformer 1201, and a wire connection of the each winding. The transformer 1201 includes iron cores 202 to 204, and these iron cores 202 to 204 configure a three-legged core. A primary winding 200 of FIG. 13 is identical to the primary winding 200 of FIG. 1 of the first embodiment.

A secondary winding 1300 includes a u-phase positive winding 1301, a v-phase positive winding 1302, a w-phase positive winding 1303, a u-phase negative winding 1304, a v-phase negative winding 1305 and a w-phase negative winding 1306. The number of winding of each of the windings 1301 to 1306 is substantially the same.

The u-phase positive winding 1301 and the u-phase negative winding 1304 are electrically connected in series. The u-phase positive winding 1301 is wound on the iron core 202, and the u-phase negative winding 1304 is wound on the iron core 204. Meanwhile, the wire is connected so that a magnetomotive force to be generated in the iron core 202 by the u-phase positive winding 1301 and the magnetomotive force to be generated in the iron core 204 by the u-phase negative winding 1304 have substantially the same strength with reverse polarity to each other.

The v-phase positive winding 1302 and the v-phase negative winding 1305 are electrically connected in series. The v-phase positive winding 1302 is wound on the iron core 203, and the v-phase negative winding 1305 is wound on the iron core 202. Meanwhile, the wire is connected so that a magnetomotive force to be generated in the iron core 203 by the v-phase positive winding 1302 and the magnetomotive force to be generated in the iron core 202 by the v-phase negative winding 1305 have substantially the same strength with reverse polarity to each other.

The w-phase positive winding 1303 and the w-phase negative winding 1306 are electrically connected in series. The w-phase positive winding 1303 is wound on the iron core 204, and the w-phase negative winding 1306 is wound on the iron core 203. Meanwhile, the wire is connected so that a magnetomotive force to be generated in the iron core 204 by the w-phase positive winding 1303 and the magnetomotive force to be generated in the iron core 203 by the w-phase negative winding 1306 have substantially the same strength with reverse polarity to each other.

In the embodiment, the u-phase positive winding 1301 and the u-phase negative winding 1304 are generally called a u-phase winding. In addition, the v-phase positive winding 1302 and the v-phase negative winding 1305 are generally called a v-phase winding. Similarly, the w-phase positive winding 1303 and the w-phase negative winding 1306 are generally called a w-phase winding.

In the embodiment, a voltage between both ends of the u-phase positive winding 1301 is denoted by VuH, a voltage between both ends of the v-phase positive winding 1302 is denoted by VvH, a voltage between both ends of the w-phase positive winding 1303 is denoted by VwH, a voltage between both ends of the u-phase negative winding 1304 is denoted by VuL, a voltage between both ends of the v-phase negative winding 1305 is denoted by VvL and a voltage between both ends of the w-phase negative winding 1306 is denoted by VwL.

In addition, a sum of VuH and VuL is called a u-phase voltage Vu, a sum of VvH and VvL is called a v-phase voltage Vv and a sum of VwH and VwL is called a w-phase voltage Vw.

Figure 14:
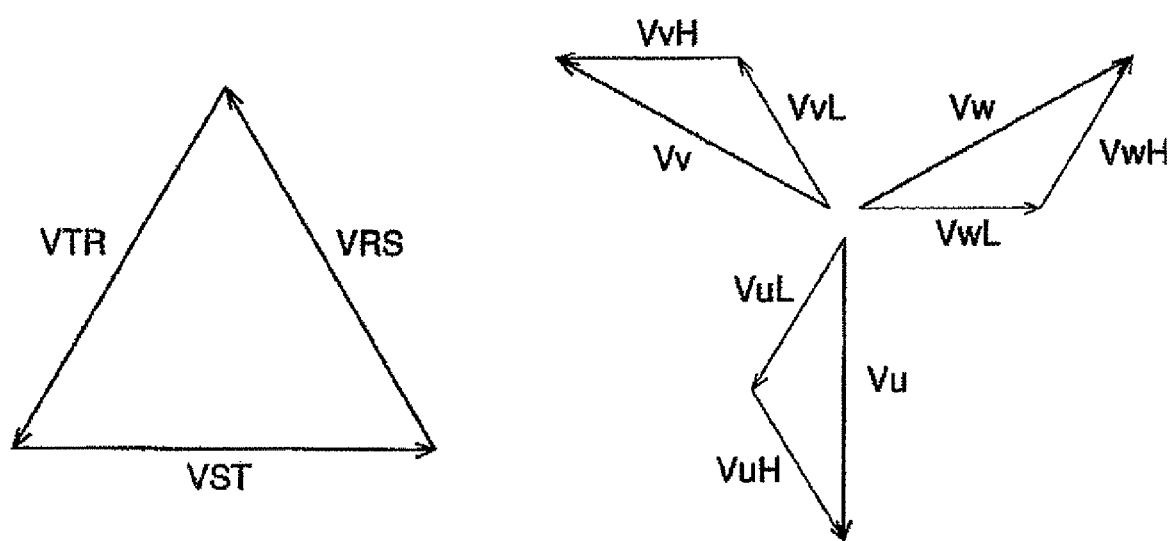
FIG. 14 is a phasor diagram in the fifth embodiment of the present invention.

In FIG. 14, phasor diagrams of voltages (that is, line voltages VRS, VST and VTR of the three-phase power system 100) of the primary winding 200 and voltages VuH, VvH, VwH, VuL, VvL, VwL, Vu, Vv and Vw of the secondary winding 1300 of the transformer 1201 are shown.

A positive converter group 112 of FIG. 12 is identical to the converter group 112 in FIG. 1 of the first embodiment. In addition, a negative converter group 116 of FIG. 12 is identical to the converter group 116 in FIG. 1 of the first embodiment.

An explanation will be given below of differences between the first embodiment and the fifth embodiment. As described in the first embodiment, when the power conversion device 101 transmits and receives active power to and from the three-phase power system 100, a current ID flows. In addition, when power conversion device 101 supplies a single-phase reactive power to the load device 123, the current ID also flows. The current ID dividedly flows into each converter arm of respective phases substantially equally to form a zero-phase component (zero-phase current) of each of the arm currents Iu, Iv and Iw. Then, when the current ID flows, the zero-phase current flows in the secondary winding 201. In the embodiment, the zero-phase current is denoted by Iz.

When the current ID is a DC current, there is a possibility that a zero-phase DC current flows in the secondary winding and causes a direct current bias magnetism and magnetic saturation.

Meanwhile, a case that the power conversion device 1200 of the fifth embodiment supplies the current ID to the load device 123 is considered. As with the case of the first embodiment, a zero-phase current flows in the secondary winding 1300 of the transformer 1201.

In the iron core 202, a magnetomotive force generated by Iz flowing in the u-phase positive winding 1301 and the magnetomotive force generated by Iz flowing in the v-phase negative winding 1305 have substantially the same strength with reverse polarity to each other, thereby resulting in substantially canceling the magnetomotive force.

In the iron core 203, a magnetomotive force generated by Iz flowing in the v-phase positive winding 1302 and the magnetomotive force generated by Iz flowing in the w-phase negative winding 1306 have substantially the same strength with reverse polarity to each other, thereby resulting in substantially canceling the magnetomotive force.

In the iron core 204, a magnetomotive force generated by Iz flowing in the w-phase positive winding 1303 and the magnetomotive force generated by Iz flowing in the u-phase negative winding 1304 have substantially the same strength with reverse polarity to each other, thereby resulting in substantially canceling the magnetomotive force.

Therefore, even if the ID is a DC current, a direct current magnetomotive force becomes substantially zero. Therefore, a direct current bias magnetism of the iron core is hardly generated.

Figure 15:
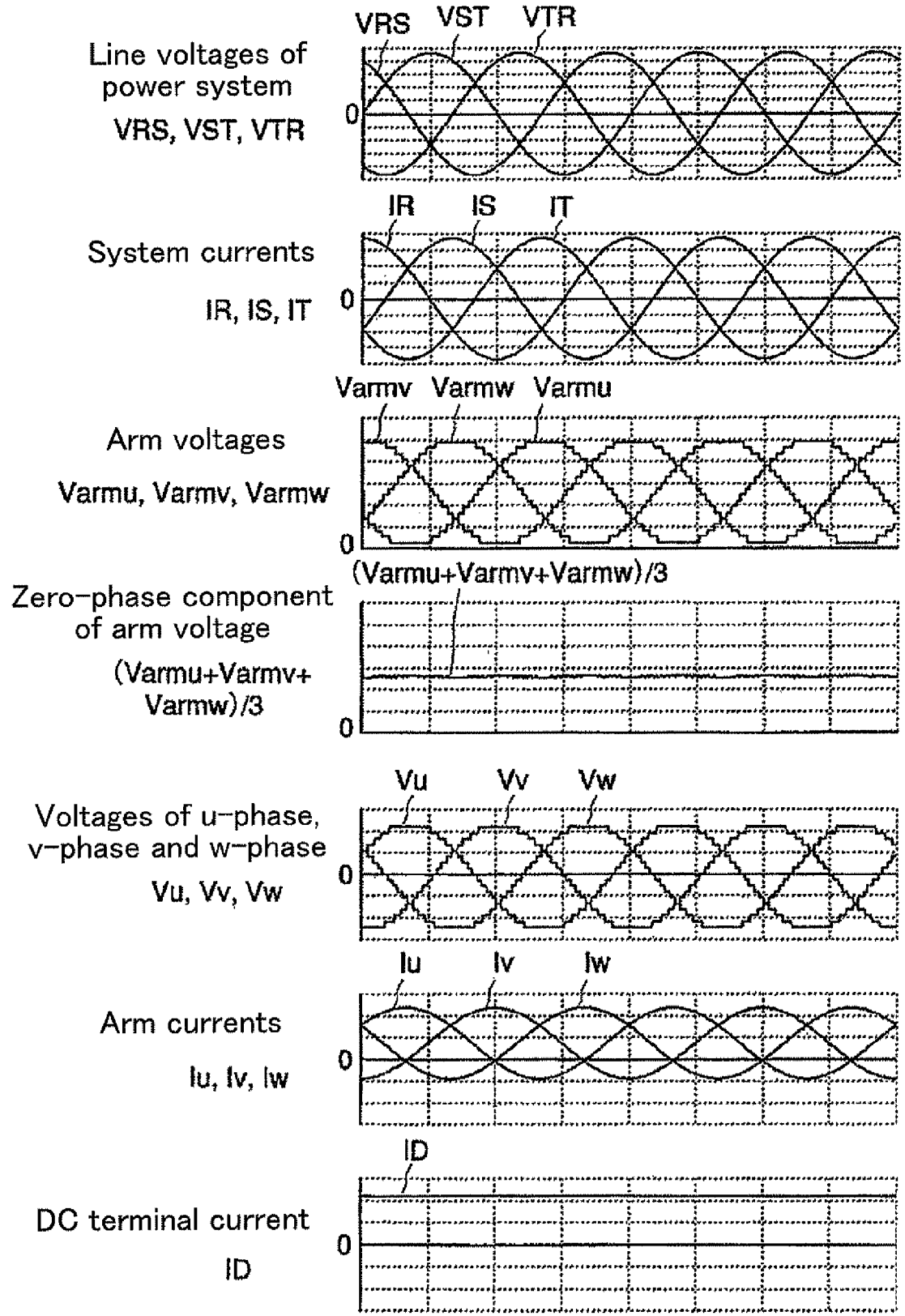
FIG. 15 is a brief operation waveform in the fifth embodiment of the present invention.

Below, an explanation will be given of operations of the power conversion device 1200, using FIG. 15. FIG. 15 is examples of operation waveforms of the power conversion device 1200, and demonstrates brief waveforms of line voltages VRS, VST and VTR of the three-phase power system 100, system currents IR, IS and IT, arm voltages Varmu, Varmv and Varmw, zero-phase component (Varmu+Varmv+Varmw)/3 of arm voltage, arm currents Iu, Iv and Iw, and an output terminal current ID.

In FIG. 15, the power conversion device 1200 receives active power from the system with power factor 1 and applies a DC current to the load device 123 so that a DC current flows therein. That is, the VD and the ID are both direct current.

In the explanation of FIG. 15, the unit converter 120 is a bidirectional chopper circuit shown in FIG. 4.

The arm voltages Varmu, Varmv and Varmw of respective converter arms are a multilevel waveform having the number of levels substantially equal to the number of unit converter 120 included in the respective converter arms. In addition, the arm voltages Varmu, Varmv and Varmw contain a three-phase AC component and a zero-phase DC component. The zero-phase DC component (Varmu+Varmv+Varmw)/3 of the arm voltages Varmu, Varmv and Varmw is substantially equal to the output terminal voltage VD.

Since Varmu, Varmv and Varmw include a zero-phase DC component substantially equal to the VD, the u-phase voltage Vu, the v-phase voltage Vv and the w-phase voltage Vw have voltages with reverse-phases of AC components of Varmu, Varmv and Varmw, respectively, according to Number 1, Number 2 and Number 3, and their DC components are almost nothing.

Voltage differences between Vu, Vv and Vw and voltages aVRS, aVST and aVTR, which are voltages of the line voltages VRS, VST and VTR of the three-phase power system 100 converted to the secondary side of the transformer 1201, are supported by a leakage inductance of the transformer 1201 between the primary winding 200 and the secondary winding 1300.

If only phases of Vu, Vv and Vw are controlled to be slightly delayed in comparison with the phases of aVRS, aVST and aVTR, while controlling frequencies and amplitudes of Vu, Vv and Vw to be identical to those of aVRS, aVST and aVTR, an active current flows into the power conversion device 1200 from the three-phase power system 100.

A voltage difference between a zero-phase component of Varmu, Varmv and Varmw and the voltage VD of the output terminal is supported by an inductance for the zero-phase component of the secondary winding 1300. A zero-phase component Iz of Iu, Iv and Iw is proportional to time integration of the voltage difference. Therefore, the zero-phase component Iz of Iu, Iv and Iw can be controlled by controlling a zero-phase DC component of Varmu, Varmv and Varmw. A sum of zero-phase component of Iu, Iv and Iw is the ID.

Figure 16:
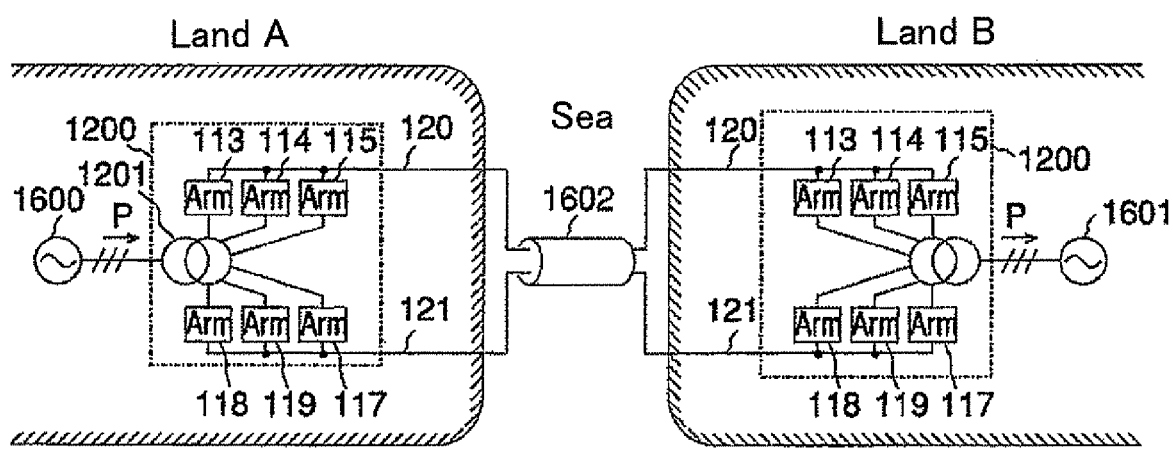
FIG. 16 is an example of a DC transmission system to which the fifth embodiment of the present invention is applied.

FIG. 16 is an example of a DC transmission system to which the power conversion device 1200 based on the present embodiment is applied. The power conversion device 1200 on land A is interconnected with a three-phase power system 1600. The power conversion device 1200 on land B is interconnected with a three-phase power system 1601. Output terminals 120 and 121 of the two power conversion devices 1200 are connected by a submarine cable, and electric power is transmitted back and forth between the land A and the land B.

<Sixth Embodiment>

Figure 17:
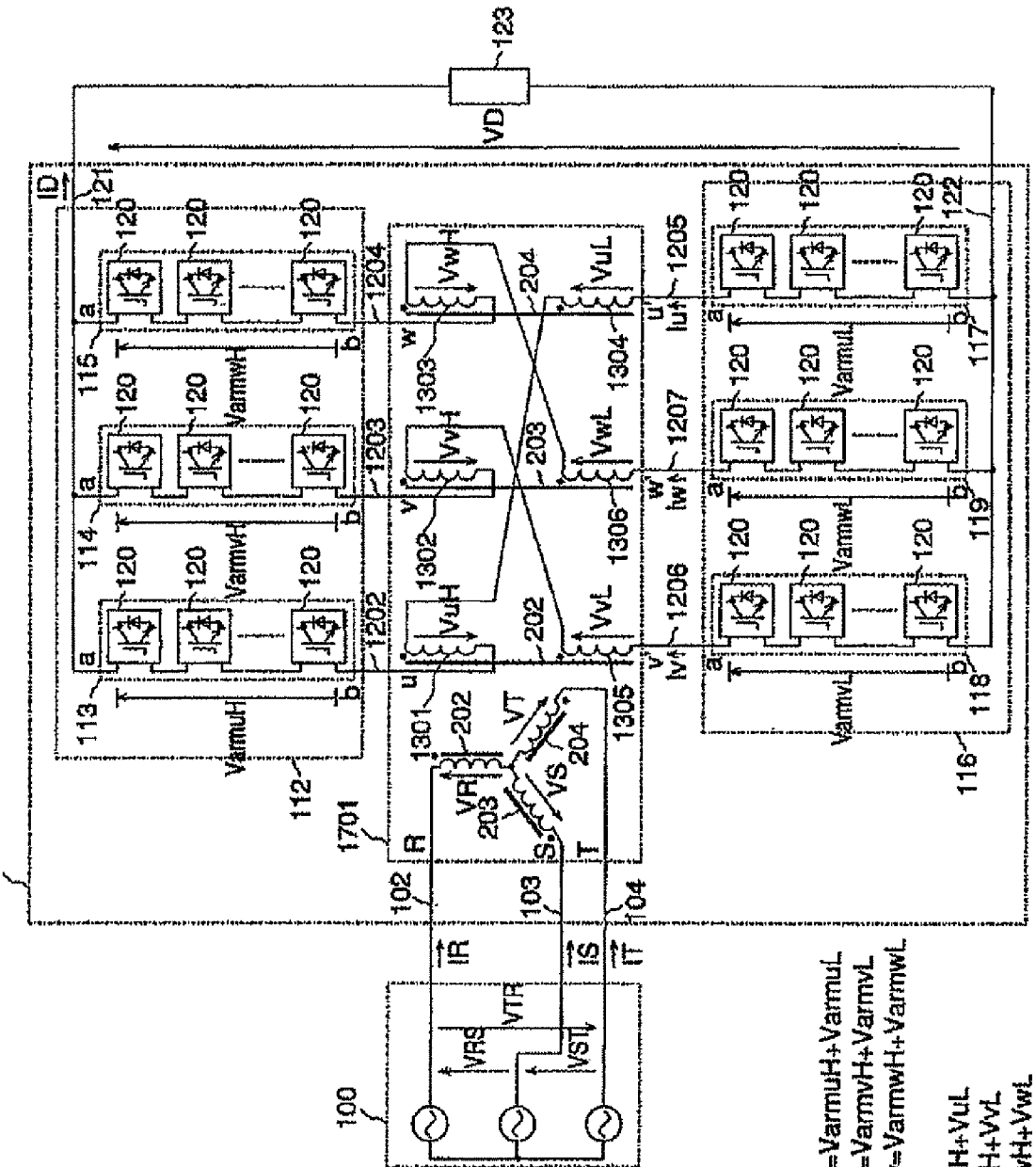
FIG. 17 is a circuit diagram showing a sixth embodiment of the present invention.

FIG. 17 is a circuit diagram showing a sixth embodiment of the present invention. In the foregoing fifth embodiment, the primary winding of the transformer is delta-connected. However, in the sixth embodiment, the primary winding of a transformer is star-connected and obtains effects identical to those of the fifth embodiment.

Below, an explanation will be given of only a part of the configuration of the sixth embodiment different from the fifth embodiment.

A positive converter group 112 of FIG. 17 is identical to the positive converter group 112 of the first embodiment (FIG. 1). In addition, a negative converter group 116 of FIG. 17 is identical to the negative converter group 116 of the first embodiment (FIG. 1).

Figure 18:
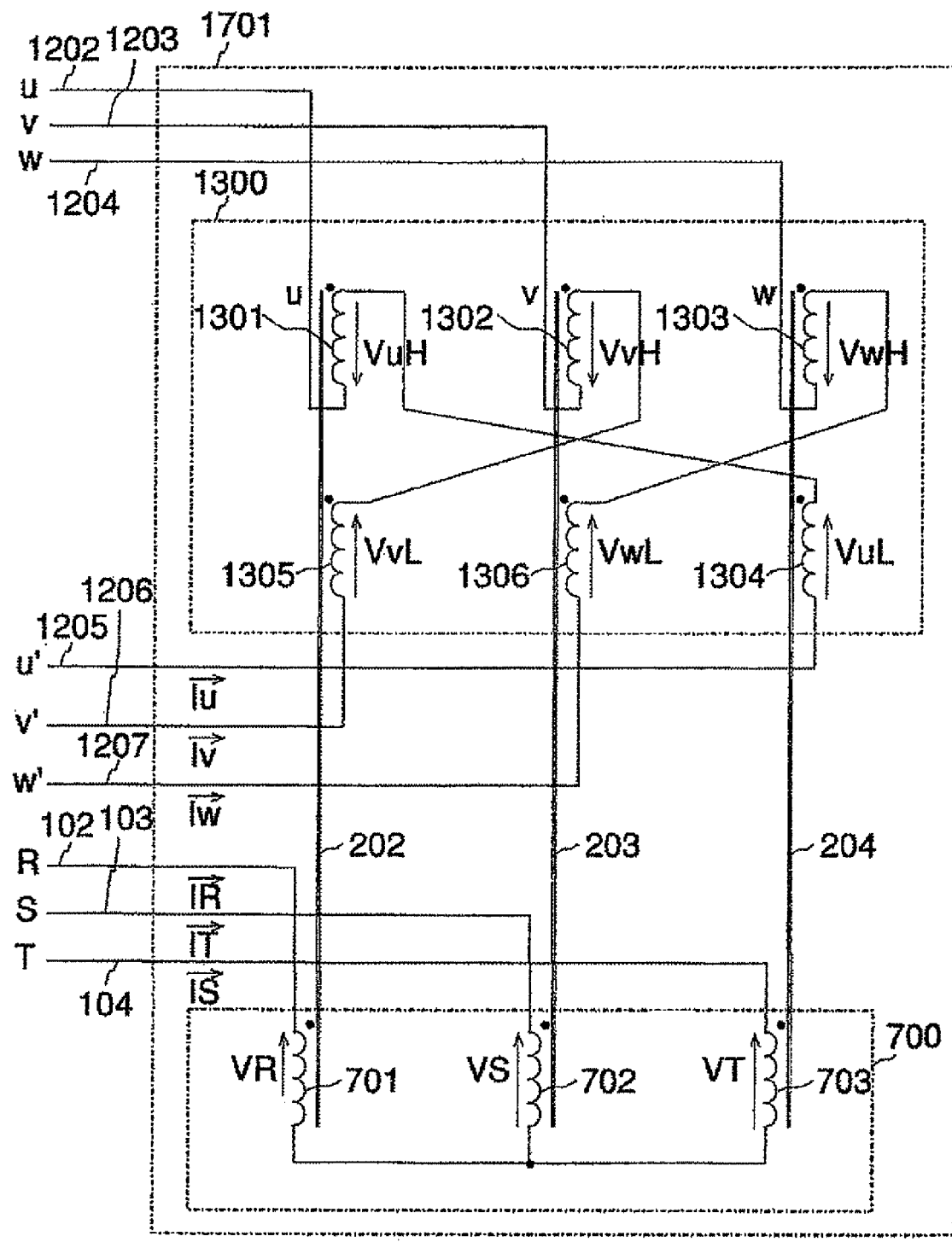
FIG. 18 is a transformer in the sixth embodiment of the present invention.

FIG. 18 shows a polarity of a magnetomotive force that is generated in each iron core by each winding of the transformer 1701, and a wire connection of the each winding. The transformer 1701 includes iron cores 202 to 204, and these iron cores 202 to 204 configure a three-legged core. A primary winding 700 of FIG. 18 is identical to the primary winding 700 of FIG. 7 of the second embodiment. In addition, a secondary winding 1300 of FIG. 18 is identical to the secondary winding 1300 of FIG. 13 of the fifth embodiment.

<Seventh Embodiment>

Figure 19:
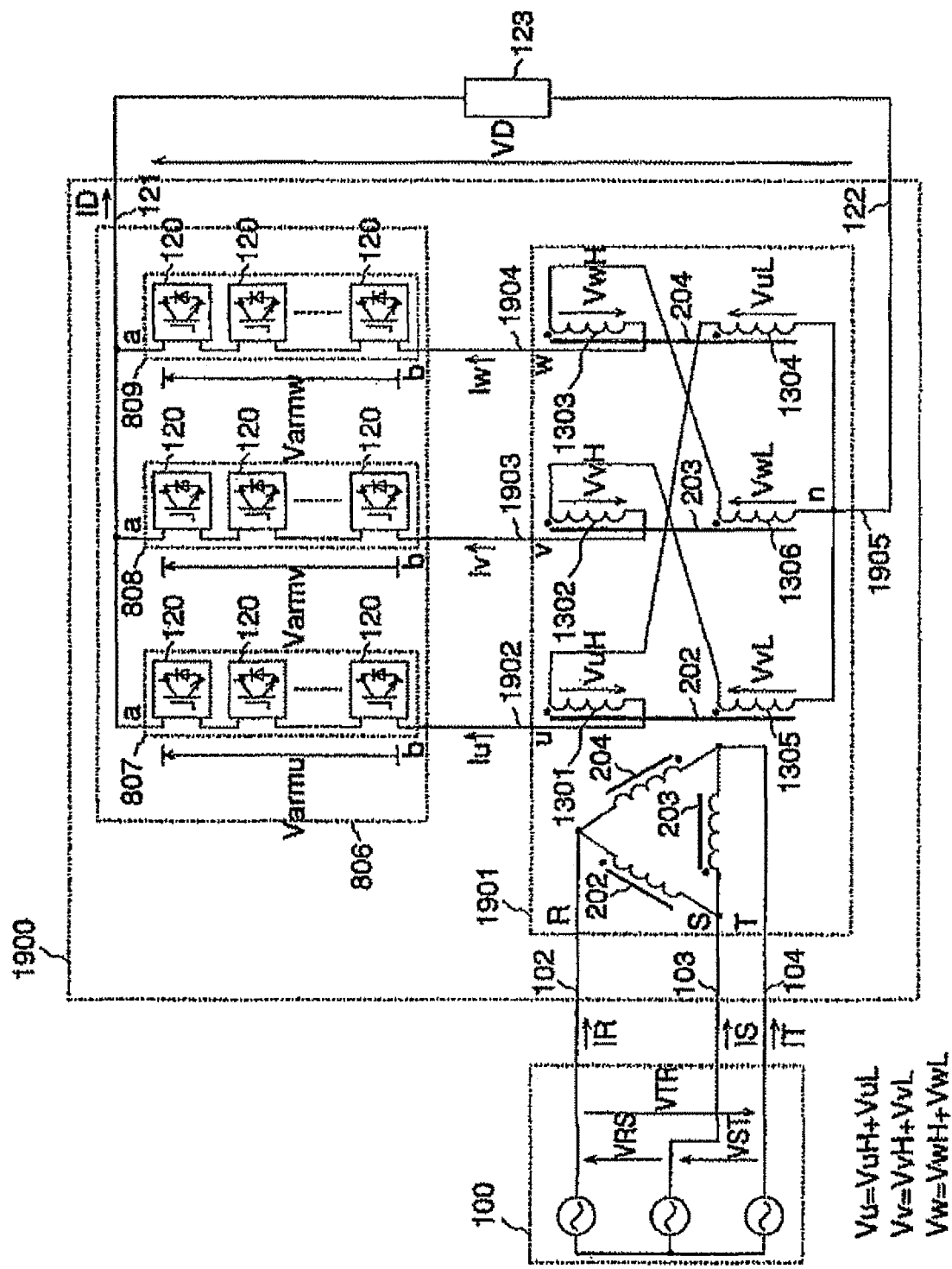
FIG. 19 is a circuit diagram showing a seventh embodiment of the present invention.

FIG. 19 is a circuit diagram showing a seventh embodiment of the present invention. The seventh embodiment is a modification of the fifth embodiment. In the fifth embodiment, two converter groups on the positive side and the negative side are used. However, in the seventh embodiment, only one converter group is used.

In the seventh embodiment, effects identical to those of the fifth embodiment can be obtained, and the number of terminals of the transformer can be reduced from nine terminals to five terminals as with the third embodiment.

Below, an explanation will be given of only a part of configuration of the seventh embodiment different from the fifth embodiment.

A converter group 806 of FIG. 19 is identical to the converter group 806 of FIG. 8 of the third embodiment.

The transformer 1901 includes seven terminals in total that are the R-phase terminal 102, the S-phase terminal 103, the T-phase terminal 104, an u-phase terminal 1902, a v-phase terminal 1903, a w-phase terminal 1904 and a neutral point terminal 1905.

Figure 20:
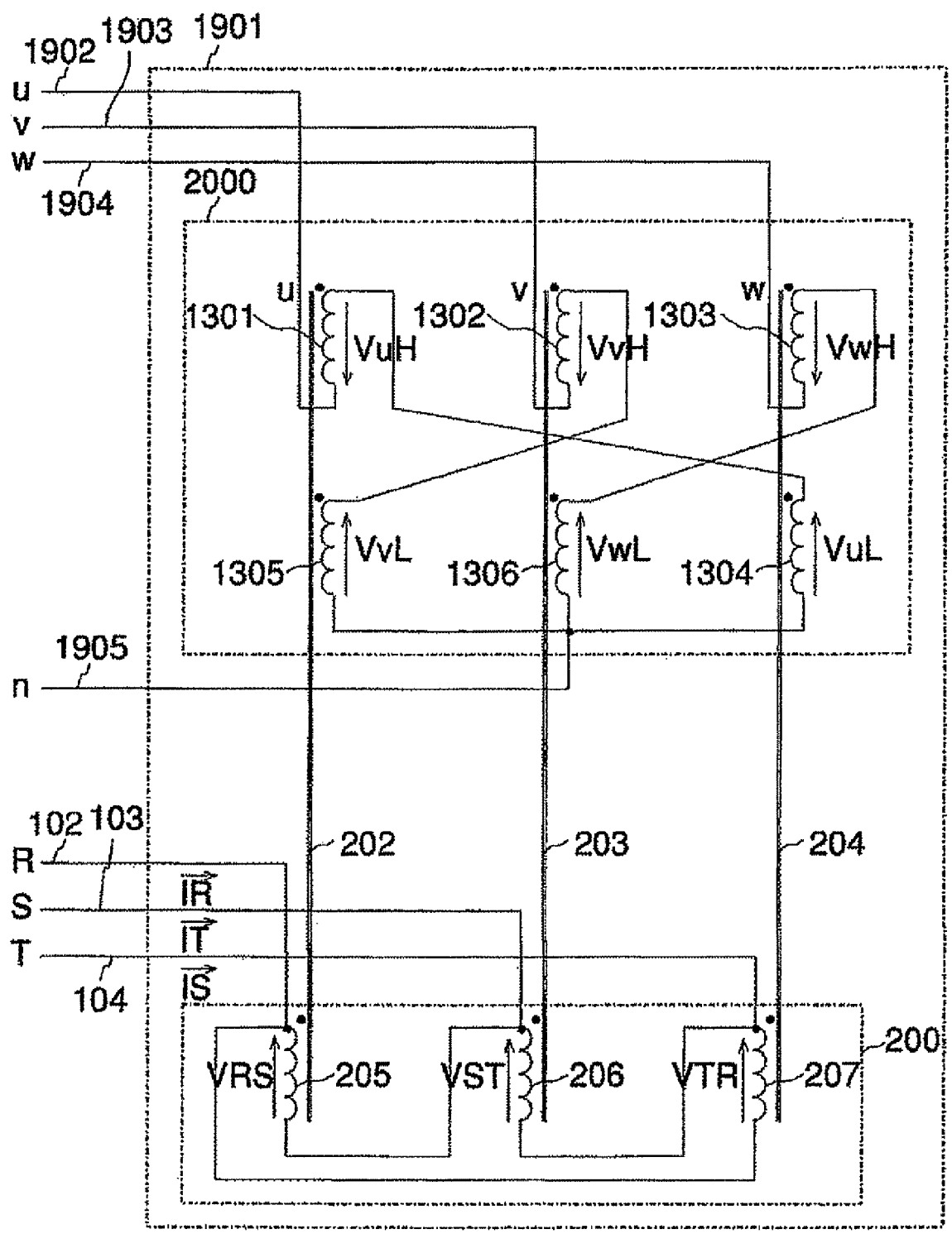
FIG. 20 is a transformer in the seventh embodiment of the present invention.

FIG. 20 shows a polarity of a magnetomotive force that is generated in each iron core by each winding of the transformer 1901, and a wire connection of the each winding. The transformer 1901 includes iron cores 202 to 204, and these iron cores 202 to 204 configure a three-legged core. A primary winding 200 of FIG. 20 is identical to the primary winding 200 of FIG. 2 of the first embodiment.

A u-phase positive winding 1301, a v-phase positive winding 1302, a w-phase positive winding 1303, a u-phase negative winding 1304, a v-phase negative winding 1305 and a w-phase negative winding 1306 that configure secondary winding 2000 of FIG. 20 are identical to the u-phase positive winding 1301, the v-phase positive winding 1302, the w-phase positive winding 1303, the u-phase negative winding 1304, the v-phase negative winding 1305 and the w-phase negative winding 1306 of FIG. 13 of the fifth embodiment.

However, the u-phase negative winding 1304, the v-phase negative winding 1305 and the w-phase negative winding 1306 are star-connected, and a neutral point n is drawn out outside the transformer 1901 as a neutral point terminal 1905.

<Eighth Embodiment>

An explanation will be given of an eighth embodiment embodying the present invention. The eighth embodiment is a modification of the seventh embodiment. In the seventh embodiment, the primary winding of the transformer is delta-connected. However, in the eighth embodiment, the primary winding is star-connected, and effects identical to those of the seventh embodiment are obtained.

Below, an explanation will be given of only a part of configuration of the eighth embodiment different from the seventh embodiment.

Figure 21:
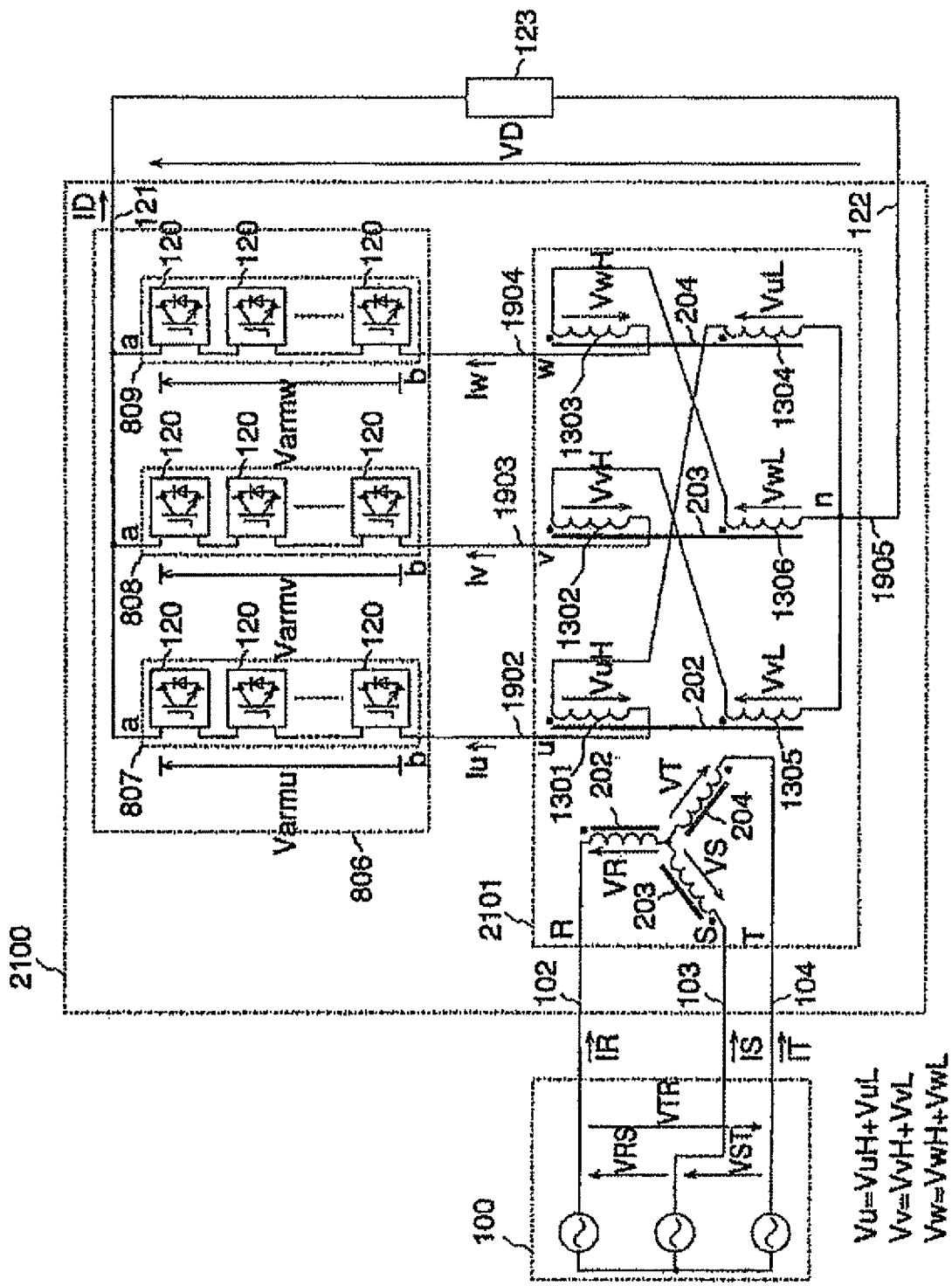
FIG. 21 is a circuit diagram showing an eighth embodiment of the present invention.

FIG. 21 is a circuit diagram showing an eighth embodiment of the present invention.

A converter group 806 of FIG. 21 is identical to the converter group 806 of FIG. 8 of the third embodiment.

The transformer 2100 includes seven terminals in total that are the R-phase terminal 102, the S-phase terminal 103, the T-phase terminal 104, an u-phase terminal 1902, a v-phase terminal 1903, a w-phase terminal 1904 and a neutral point terminal 1905.

Figure 22:
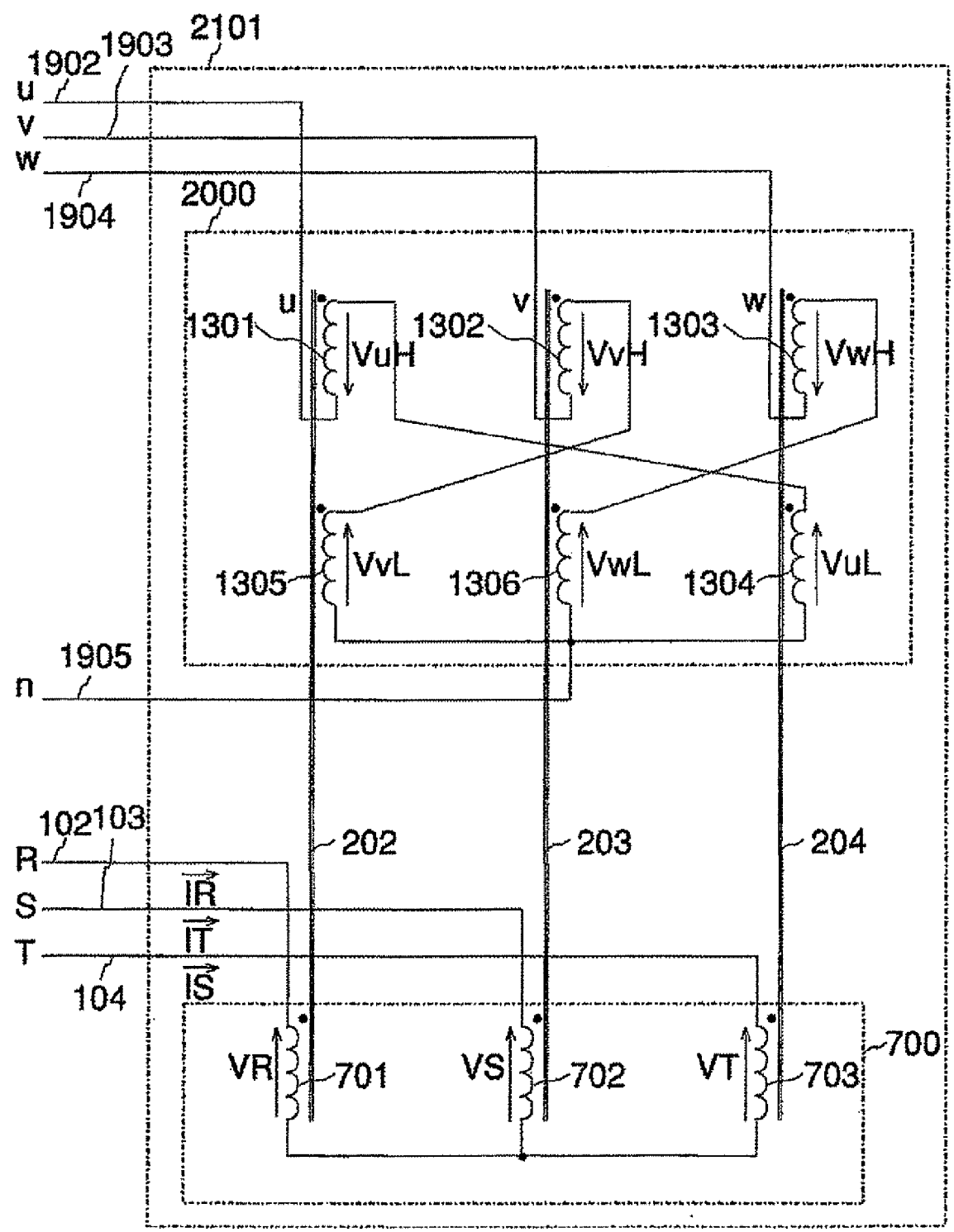
FIG. 22 is a transformer in the eighth embodiment of the present invention.

FIG. 22 shows a polarity of a magnetomotive force that is generated in each iron core by each winding of the transformer 2101, and a wire connection of the each winding. The transformer 2101 includes iron cores 202 to 204, and these iron cores 202 to 204 configure a three-legged core. A primary winding 700 of FIG. 22 is identical to the primary winding 700 of FIG. 7 of the second embodiment. A secondary winding 2000 of FIG. 22 is identical to the secondary winding 2000 of FIG. 20 of the seventh embodiment.

<Ninth Embodiment>

An explanation will be given of a ninth embodiment embodying the present invention. In the fifth to eighth embodiments, the secondary winding of the transformer for each phase is divided into two, and connected so that a magnetomotive force to be caused by the zero-phase current becomes zero. On the other hand, in the ninth embodiment, the effects identical to those of the seventh embodiment can be obtained by using a compensating winding which compensates the magnetomotive force to be cased by the zero-phase current.

Below, an explanation will be given of only a part of configuration of the ninth embodiment different from the seventh embodiment.

Figure 23:
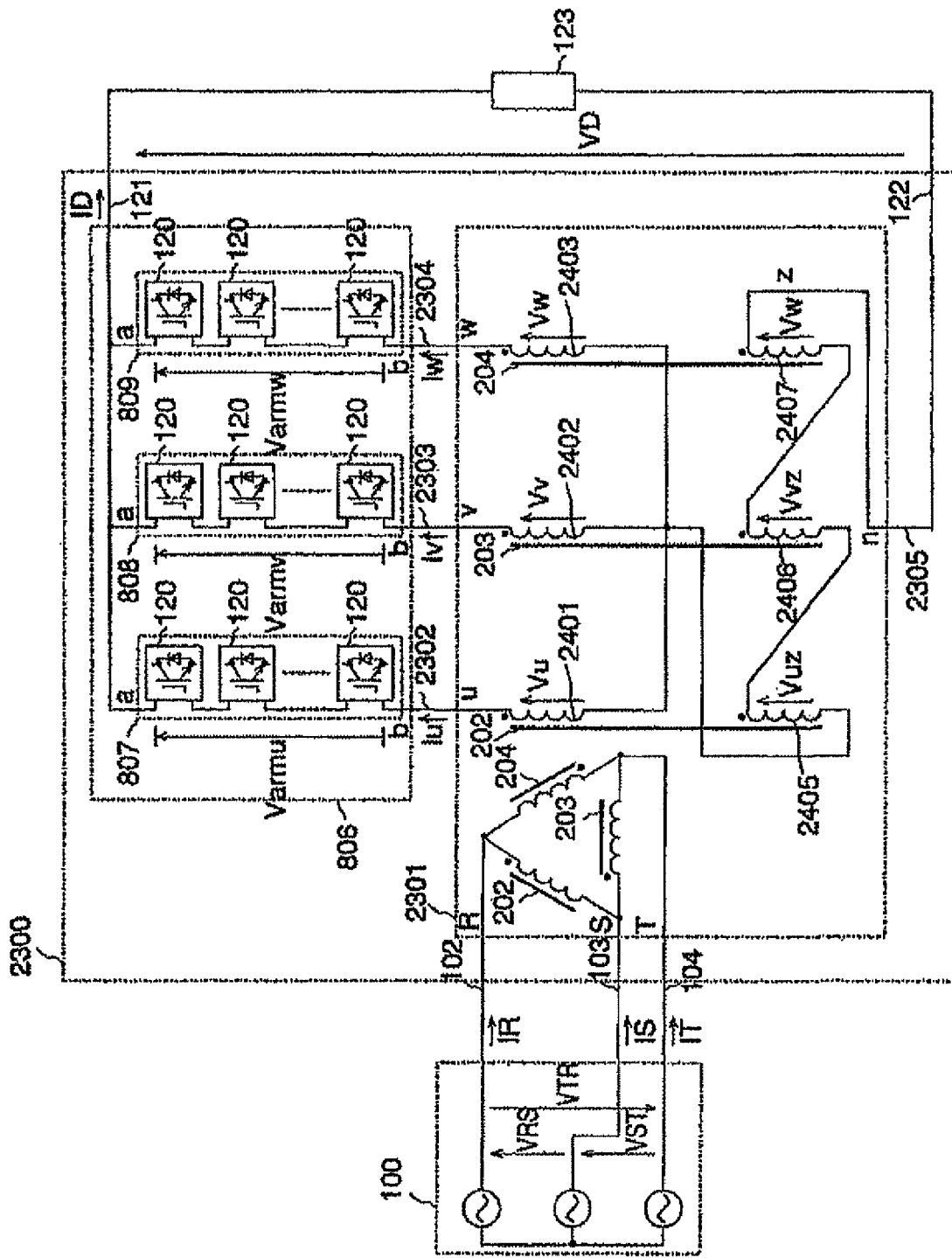
FIG. 23 is a circuit diagram showing a ninth embodiment of the present invention.

FIG. 23 is a circuit diagram showing a ninth embodiment of the present invention. A power conversion device 2300 is interconnected with the three-phase power system 100 through the three-phase AC terminals 102 to 104, and transmits and receives active/reactive power to and from the three-phase power system 100. The power conversion device 2300 consists of a transformer 2301 and a converter group 806.

The converter group 806 of FIG. 23 is identical to the converter group 806 of FIG. 8 of the third embodiment.

A transformer 2301 includes seven terminals in total that are the R-phase terminal 102, the S-phase terminal 103, the T-phase terminal 104, an u-phase terminal 2302, a v-phase terminal 2303, a w-phase terminal 2304 and a compensating winding terminal 2305.

Figure 24:
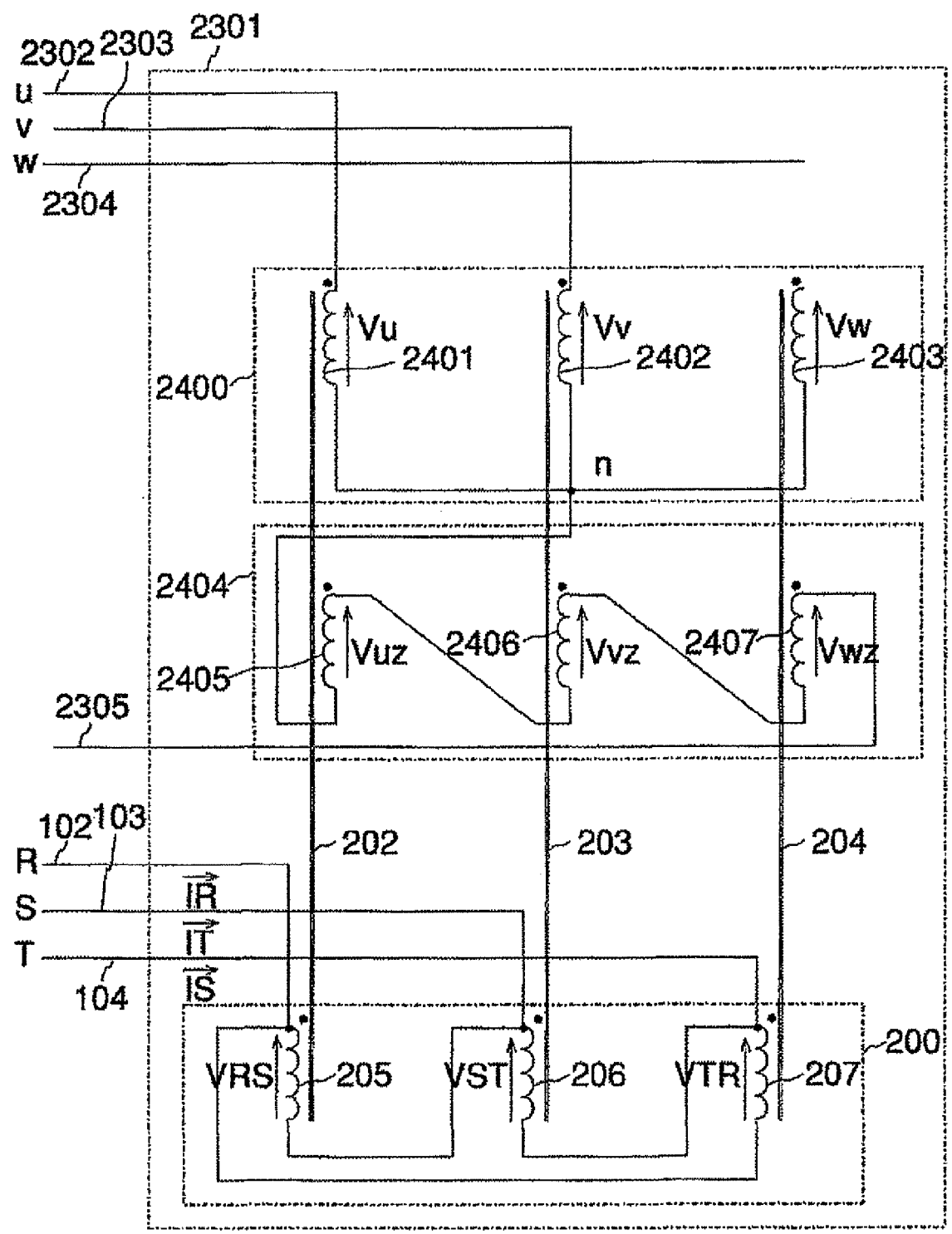
FIG. 24 is a transformer in the ninth embodiment of the present invention.

FIG. 24 shows a polarity of a magnetomotive force that is generated in each iron core by each winding of the transformer 2301, and a wire connection of the each winding. The transformer 2301 includes iron cores 202 to 204, a primary winding 200, a secondary winding 2400 and a compensating winding 2404. The iron cores 202 to 204 configure a three-legged core.

The primary winding 200 is identical to the primary winding 200 of FIG. 1 of the first embodiment.

The secondary winding 2400 includes a u-phase winding 2401, a v-phase winding 2402 and a w-phase winding 2403. The secondary winding 2400 has substantially the same configuration with the secondary winding 900 in FIG. 9 of the third embodiment except that the neutral point n is connected to the compensating winding 2404.

The compensating winding 2404 includes a u-phase compensating winding 2405, a v-phase compensating winding 2406 and a w-phase compensating winding 2407. The number of winding of the compensating winding 2404 is set to ⅓ of that of the secondary winding 2400.

The u-phase compensating winding 2405 is wound on the iron core 202. The v-phase compensating winding 2406 is wound on the iron core 203. In addition, the w-phase compensating winding 2407 is wound on the iron core 204.

The u-phase compensating winding 2405, the v-phase compensating winding 2406 and the w-phase compensating winding 2407 are connected in series.

One end of the compensating winding 2404 is connected to the negative output terminal 122. Therefore, a current ID flowing in the load device 123 flows in the compensating winding 2404.

A magnetomotive force that is generated in the iron core 202 by the current ID flowing in the u-phase compensating winding 2405, a magnetomotive force that is generated in the iron core 203 by the current ID flowing in the v-phase compensating winding 2406 and a magnetomotive force that is generated in the iron core 204 by the current ID flowing in the w-phase compensating winding 2407 have substantially the same strength of same polarity.

The current ID flowing in the compensating winding 2404 is branched at the neutral point n, and flows as a zero-phase component Iz of the secondary winding 2400. That is, Iz=ID/3.

A magnetomotive force that is generated in the iron core 202 by Iz flowing in the u-phase winding 2401 and a magnetomotive force that is generated in the iron core 202 by Iz flowing in the u-phase compensating winding 2405 have substantially the same strength with reverse polarity to each other, thereby resulting in cancellation of the magnetomotive force.

A magnetomotive force that is generated in the iron core 203 by Iz flowing in the v-phase winding 2402 and a magnetomotive force that is generated in the iron core 203 by Iz flowing in the v-phase compensating winding 2406 have substantially the same strength with reverse polarity to each other, thereby resulting in cancellation of the magnetomotive force.

A magnetomotive force that is generated in the iron core 204 by Iz flowing in the w-phase winding 2403 and a magnetomotive force that is generated in the iron core 204 by Iz flowing in the w-phase compensating winding 2407 have substantially the same strength with reverse polarity to each other, thereby resulting in cancellation of the magnetomotive force.

Therefore, as with the fifth to eighth embodiments, even if the current ID is a DC current, a direct current magnetomotive force becomes substantially zero. Then, a direct current bias magnetism of the iron core is hardly generated.

<Tenth Embodiment>

An explanation will be given of a tenth embodiment embodying the present invention. In the ninth embodiment, the primary winding of the transformer is delta-connected. However, in the tenth embodiment, the primary winding is star-connected, and the effects identical to those of the ninth embodiment are obtained.

Below, an explanation will be given of only a part of configuration of the tenth embodiment different from the ninth embodiment.

Figure 25:
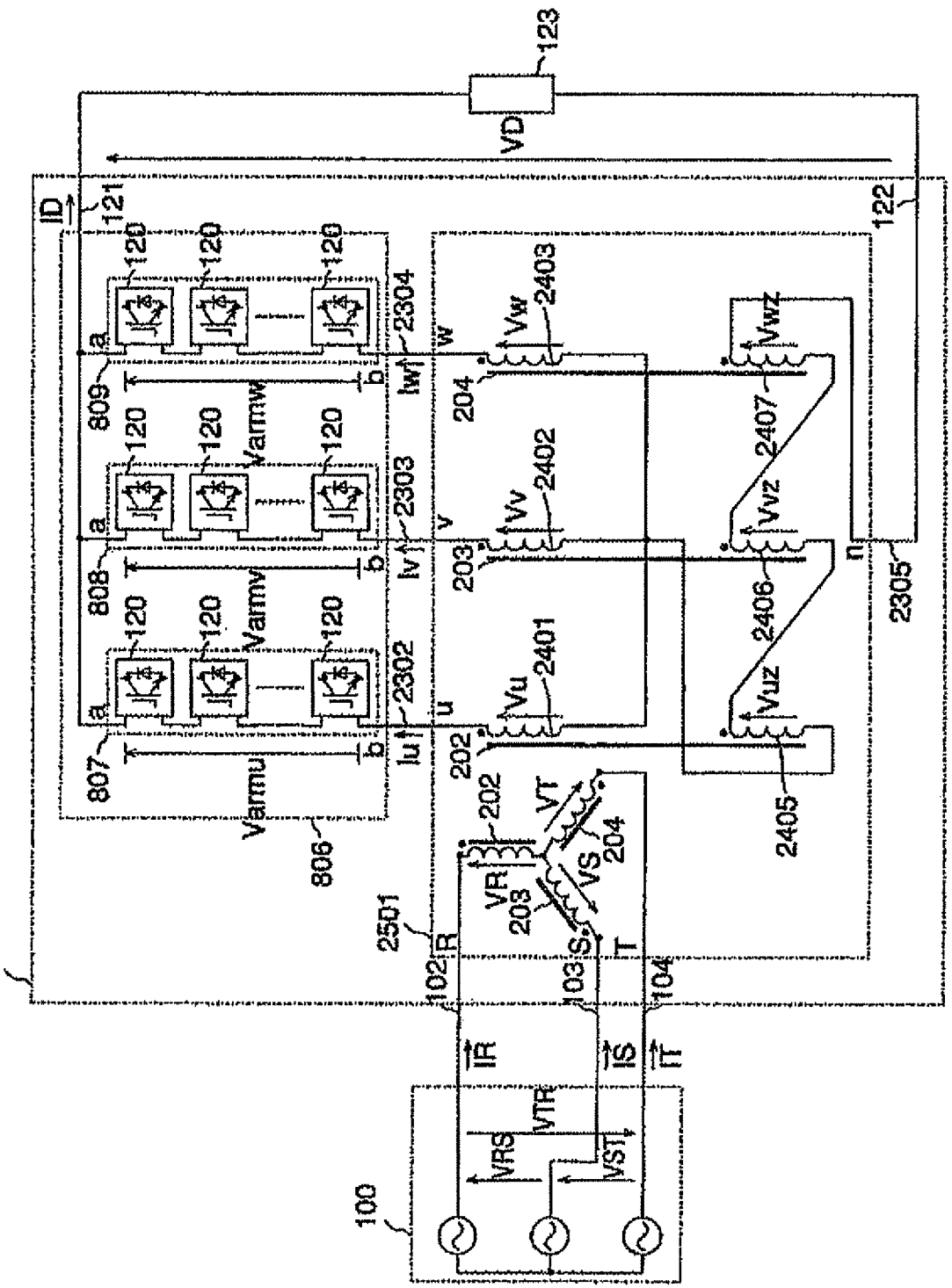
FIG. 25 is a circuit diagram showing a tenth embodiment of the present invention.

FIG. 25 is a circuit diagram showing the tenth embodiment of the present invention. The power conversion device 2500 is interconnected with the three-phase power system 100 through the three-phase AC terminals 102 to 104, and transmits and receives active/reactive power to and from the three-phase power system 100. The power conversion device 2500 consists of a transformer 2501 and a converter group 806.

A converter group 806 of FIG. 25 is identical to the converter group 806 of FIG. 8 of the third embodiment.

Figure 26:
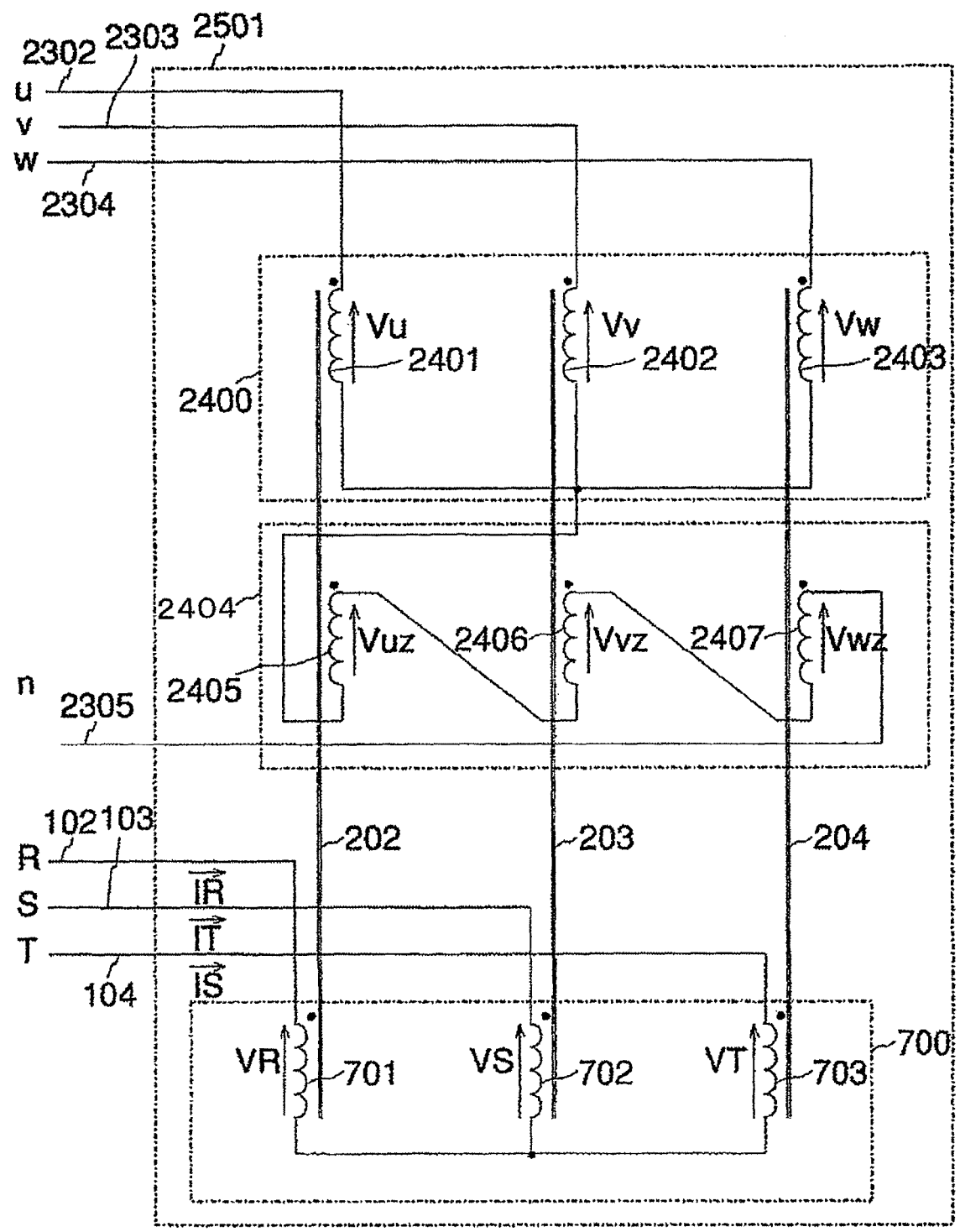
FIG. 26 is a transformer in the tenth embodiment of the present invention.

FIG. 26 shows a polarity of a magnetomotive force that is generated in each iron core by each winding of the transformer 2501, and a wire connection of the each winding. The transformer 2501 includes iron cores 202 to 204, a primary winding 700, a secondary winding 2400 and a compensating winding 2404. The iron cores 202 to 204 configure a three-legged core.

The primary winding 700 of FIG. 26 is identical to the primary winding 700 of FIG. 7 of the second embodiment.

The secondary winding 2400 of FIG. 26 is identical to the secondary winding 2400 of FIG. 24 of the ninth embodiment.

<Eleventh Embodiment>

An explanation will be given of an eleventh embodiment embodying the present invention. The eleventh embodiment is a modification of the fifth embodiment, and in the eleventh embodiment, the effects identical to those of the fifth embodiment can be obtained.

Below, an explanation will be given of only a part of configuration of the eleventh embodiment different from the fifth embodiment.

Figure 27:
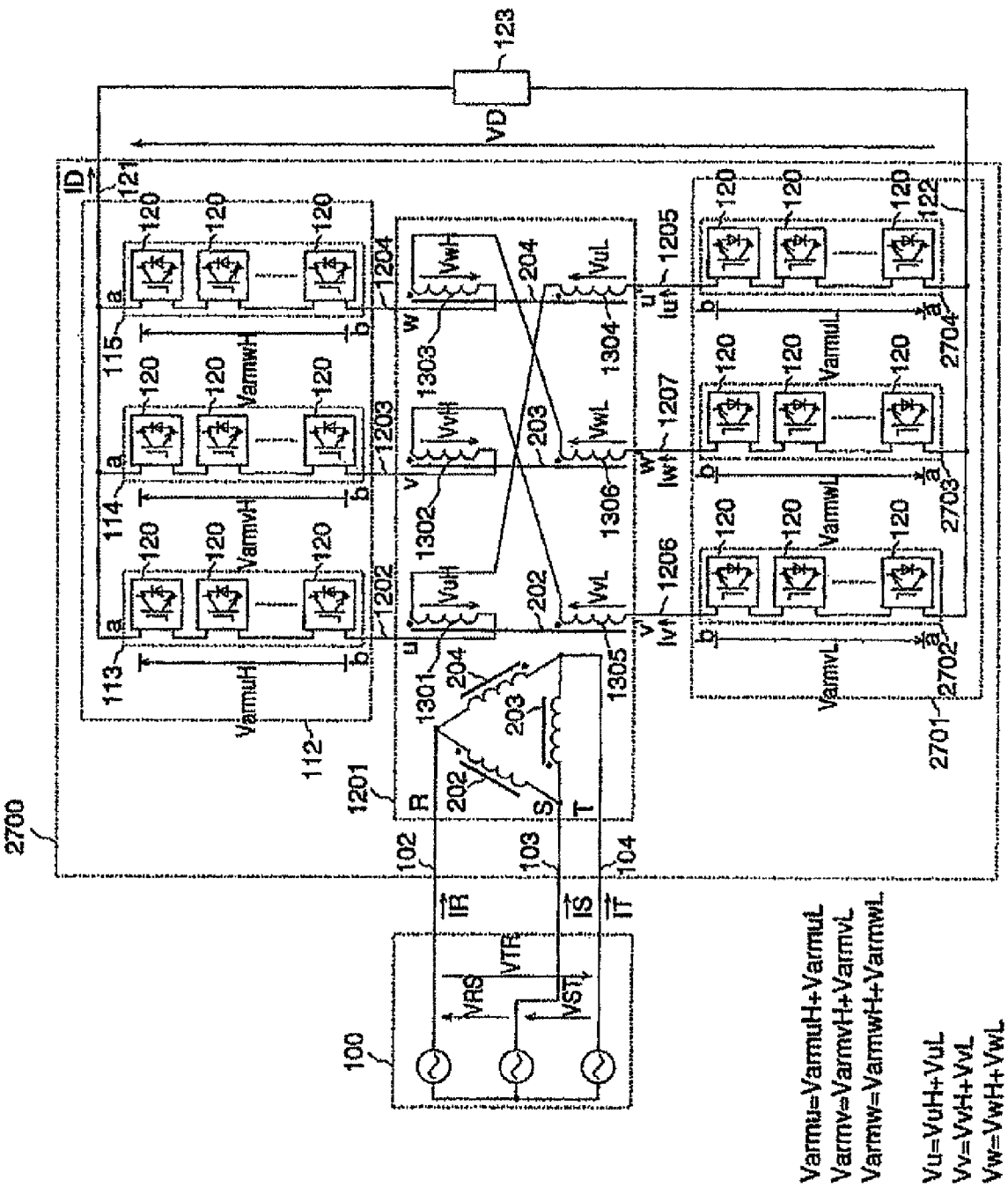
FIG. 27 is a circuit diagram showing an eleventh embodiment of the present invention.

FIG. 27 is a circuit diagram showing the eleventh embodiment of the present invention. In comparison with FIG. 12 of the fifth embodiment, polarities of the u-phase negative converter arm 117, v-phase negative converter arm 118 and the w-phase negative converter arm 118 of FIG. 12 of the fifth embodiment are reversed in the eleventh embodiment.

Similarly, in the first, second, fifth and sixth embodiments, the polarities of the u-phase negative converter arm 117, v-phase negative converter arm 118 and the w-phase negative converter arm 118 may be reversed.

<Twelfth Embodiment>

Other embodiments of the present invention will be explained below, using drawings.

An explanation will be given of a twelfth embodiment embodying the present invention.

Figure 28:
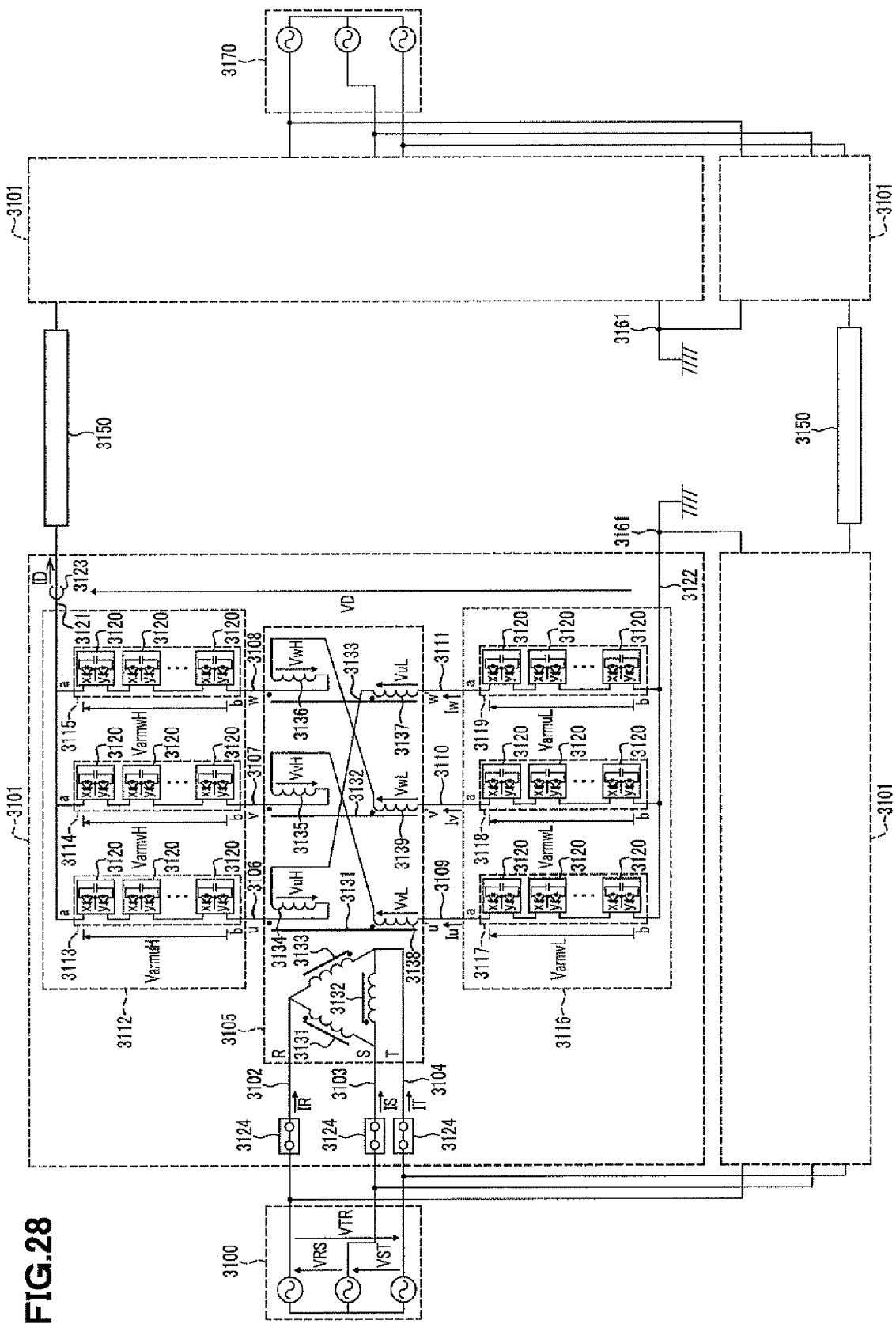
FIG. 28 is a circuit diagram showing a twelfth embodiment of the present invention.

FIG. 28 is a circuit diagram of a DC transmission system using a power conversion device of the present invention.

First, a configuration of the DC transmission system of the present invention will be explained. The DC transmission system includes three-phase AC power systems 3100, 3170 and two sets of two power conversion devices 3101, each set being interconnected with each of the three-phase AC power systems 3100, 3170, and one of the two DC output terminals of each of the two power conversion devices 3101 that are interconnected with each of the three-phase AC power systems 3100, 3170 is connected to a DC transmission cable 3150 and the other of the two DC output terminals is grounded.

The DC transmission system of the present invention converts AC power from the three-phase AC power systems 3100 and 3170 to DC power using the two power conversion devices 3101 interconnected with each three-phase AC power system, and transmits electric power in one direction or both directions through the DC transmission cable 3150.

Next, an explanation will be given of a configuration of the power conversion device 3101. The power conversion device 3101 includes a transformer 3105, a positive converter group 3112 and a negative converter group 3116.

In the specification, each phase of the three-phase AC power system 3100 is called an R-phase, an S-phase and a T-phase. In addition, a current flowing in each phase of the three-phase AC power system 3100 is called a system current and denoted by IR, IS and IT.

Next, an explanation will be given of a configuration of the transformer 3105, using FIG. 28 and FIG. 29.

The transformer 3105 includes nine terminals in total that are an R-phase terminal 3102, an S-phase terminal 3103, a T-phase terminal 3104, an u-phase positive terminal 3106, a v-phase positive terminal 3107, a w-phase positive terminal 3108, an u-phase negative terminal 3109, a v-phase negative terminal 3110 and a w-phase negative terminal 3111.

Figure 29:
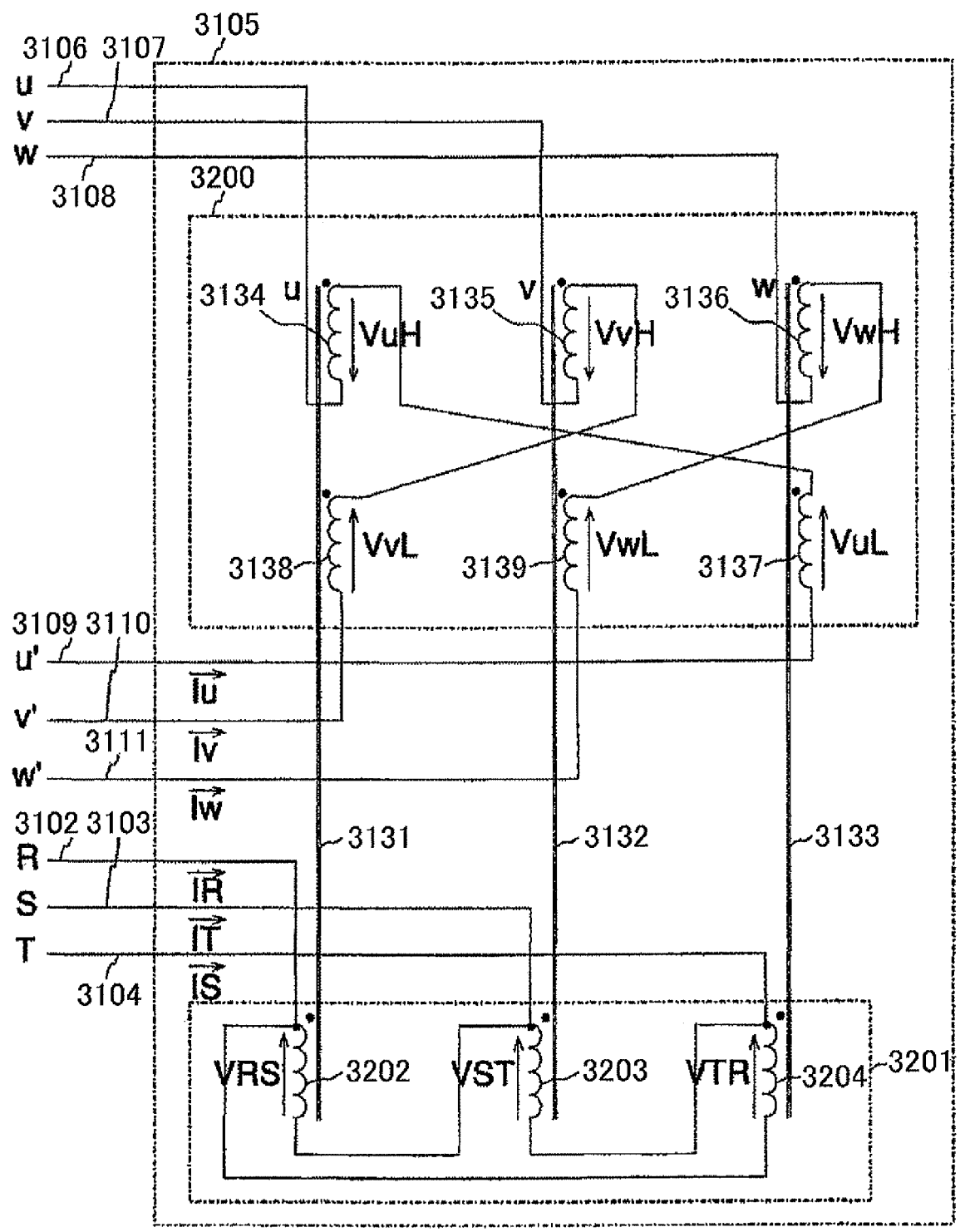
FIG. 29 is a transformer in the twelfth embodiment of the present invention.

FIG. 29 shows a polarity of a magnetomotive force that is generated in each iron core by each winding of the transformer 3105, and a wire connection of the each winding. The transformer 3105 includes iron cores 3131 to 3133, and these iron cores 3131 to 3133 configure a three-legged core. The primary winding is delta-connected, and windings 3202 to 3204 between the R-phase and the S-phase, the S-phase and the T-phase, and the T-phase and the R-phase, respectively are wound on respective iron cores 3131 to 3133. The number of winding of each of the windings 3202 to 3204 is substantially the same.

The u-phase positive winding 3134 and the u-phase negative winding 3137 are electrically connected in series. The u-phase positive winding 3134 is wound on the iron core 3131, and the u-phase negative winding 3137 is wound on the iron core 3133. Meanwhile, the wire is connected so that a magnetomotive force to be generated in the iron core 3131 by the u-phase positive winding 3134 and the magnetomotive force to be generated in the iron core 3133 by the u-phase negative winding 3137 have substantially the same strength with reverse polarity to each other.

The v-phase positive winding 3135 and the v-phase negative winding 3138 are electrically connected in series. The v-phase positive winding 3135 is wound on the iron core 3132, and the v-phase negative winding 3138 is wound on the iron core 3131. Meanwhile, the wire is connected so that a magnetomotive force to be generated in the iron core 3132 by the v-phase positive winding 3135 and the magnetomotive force to be generated in the iron core 3131 by the v-phase negative winding 3138 have substantially the same strength with reverse polarity to each other.

The w-phase positive winding 3136 and the w-phase negative winding 3139 are electrically connected in series. The w-phase positive winding 3136 is wound on the iron core 3133, and the w-phase negative winding 3139 is wound on the iron core 3132. Meanwhile, the wire is connected so that a magnetomotive force to be generated in the iron core 3133 by the w-phase positive winding 3136 and the magnetomotive force to be generated in the iron core 3132 by the w-phase negative winding 3139 have substantially the same strength with reverse polarity to each other.

In the specification, the u-phase positive winding 3134 and the u-phase negative winding 3137 are generally called a u-phase winding. In addition, the v-phase positive winding 3135 and the v-phase negative winding 3138 are generally called a v-phase winding. Similarly, the w-phase positive winding 3136 and the w-phase negative winding 3139 are generally called a w-phase winding.

In the specification, a voltage between both ends of the u-phase positive winding 3134 is described by VuH, a voltage between both ends of the v-phase positive winding 3135 is denoted by VvH, a voltage between both ends of the w-phase positive winding 3136 is denoted by VwH, a voltage between both ends of the u-phase negative winding 3137 is denoted by VuL, a voltage between both ends of the v-phase negative winding 3138 is denoted by VvL and a voltage between both ends of the w-phase negative winding 3139 is denoted by VwL.

In addition, a sum of VuH and VuL is called a u-phase voltage Vu, a sum of VvH and VvL is called a v-phase voltage Vv and a sum of VwH and VwL is called a w-phase voltage Vw.

In addition, a voltage applied between a positive DC output terminal 3121 and a negative DC output terminal 3122 of the power conversion device 3101 is denoted by VD, and a current flowing in the positive DC output terminal 3121 is denoted by ID.

Next, explanations will be given of configurations of the positive converter group 3112 and the negative converter group 3116.

The positive converter group 3112 consists of a u-phase positive converter arm 3113, a v-phase positive converter arm 3114 and a w-phase positive converter arm 3115. In addition, the negative converter group 3116 consists of a u-phase negative converter arm 3117, a v-phase negative converter arm 3118 and a w-phase negative converter arm 3119.

Each of the converter arms 3113 to 3115 and 3117 to 3119 has a a-terminal and a b-terminal.

In the specification, a voltage of the a-terminal against a standard voltage of the b-terminal is called an arm voltage. In addition, the each of the converter arms 3113 to 3115 and 3117 to 3119 is a circuit that cascade-connects one or a plurality of unit chopper cells shown in FIG. 30.

The a-terminal of the u-phase positive converter arm 3113 is connected to the positive output terminal 3121, and the b-terminal is connected to the u-phase positive terminal 3106 of the transformer 3105. In addition, in the specification, the arm voltage of the u-phase positive converter arm 3113 is denoted by VarmuH.

The a-terminal of the v-phase positive converter arm 3114 is connected to the positive output terminal 3121, and the b-terminal is connected to the v-phase positive terminal 3107 of the transformer 3105. In addition, in the specification, the arm voltage of the v-phase positive converter arm 3114 is denoted by VarmvH.

The a-terminal of the w-phase positive converter arm 3115 is connected to the positive output terminal 3121, and the b-terminal is connected to the w-phase positive terminal 3108 of the transformer 3105. In addition, in the specification, the arm voltage of the w-phase positive converter arm 3115 is denoted by VarmwH.

The a-terminal of the u-phase negative converter arm 3117 is connected to the u-phase negative terminal 3109, and the b-terminal is connected to the negative output terminal 3122. In addition, in the specification, the arm voltage of the u-phase negative converter arm 3117 is denoted by VarmuL.

The a-terminal of the v-phase negative converter arm 3118 is connected to the v-phase negative terminal 3110, and the b-terminal is connected to the negative output terminal 3122. In addition, in the specification, the arm voltage of the v-phase negative converter arm 3118 is denoted by VarmvL.

The a-terminal of the w-phase negative converter arm 3119 is connected to the w-phase negative terminal 3111, and the b-terminal is connected to the negative output terminal 3122. In addition, in the specification, the arm voltage of the w-phase negative converter arm 3119 is denoted by VarmwL.

In the twelfth embodiment, a sum of VarmuH and VarmuL is denoted by u-phase arm voltage Varmu. In addition, a sum of VarmvH and VarmvL is denoted by v-phase arm voltage Varmv. Similarly, a sum of VarmwH and VarmwL is denoted by w-phase arm voltage Varmw.

In addition, in the twelfth embodiment, a current flowing in the u-phase positive converter arm 3113 and u-phase negative converter arm 3117 is denoted by u-phase arm current Iu, a current flowing in the v-phase positive converter arm 3114 and v-phase negative converter arm 3118 is denoted by v-phase arm current Iv, and a current flowing in the w-phase positive converter arm 3115 and w-phase negative converter arm 3119 is denoted by w-phase arm current Iw.

Next, an explanation will be given of a configuration of the unit chopper cell 3120, using FIG. 30.

Figure 30:
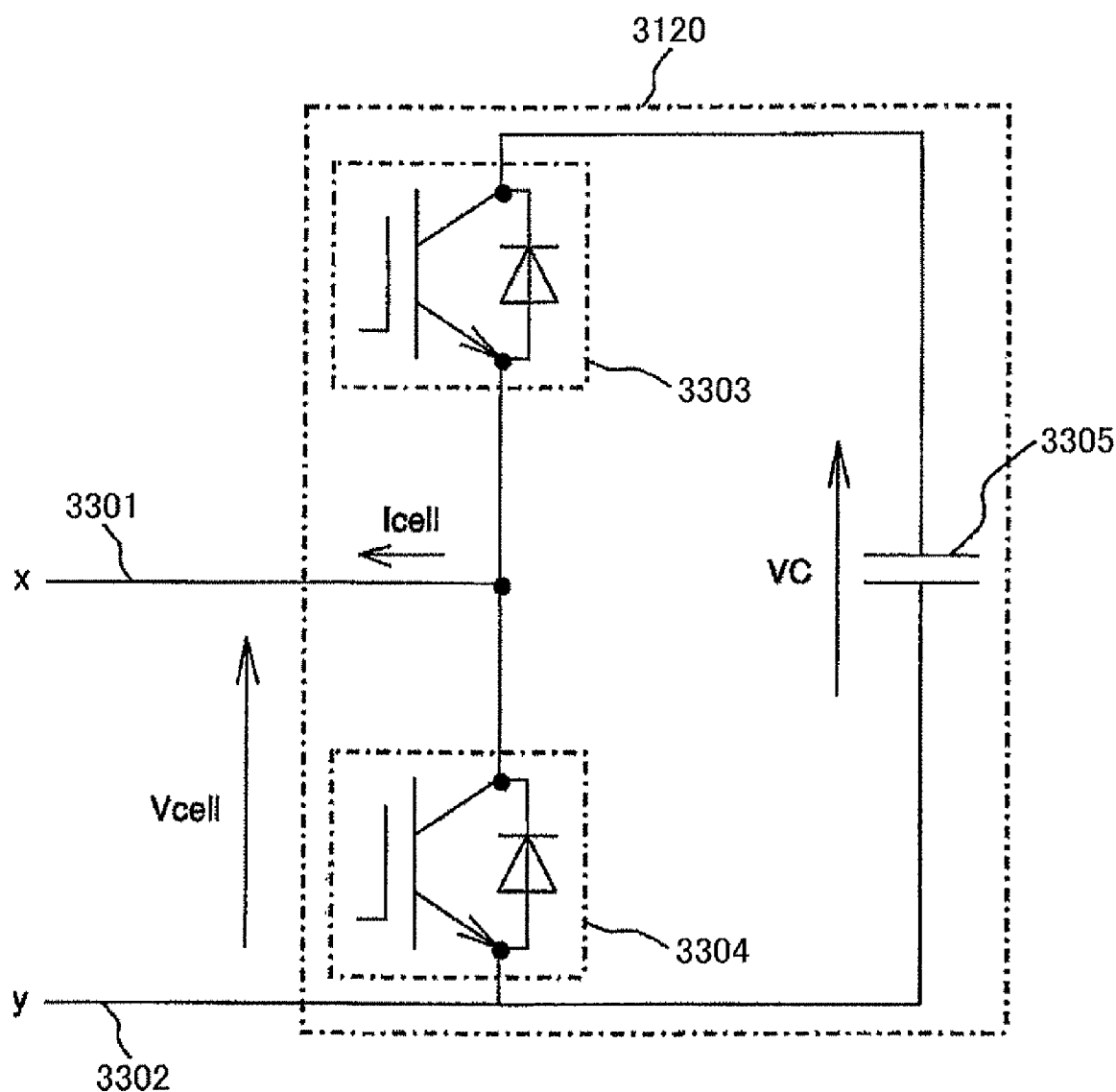
FIG. 30 is a unit chopper cell.

A unit chopper cell shown in FIG. 30 consists of a high-side switching device 3303, a low-side switching device 3304 and an energy storage device 3305. The switching devices 3303, 3304 are semiconductor switching devices represented by IGBT. In addition, the energy storage device 3305 is, for example, a capacitor or a battery. In the specification, a voltage of x-terminal 3301 against a standard voltage of y-terminal 3302 is denoted by a cell voltage Vcell of the unit chopper cell.

Next, operations of the power conversion devices 3101 will be explained for the following two cases.
(1) A case that the power conversion device 3101 receives active power from the three-phase system 100 and supplies DC power to the DC transmission cable 3150.
(2) A case that the power conversion device 3101 receives DC power from the DC transmission cable 3150 and supplies active power to the three-phase system 100.

Below, an explanation will be given of operations in the case that the power conversion device 3101 receives active power from the three-phase system 100 and supplies a DC power to the DC transmission cable 3150.

In the specification, voltages of the line voltages VRS, VST and VTR of the three-phase power system 100 converted to the voltages on the secondary side of the transformer are denoted by aVRS, aVST and aVTR. Here, a is a turn ratio of the secondary winding to the primary winding of the transformer.

Here, an explanation will be given of a relationship among voltages Vu, Vv, Vw of secondary winding of a transformer, arm voltages Varmu, Varmv, Varmw and a voltage VD to be applied between the positive DC output terminal 3121 and the negative DC output terminal 3122.

A relationship among Vu, Varmu and VD is expressed by the following formula.

$$Vu = VD - Varmu \qquad \text{[Number 1]}$$

A relationship among Vv, Varmv and VD is expressed by the following formula.

$$Vv = VD - Varmv \qquad \text{[Number 2]}$$

A relationship among Vw, Varmw and VD is expressed by the following formula.

$$Vw = VD - Varmw \qquad \text{[Number 3]}$$

According to the Numbers 1 to 3, the voltages Vu, Vv, Vw of the secondary winding of the transformer can be controlled by controlling the u-phase arm voltage Varmu, the v-phase arm voltage Varmv and the w-phase arm voltage Varmw.

If only phases of Vu, Vv and Vw are slightly delayed in comparison with the phases of aVRS, aVST and aVTR, while matching frequencies and amplitudes of Vu, Vv and Vw with those of aVRS, aVST and aVTR, an active current flows into the power conversion device 3101 from the three-phase AC power system 100.

Next, an explanation will be given about that the arm voltage can be controlled by a switching condition of a semiconductor switching device constituting the unit chopper cell 3120.

When the high-side switching device 3303 is ON and low-side switching device 3304 is OFF, the cell voltage Vcell is substantially equal to the voltage VC of the DC capacitor 3305 without depending on the current Icell.

When the high-side switching device 3303 is OFF and low-side switching device 3304 is ON, the cell voltage Vcell is substantially zero without depending on the current Icell.

When the high-side switching device 3303 and low-side switching device 3304 are both OFF, the cell voltage Vcell is determined depending on a polarity of the current Icell. If the Icell is positive, the cell voltage Vcell is substantially equal to the voltage VC of the energy storage device 3305. If the Icell is negative, the cell voltage Vcell is substantially zero.

Next, an explanation will be given of a method for supplying electric power to the DC transmission cable 3150.

The current ID flowing in the DC transmission cable 3150 is a sum (Iu+Iv+Iw) of Iu, Iv and Iw. When arm voltages Varmu, Varmv and Varmw do not contain a zero-phase component, arm currents Iu, Iv and Iw also do not contain a zero-phase component. When the arm currents Iu, Iv and Iw do not contain the zero-phase component, it becomes that Iu+Iv+Iw=ID=0, and electric power can not be transmitted to the DC transmission cable 3150.

In this case, active power flowed into the power conversion device 3101 from the three-phase AC power system 3100 is stored in the energy storage device (for example, electrolytic capacitor) in each of the unit converters 3120.

In order to supply electric power to the DC transmission cable, the zero-phase component of the arm voltages Varmu, Varmv and Varmw is adjusted and the zero-phase component of the arm currents Iu, Iv and Iw is controlled. According to the Kirchhoff's current law, since it becomes that ID=Iu+Iv+Iw, the current ID can be supplied by adjusting the zero-phase component of the arm currents Iu, Iv and Iw.

Meanwhile, when active power flowing into the power conversion device 3101 from the three-phase AC power system 3100 is equal to the active power transmitted to the DC transmission cable 3150, an amount of energy flowing into/out from each unit chopper cell 3120 during one cycle of three-phase AC power system is substantially zero.

In addition, as the current ID, a direct current, an alternate current, or a current that alternate current is superimposed on direct current may be used.

Below, an explanation will be given of operations in the case that the power conversion device 3101 receives active power from the DC transmission cable 3150 and supplies active power to the three-phase AC power system 3100.

If only phases of Vu, Vv and Vw are slightly advanced in comparison with the phases of aVRS, aVST and aVTR, while matching frequencies and amplitudes of Vu, Vv and Vw with those of aVRS, aVST and aVTR, active power can be supplied to the three-phase power system 3100 from the power conversion device 3101.

Next, an explanation will be given of a method for receiving power from the DC transmission cable 3150.

The current ID flowing out from a DC transmission cable is a sum (Iu+Iv+Iw) of arm currents Iu, Iv and Iw. When the arm voltages Varmu, Varmv and Varmw do not contain a zero-phase component, the arm currents Iu, Iv and Iw also do not contain a zero-phase component. When the arm currents Iu, Iv and Iw do not contain the zero-phase component, it becomes that Iu+Iv+Iw=ID=0, and electric power can not be supplied from the DC transmission cable 3150.

In this case, active power flowing into the three-phase power system 3100 from the power conversion device 3101 is supplied from the energy storage device (for example, electrolytic capacitor) in each unit chopper cell 3120.

In order to have electric power flow into the power conversion device 3101 from the DC transmission cable 3150, the zero-phase component of the arm voltages Vsrmu, Varmv and Varmw is adjusted and the zero-phase component of the arm currents Iu, Iv and Iw is controlled. According to the Kirchhoff's current law, since it becomes that ID=Iu+Iv+Iw, the current ID can be supplied by adjusting the zero-phase component of the arm currents Iu, Iv and Iw.

Meanwhile, if active power flowing into the three-phase power system 3100 from the power conversion device 3101 is equal to the active power flowing into the power conversion device 3101 from the DC transmission cable 3150, an amount of energy flowing into/out from each unit chopper cell 3120 during one cycle of three-phase power system 3100 is substantially zero.

In the specification, a line between a positive DC output terminal 3121 and a negative DC output terminal 3122 of each of the two power conversion devices 3101, which are interconnected with the three-phase AC power systems 3100 and 3170, including the DC transmission cable 3150 is called a DC line.

In addition, in the specification, a line between the transformer 3105 including AC output terminals 3102 to 3104 for respective phases and the three-phase AC power systems 3100, 3170 is called an AC line.

Next, an explanation will be given about that an operation of the power conversion device 3101 is different between short-circuiting of the AC line and the short-circuiting of the DC line.

When the AC line is short-circuited, if the power conversion device 3101 is outputting a voltage to the AC line, a short-circuit current flows. In order to prevent the short-circuit current, as with a general power conversion device, the high-side switching device 3303 and the low-side switching device 3304 which constitute each unit chopper cell 3120 are both turned OFF, and the AC line is prevented from flowing of an overcurrent.

When the DC line is short-circuited, charges stored in an energy storage device 3305 in each unit chopper cell 3120 are discharged to the DC line, and the current ID becomes an overcurrent. In order to prevent the overcurrent, in each unit chopper cell, the high-side switching device 3303 is turned OFF and the low-side switching device 3304 is turned ON. A diode is connected to the high-side switching device 3303 in anti-parallel. Since the diode has a reverse blocking characteristic, a DC voltage of the energy storage device 3305 is electrically insulated from the DC line. Therefore, the overcurrent into the DC transmission cable 3150 can be suppressed.

Next, as described above, since the protection operation of the power conversion device 3101 is different between the short-circuiting of AD line and the short-circuiting of DC line, it is required to distinguish the short-circuiting of AD line from the short-circuiting of DC line.

When the AC line is short-circuited, a current detected by a current censor set in the primary winding side or the secondary winding side of the transformer 3105 increases. Therefore, if the current detected by the current censor set in the primary winding side or the secondary winding side of the transformer 3105 exceeds a predetermined threshold value, it is determined that the AC line is in trouble.

In addition, current censors are set for respective phases of the positive converter group 3112 and the negative converter group 3116, and if a difference between current values detected by the current censor set in the positive converter group 3112 and detected by the current censor set in the negative converter group 3116 exceeds a predetermined threshold value, it may be determined that the AC line is in trouble.

When the DC line is short-circuited, if a current detected by a current censor 3123 set in the DC line exceeds a predetermined threshold value, it is determined that the DC line is in trouble.

In addition, a current censor is set in the a-terminal or the b-terminal of the converter arm of each phase, and if a sum of currents of the three phases flowing in the respective converter arms exceeds a predetermined threshold value, it may be determined that the DC line is in trouble.

If it is determined that the AC line or DC line is in trouble, the power conversion device 3101 is disconnected from the three-phase AC power system 3100 or 3170 in a short time (generally, several tens of milliseconds to several hundreds of milliseconds) by a breaker 3124.

When the DC line is short-circuited, a short-circuit current Ish flows from the three-phase AC power system 3100 or 3170 depending on a leakage impedance of the transformer 3105 during a short time until the power conversion device 3101 is disconnected from the three-phase AC power system 3100 or 3170 by the breaker 3124. If a voltage of the three-phase AC power system 3100 or 3170 is denoted by Vs and the leakage impedance of the transformer 3105 is denoted by Ztr, the short-circuit current Ish is expressed by the following formula.

$$Ish = Vs/Ztr \qquad \text{[Number 4]}$$

When a saturation current of a semiconductor switching device constituting the unit chopper cell 3120 is denoted by Isa, if the leakage impedance Ztr of the transformer 3105 is adjusted so as to satisfy the condition of Isa>Ish, then, the semiconductor switching device can be protected.

In addition, the semiconductor switching device can be protected by disposing a cooling system of the semiconductor switching device so that a junction temperature of the semiconductor switching device does not exceed a predetermined temperature during a time (generally, several tens of milliseconds to several hundreds of milliseconds) until the power conversion device 3101 is disconnected from the three-phase AC power system 3100 or 3170 by the breaker 3124.

Next, an explanation will be given of an example of a cooling feature using FIG. 37.

Figure 37:
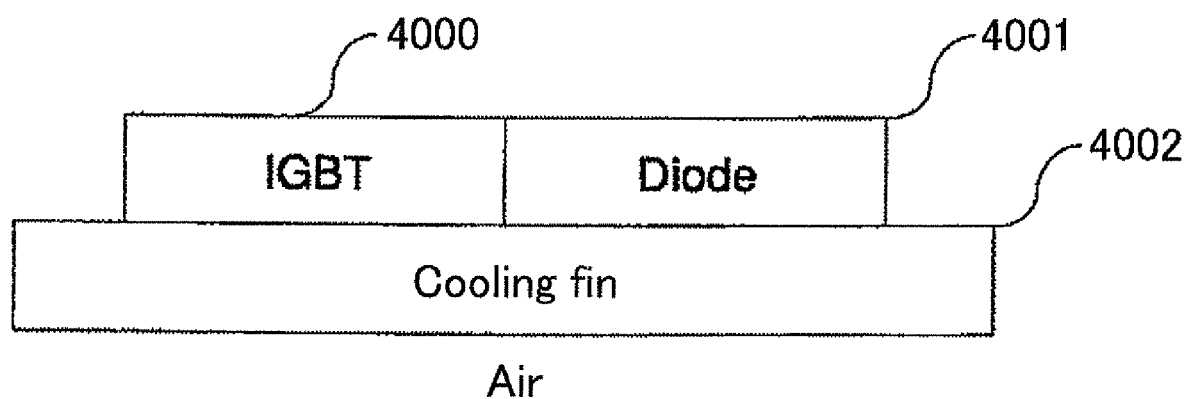
FIG. 37 is an illustration of a cooling feature according to the embodiments of the present invention.

FIG. 37 is an illustration showing one example of the cooling feature of the low-side switching device 3304 constituting the unit chopper cell 3120.

The low-side switching device 3304 consists of IGBT 4000 and Diode 4001, and the IGBT 4000 and the Diode 4001 are fixed to the same cooling fin 4002.

A heat P_IGBT and a heat P_Diode which are generated by the IGBT 4000 and the Diode 4001, respectively, when the short-circuit current Ish flows are discharged into the air from the cooling fin.

Figure 38:
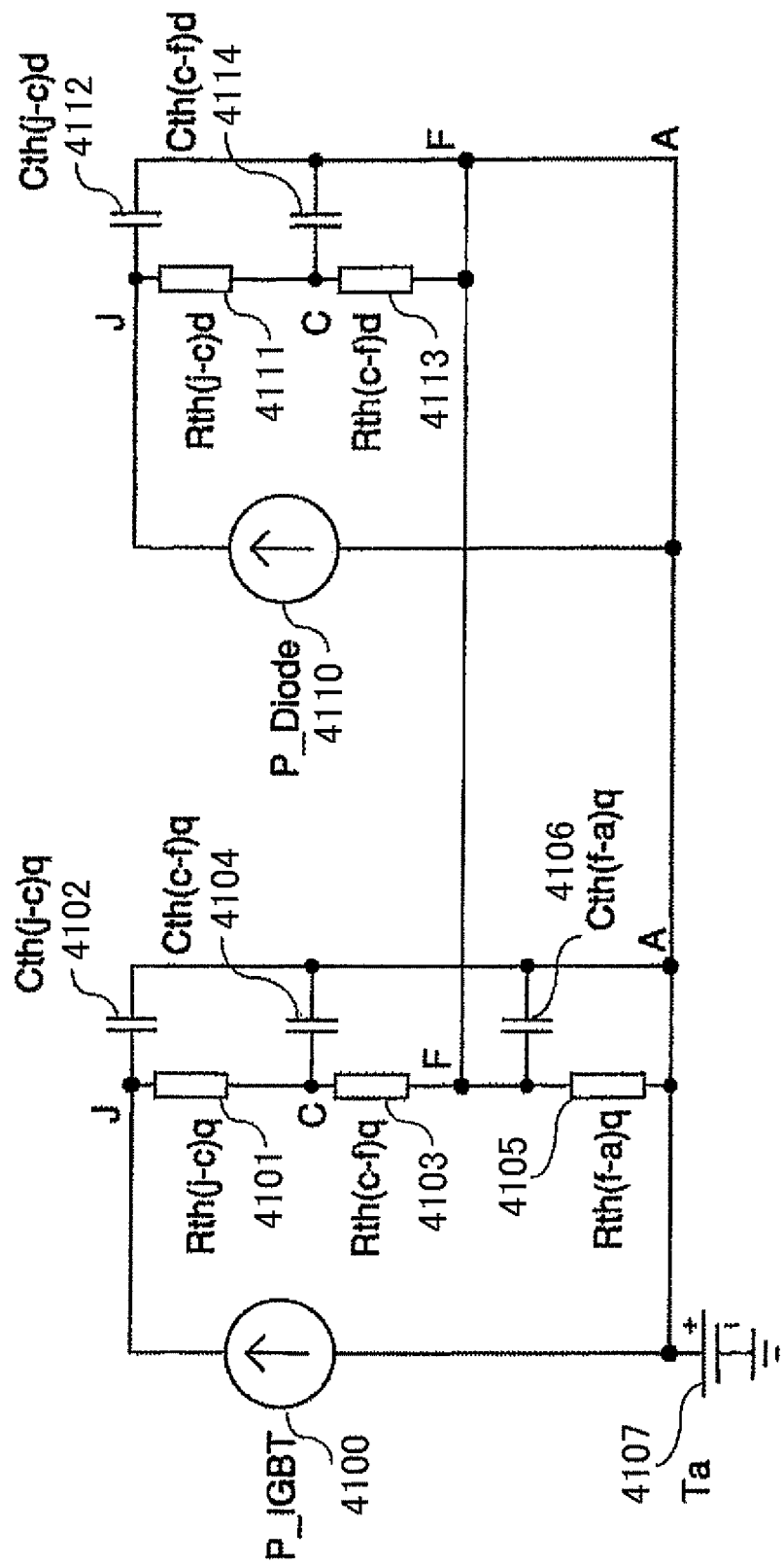
FIG. 38 is an equivalent electric circuit showing a thermal circuit of the cooling feature of the present invention.

FIG. 38 is an illustration that replaces a thermal circuit in the cooling feature of FIG. 37 with an equivalent electric circuit.

The heat P_IGBT generated by the IGBT 4000 and the heat P_Diode generated by the Diode 4001 can be expressed by a current source 4100 and a current source 4110, respectively.

In addition, a heat resistance Rth(j-c)q and heat capacity Cth(j-c)q between the junction and case of the IGBT 4000 can be expressed by a resistor 4101 and a capacitor 4102, respectively.

In addition, a heat resistance Rth(c-f)q and heat capacity Cth(c-f)q between the case of the IGBT 4000 and the cooling fin 4002 can be expressed by a resistor 4103 and a capacitor 4104, respectively.

In addition, a heat resistance Rth(f-a)q and heat capacity Cth(f-a)q between the cooling fin 4002 and the air can be expressed by a resistor 4105 and a capacitor 4106, respectively.

In addition, a heat resistance Rth(j-c) d and heat capacity Cth(j-c)d between the junction of the Diode 4001 and a case of the Diode 4001 can be expressed by a resistor 4111 and a capacitor 4112, respectively.

In addition, a heat resistance Rth(c-f)d and heat capacity Cth(c-f)d between the case of the Diode 4001 and the cooling fin 4002 can be expressed by a resistor 4113 and a capacitor 4114, respectively.

In addition, if a temperature of the air is assumed to be constant, a temperature Ta of the air can be expressed as a DC voltage source 4107.

In addition, voltages of the capacitors 4102 and 4112 on the high voltage side correspond to junction temperatures of the IGBT and the Diode, respectively.

Therefore, by lowering the temperature Ta of the air, the junction temperatures of the IGBT and the Diode when the short-circuit current flows can be lowered below the predetermined value.

In addition, by decreasing the heat resistance Rth(j-c)q between the junction of the IGBT 4000 and the case of the IGBT 4000, or by decreasing the heat resistance Rth(c-f)q between the case of the IGBT 4000 and the cooling fin 4002, or by decreasing the heat resistance Rth(f-a)q between the cooling fin 4002 and the air, the junction temperature of the IGBT when the short-circuit current flows can be lowered below a predetermined value.

In addition, by decreasing the heat resistance Rth(j-c)d between the junction of the Diode 4001 and the case of the Diode 4001, the heat resistance Rth(c-f)d between the case of the Diode 4001 and the cooling fin 4002, and the heat resistance Rth(f-a)q between the cooling fin 4002 and the air, the junction temperature of the Diode when the short-circuit current flows can be lowered below a predetermined value.

In addition, the short-circuit current flows during only a time (generally, several tens of milliseconds to several hundreds of milliseconds) until the power conversion device 3101 is disconnected from the three-phase AC power system 3100 or 3170 by the breaker 3124. Therefore, by increasing the heat capacitance Cth(j-c)q between the junction of the IGBT 4000 and the case of the IGBT 4000, or the heat capacitance Cth(c-f)q between the case of the IGBT 4000 and the cooling fin 4002, or the heat capacitance Cth(f-a)q between the cooling fin 4002 and the air, the junction temperature of the IGBT can be maintained below the predetermined value during the time until the power conversion device 3101 is disconnected from the three-phase AC power system 3100 or 3170.

In addition, by increasing the heat capacitance Cth(j-c)d between the junction of the Diode 4001 and the case of the Diode 4001, or the heat capacitance Cth(c-f)d between the case of the Diode 4001 and the cooling fin 4002, or the heat capacitance Cth(f-a)q between the cooling fin 4002 and the air, the junction temperature of the Diode can be maintained below the predetermined value during the time until the power conversion device 3101 is disconnected from the three-phase AC power system 3100 or 3170.

In addition, in the present embodiment, the primary winding of the transformer is delta-connected. However, the embodiment can also be applied to other connections, such as, star connection.

In addition, in the present embodiment, a midpoint-grounded two-line DC transmission method that connects two power conversion devices in series to respective sides of the DC transmission system and grounds the connection points thereof was adopted. However, the embodiment may also be applied to other DC transmission methods such as, a two-line DC transmission method that connects only one power conversion device to respective sides of the DC transmission system, and a midpoint-grounded three-line DC transmission method that connects two power conversion devices in series to respective sides of the DC transmission system, while grounding the respective connection points and connecting the connection points to each other by a cable.

In addition, in the present embodiment, the explanation has been given using a DC transmission system as an example. However, the embodiment can be applied to a power conversion device, such as, a reactive power compensating device and a motor drive power conversion device that connect one end thereof to a three-phase AC power system and convert AC power into DC power.

<Thirteenth Embodiment>

An explanation will be given of a thirteenth embodiment.

Figure 32:
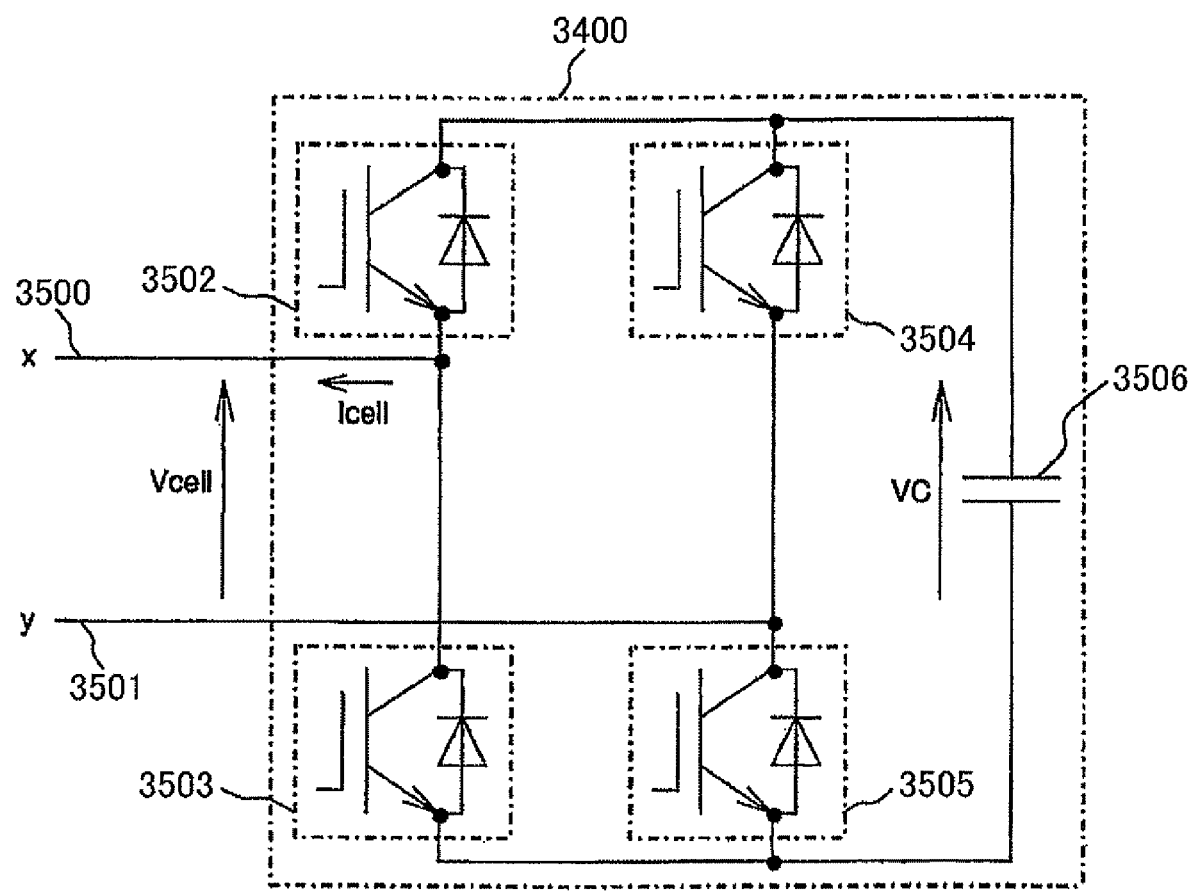
FIG. 32 is a unit full-bridge cell.

The thirteenth embodiment is identical to the twelfth embodiment except that in the twelfth embodiment, a converter arm is configured with a chopper cell, however, in the thirteenth embodiment, the converter arm is configured with a unit full-bridge shown in FIG. 32.

Below, an explanation will be given of only a part of configuration of the thirteenth embodiment different from the twelfth embodiment.

Figure 31:
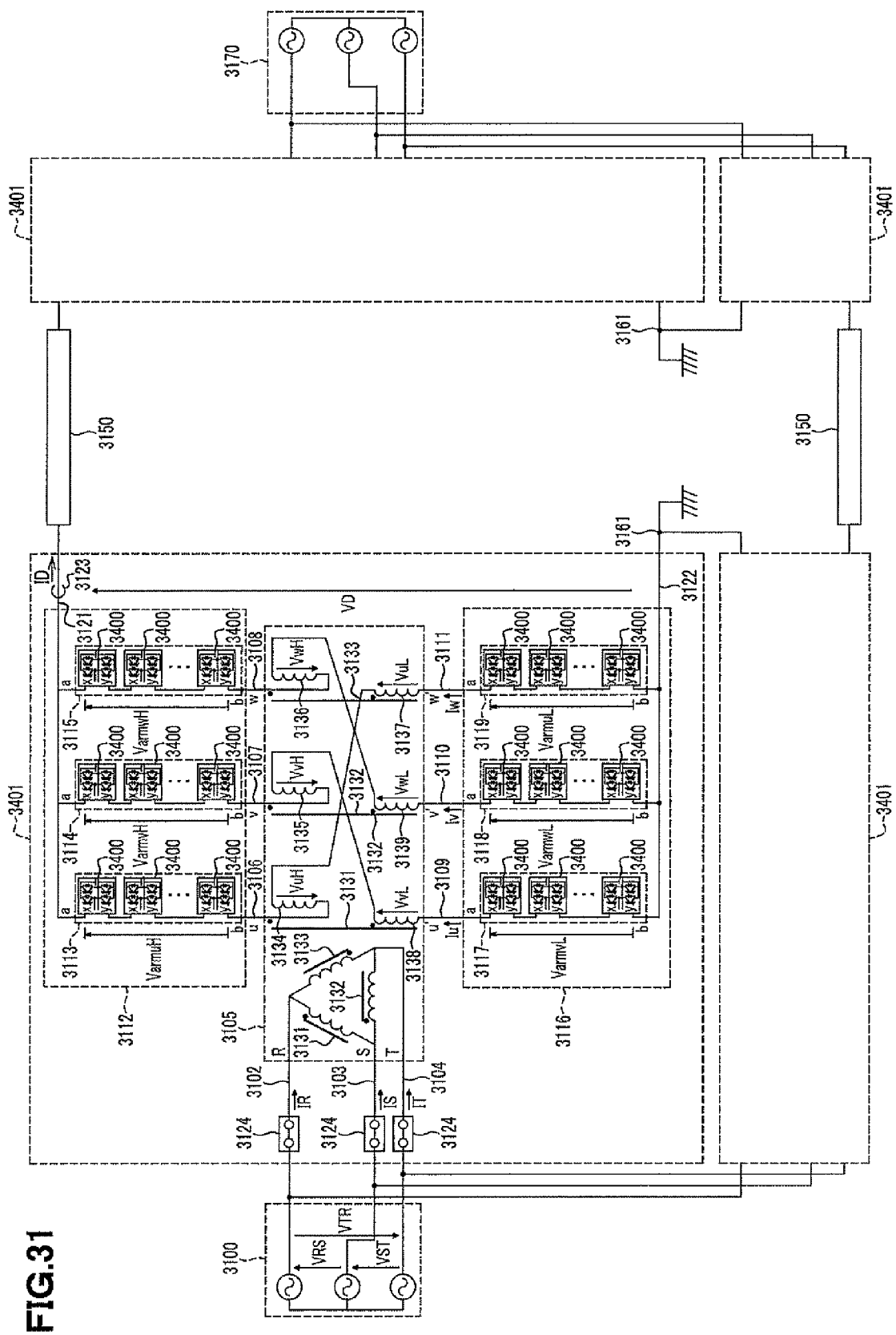
FIG. 31 is a circuit diagram showing a thirteenth embodiment of the present invention.

FIG. 31 is a circuit diagram showing a thirteenth embodiment of the present invention. A power conversion device 3401 is interconnected with the three-phase AC power systems 3100 and 3170 through three-phase AC terminals 3102 to 3104, and transmits and receives active/reactive power to and from the three-phase AC power system 3100. The power conversion device 3401 consists of a transformer 3105, a positive converter group 3112 and a negative converter group 3116.

Next, an explanation will be given of configurations of the positive converter group 3112 and the negative converter group 3116.

The positive converter group 3112 includes a u-phase positive converter arm 3113, a v-phase positive converter arm 3114 and a w-phase positive converter arm 3115. In addition, the negative converter group 3116 includes a u-phase negative converter arm 3117, a v-phase negative converter arm 3118 and a w-phase negative converter arm 3119.

In addition, each of the converter arms 3113 to 3115 and 3117 to 3118 is a circuit which cascade-connects one or a plurality of unit full-bridge cells 3400 shown in FIG. 32.

The unit full-bridge cell 3400 is a two-terminal circuit having an x-terminal 3500 and a y-terminal 3501, and consists of an x-phase high-side switching device 3502, an x-phase low-side switching device 3503, a y-phase high-side switching device 3504, a y-phase low-side switching device 3505 and an energy storage device 3506. The switching devices 3502 to 3505 are semiconductor switching devices represented by IGBT. In addition, the energy storage device 3506 is, for example, a capacitor or a battery. In the embodiment, a voltage of the x-terminal against a standard voltage of the y-terminal is also called a cell voltage Vcell of the unit full-bridge cell.

Next an explanation will be given about that the arm voltage can be controlled by a switching condition of the switching device constituting the unit full-bridge cell 3400.

The x-phase high-side switching device 3502 and the x-phase low-side switching device 3503 are alternately turned ON/OFF. In addition, the y-phase high-side switching device 3504 and the y-phase low-side switching device 3505 are alternately turned ON/OFF.

When the x-phase high-side switching device 3502 is ON, the x-phase low-side switching device 3503 is OFF, the y-phase high-side switching device 3504 is OFF and the y-phase low-side switching device 3505 is ON, the cell voltage Vcell is substantially equal to a voltage VC of the energy storage device 3506 without depending on the current Icell.

When the x-phase high-side switching device 3502 is ON, the x-phase low-side switching device 3503 is OFF, the y-phase high-side switching device 3504 is ON and the y-phase low-side switching device 3505 is OFF, the cell voltage Vcell is substantially zero without depending on the current Icell.

When the x-phase high-side switching device 3502 is OFF, the x-phase low-side switching device 3503 is ON, the y-phase high-side switching device 3504 is OFF and the y-phase low-side switching device 3505 is ON, the cell voltage Vcell is substantially zero without depending on the current Icell.

When the x-phase high-side switching device 3502 is OFF, the x-phase low-side switching device 3503 is ON, the y-phase high-side switching device 3504 is ON and the y-phase low-side switching device 3505 is OFF, the cell voltage Vcell is substantially equal to a reverse voltage of the voltage VC of the energy storage device 3506 without depending on the current Icell.

When the x-phase high-side switching device 3502, the x-phase low-side switching device 3503, the y-phase high-side switching device 3504 and the y-phase low-side switching device 3505 are all OFF, the cell voltage Vcell is determined depending on a polarity of the current Icell. If the Icell is positive, the cell voltage Vcell is substantially equal to the voltage VC of the energy storage device 3506. If the Icell is negative, the cell voltage Vcell is substantially equal to a reverse voltage of the voltage VC of the energy storage device 3506.

Next, an explanation will be given of operations of the power conversion device 3401 when the DC line is short-circuited.

As with the twelfth embodiment, since a protection operation of the power conversion device 3401 for the short-circuiting of AD line is different from the protection operation for the short-circuiting of DC line, it is required to distinguish the short-circuiting of AD line from the short-circuiting of DC line.

When the DC line is short-circuited, charges stored in the energy storage device 3506 in each unit chopper cell 3400 are discharged in the DC line, and the current ID increases. If a current censor 3123 detects the current ID and the current ID exceeds a predetermined threshold value, it is determined that the DC line is in trouble, and the x-phase high-side switching device 3502 as well as the y-phase high-side switching device 3504 of each unit full-bridge cell 3400 are turned OFF and the x-phase low-side switching device 3503 as well as the y-phase low-side switching device 3505 are turned ON, or the x-phase high-side switching device 3502 as well as the y-phase high-side switching device 3504 are turned ON and the x-phase low-side switching device 3503 as well as the y-phase low-side switching device 3505 are turned OFF. A diode is connected in anti-parallel to the x-phase high-side switching device 3502, the y-phase high-side switching device 3504, the x-phase low-side switching device 3503 and the y-phase low-side switching device 3505, respectively and the diode has a reverse blocking characteristic for the current. Therefore, the energy storage device 3506 is electrically insulated from the DC line, thereby, the overcurrent to the DC transmission cable 3150 can be suppressed.

In addition, when a current censor is set in the a-terminal or the b-terminal of converter arm of each phase, and if a sum of currents of the three phases flowing in respective converter arms exceeds a predetermined threshold value, it may be determined that the DC line is in trouble.

In addition, if it is determined that the DC line is in trouble, the power conversion device 3401 is disconnected from the three-phase AC power system 3100 or 3170 in a short time (generally, several tens of milliseconds to several hundreds of milliseconds) by the breaker 3124. A short-circuit current Ish flows from the three-phase AC power system 3100 or 3170 depending on a leakage impedance of the transformer 3105 during a short time until the power conversion device 3401 is disconnected from the three-phase AC power system 3100 or 3170. If a voltage of the three-phase AC power system 3100 or 3170 is denoted by Vs and the leakage impedance of the transformer 3105 is denoted by Ztr, the short-circuit current Ish is expressed by the following formula.

$$Ish = Vs/Ztr \quad \text{[Number 4]}$$

If a saturation current of a semiconductor switching device constituting the unit full-bridge cell 3400 is denoted by Isa, the semiconductor switching device can be protected by adjusting the leakage impedance Ztr of the transformer 3105 so as to satisfy the condition of Isa>Ish.

In addition, as with the twelfth embodiment, the semiconductor switching device can be protected by disposing a cooling system of the semiconductor switching device so that a junction temperature of the semiconductor switching device does not exceed a predetermined temperature during a time (generally, several tens of milliseconds to several hundreds of milliseconds) until the power conversion device 3401 is disconnected from the three-phase AC power system 3100 or 3170 by the breaker 3124.

In addition, if it is determined that the DC line is in trouble, in the power conversion device 3401, since a sum of voltages of the positive conversion group 3112 and the negative conversion group 3116 is made substantially equal to a voltage with reverse phase of that of the three-phase AC power system 3100 or 3170, a voltage of the DC terminal can be made zero. Accordingly, the current ID flowing in the DC output terminal can be reduced.

In addition, in the present embodiment, the primary winding of the transformer is delta-connected. However, the embodiment may also be applied to other wiring connections, such as star connection.

In addition, in the present embodiment, a midpoint-grounded two-line DC transmission method that connects two power conversion devices in series to respective sides of the DC transmission system and grounds the connection points thereof was adopted. However, the embodiment may also be applied to other DC transmission methods such as, a two-line DC transmission method that connects only one power conversion device to respective sides of the DC transmission system, and a midpoint-grounded three-line DC transmission method that connects two power conversion devices in series to respective sides of the DC transmission system, while grounding the respective connection points and connecting the connection points to each other by a cable.

In addition, in the present embodiment, the explanation has been given using a DC transmission system as an example. However, the embodiment can be applied to a power conversion device, such as, a reactive power compensating device and a motor drive power conversion device that connect one end thereof to a three-phase AC power system and convert AC power into DC power.

<Fourteenth Embodiment>

An explanation will be given of a fourteenth embodiment embodying the present invention. The fourteenth embodiment is identical to the twelfth embodiment except that in the twelfth embodiment, a secondary voltage of the transformer is applied within a phase, however, in the fourteenth embodiment, the secondary voltage of the transformer is applied between phases.

Below, an explanation will be given of only a part of configuration of the fourteenth embodiment different from the twelfth embodiment.

Figure 33:
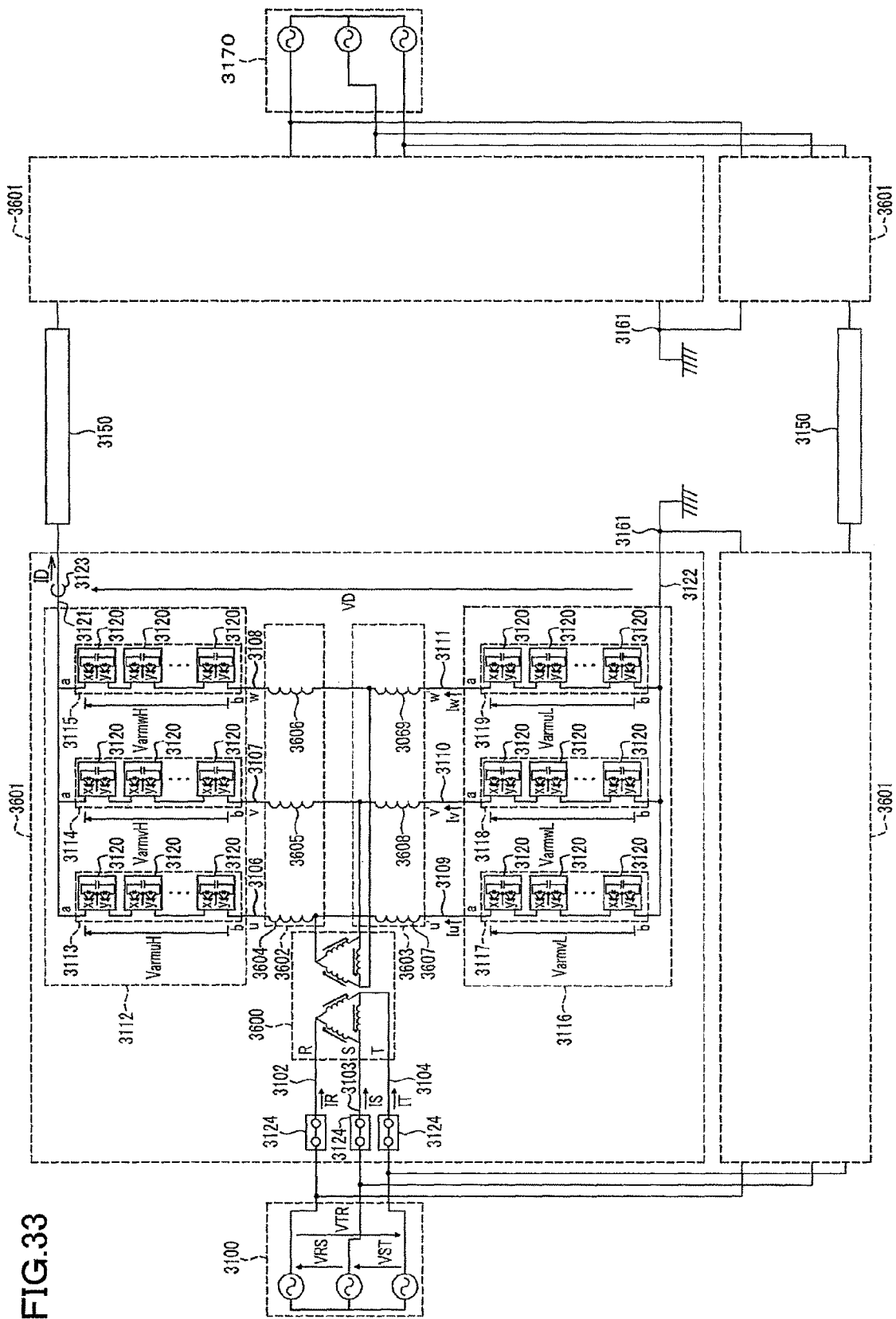
FIG. 33 is a circuit diagram showing a fourteenth embodiment of the present invention.

FIG. 33 is a circuit diagram showing the fourteenth embodiment of the present invention.

AC power from the three-phase AC power systems 3100 and 3170 is converted into DC power by two power conversion devices 3601 interconnected with the three-phase AC power system, and the DC power is transmitted in one direction or bi-directionally through the DC transmission cable 3150.

The power conversion device 3601 consists of a transformer 3600, a positive converter group 3112, a negative converter group 3116, a positive reactor group 3602 and a negative reactor group 3603.

The positive converter group 3112 has a configuration that star-connects a u-phase positive converter arm 3113, a v-phase positive converter arm 3114 and a w-phase positive conversion.

The negative converter group 3116 has a configuration that star-connects a u-phase negative converter arm 3117, a v-phase negative converter arm 3118 and a w-phase negative conversion are 3119.

One terminal of the positive reactor group 3602 is connected in series to the b-terminal of the positive converter group 3112, one terminal of the negative reactor group 3603 is connected in series to the other terminal of the positive reactor group 3602, and the a-terminal of the negative converter group 3116 is connected in series to the other terminal of the negative reactor group 3603.

In the specification, a circuit that connects one terminal of a positive reactor in series to the b-terminal of a positive converter arm, one terminal of the negative reactor is connected in series to the other terminal of the positive reactor, and the a-terminal of the negative converter arm is connected in series to the other terminal of the negative reactor is called a leg.

The a-terminal of the positive converter group 3112 is called a P-terminal, a connection point of the two reactor groups is called an M-terminal and the b-terminal of the negative converter group 3116 is called an N-terminal.

With respect to the two power conversion devices 3601, the P-terminal of one power conversion device 3601 and the N-terminal of the other power conversion device 3601 are connected to the DC transmission cable 3150, respectively, and the N-terminal of the one power conversion device 3601 and the P-terminal of the other power conversion device 3601 are connected to each other and the connection point 3161 is grounded.

An explanation will be given of the positive reactor group 3602 and the negative reactor group 3603 of the power conversion device 3601.

In the positive converter group 3112 and the negative converter group 3116, since the voltage Vcell of the unit chopper cell is limited to multiples of the voltage VC of the energy storage device 3305, instantaneous voltage values of respective legs are different to each other.

In a period when leg voltages of three legs are different to each other, a difference of the leg voltage is absorbed by only the two reactors included in each leg, and if the two rectors do not exist, an overcurrent flows in the legs.

The positive reactor group 3602 and the negative reactor group 3603 have a role to prevent the overcurrent.

Next, an explanation will be given about that an operation of the power conversion device 3601 is different between the short-circuiting of AC line and short-circuiting of DC line.

When AC line is short-circuited, if the power conversion device 3601 is outputting a voltage to the AC line, a short-circuit current flows. Therefore, when the AC line is short-circuited, as with the general power conversion device, the high-side switching device 3303 and the low-side switching device 3304 both constituting each unit chopper cell 3120 are both turned OFF in order to prevent the short-circuit current, and thereby overcurrent in the AC line can be prevented.

When the DC line is short-circuited, charges stored in the energy storage device 3305 in each unit chopper cell 3120 are discharged in the DC line, and the current ID becomes an overcurrent. In order to prevent the overcurrent, in each unit chopper cell 3120, the high-side switching device 3303 is turned OFF and the low-side switching device 3304 is turned ON. A diode is connected to the high-side switching device 3303 in anti-parallel. Since the diode has a reverse blocking characteristic, the energy storage device 3305 is electrically insulated from the DC line, and accordingly, the overcurrent flowing into the DC transmission cable 3150 can be suppressed.

As described above, since a protection operation of the power conversion device 3601 is different between the short-circuiting of AD line and the short-circuiting of DC line, it is required to distinguish the short-circuiting of AD line from the short-circuiting of DC line.

When the AC line is short-circuited, a detected current value detected by a current censor set in the primary winding side or the secondary winding side of the transformer 3600 increases. Therefore, if the current detected by the current censor set in the primary winding side or the secondary winding side of the transformer 3600 exceeds a predetermined threshold value, it is determined that the AC line is in trouble.

In addition, current censors are set in the positive converter group 3112 and the negative converter group 3116 for respective phases, and if a difference between current values detected by the current censor set in the positive converter group 3112 and the negative converter group 3116 exceeds a predetermined threshold value, it may be determined that the AC line is in trouble.

On the other hand, when the DC line is short-circuited, if a current detected by the current censor 3123 set in the DC line exceeds a predetermined threshold value, it is determined that the DC line is in trouble.

In addition, a current censor is set in the a-terminal or the b-terminal of converter arm of each phase, and if a sum of currents of the three phases flowing in respective converter arms exceeds a predetermined threshold value, it may be determined that the DC line is in trouble.

If it is determined that the AC line or DC line is in trouble, the power conversion device 3601 is disconnected from the three-phase AC power system 3100 or 3170 in a short time (generally, several tens of milliseconds to several hundreds of milliseconds) by the breaker 3124.

Meanwhile, the present embodiment can also be applied to a power conversion device interconnected with a single-phase or a multiphase system by increasing or decreasing the number of converter arms, in addition to the three-phase AC power system.

In addition, in the embodiment, the primary winding and the secondary winding of the transformer are both delta-connected. However, the present invention is not limited to the delta connection with respect to a winding feature of the transformer.

In addition, in the present embodiment, a midpoint-grounded two-line DC transmission method that connects two power conversion devices in series to respective sides of the DC transmission system and grounds the connection points thereof was adopted. However, the embodiment may also be applied to other DC transmission methods such as, a two-line DC transmission method that connects only one power conversion device to respective sides of the DC transmission system, and a midpoint-grounded three-line DC transmission method that connects two power conversion devices in series to respective sides of the DC transmission system, while grounding the respective connection points and connecting the connection points to each other by a cable.

In addition, in the present embodiment, the explanation has been given using a DC transmission system as an example. However, the embodiment can be applied to a power conversion device, such as, a reactive power compensating device and a motor drive power conversion device that connect one end thereof to a three-phase AC power system and convert AC power into DC power.

<Fifteenth Embodiment>

An explanation will be given of a fifteenth embodiment embodying the present invention. The fifteenth embodiment is a modification of the fourteenth embodiment. The fifteenth embodiment is identical to the fourteenth embodiment except that, in the fourteenth embodiment, the positive converter group and the negative converter group are configured with chopper cells, however, in the fifteenth embodiment, the converter groups are configured with unit full-bridge cells.

Below, an explanation will be given of only a part of configuration of the fifteenth embodiment different from the fourteenth embodiment.

Figure 34:
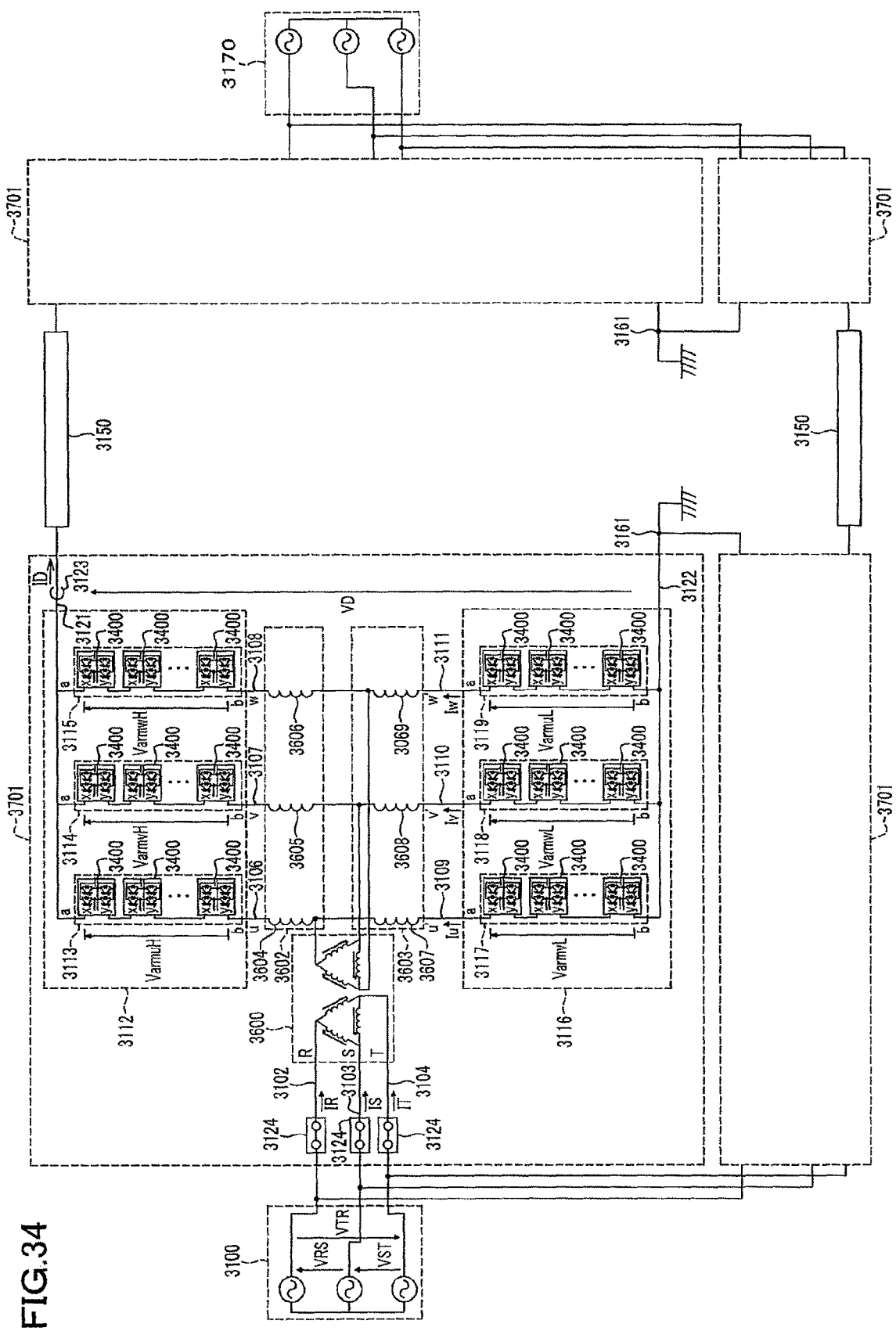
FIG. 34 is a circuit diagram showing a fifteenth embodiment of the present invention.
Figure 35:
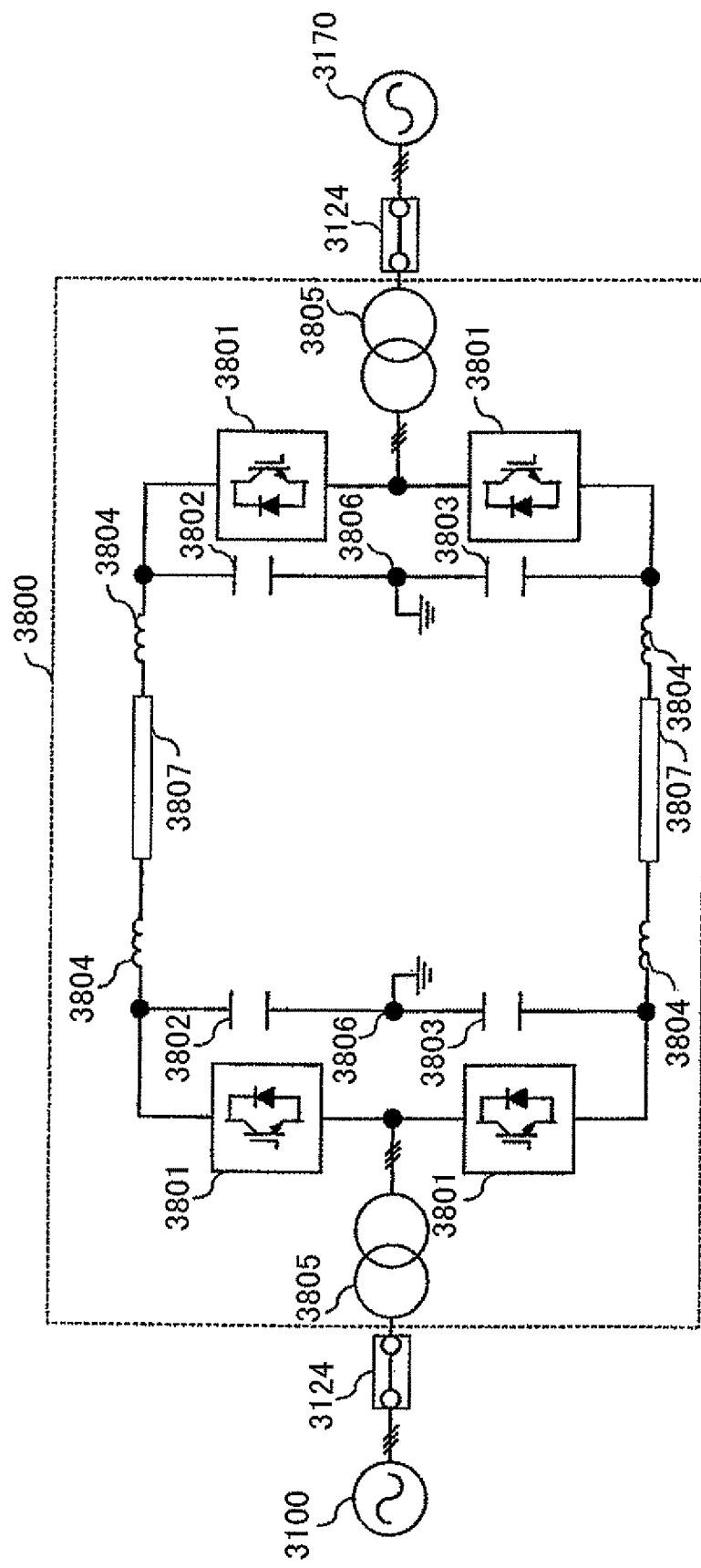
FIG. 35 is an illustration of a DC transmission system shown in a non-patent document 16.
Figure 36:
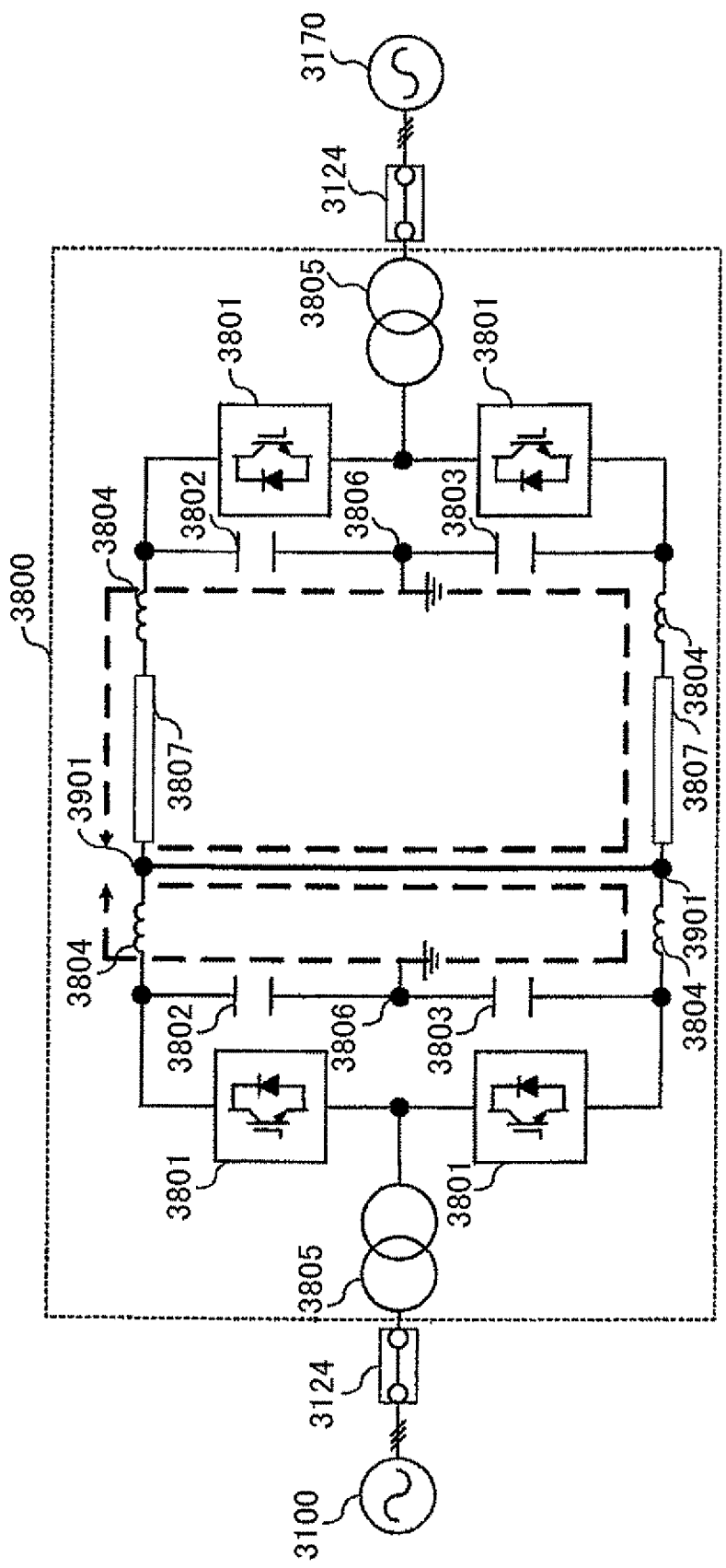
FIG. 36 is a circuit diagram of the DC transmission system shown in the non-patent document 16 when the DC transmission system is grounded.

FIG. 34 is a circuit diagram showing a fifteenth embodiment of the present invention. A power conversion device 3701 is interconnected with the three-phase AC power system 3100 or 3170 through three-phase AC terminals 3102 to 3104, and transmits and receives active/reactive power to and from the three-phase AC power system 3100 or 3170. The power conversion device 3701 consists of the transformer 3600, the positive converter group 3112 and the negative converter group 3116.

Next, an explanation will be given of configurations of the positive converter group 3112 and the negative converter group 3116.

The positive converter group 3112 includes a u-phase positive converter arm 3113, a v-phase positive converter arm 3114 and a w-phase positive converter arm 3115. In addition, the negative converter group 3116 includes a u-phase negative converter arm 3117, a v-phase negative converter arm 3118 and a w-phase negative converter arm 3119.

In addition, each of the converter arms 3113 to 3115 and 3117 to 3119 includes an a-terminal and a b-terminal.

In the specification, a voltage of the a-terminal against a standard voltage of the b-terminal is called an arm voltage. In addition, each of the converter arms 3113 to 3115 and 3117 to 3119 is a circuit which cascade-connects one or a plurality of unit full-bridge cells 3400 shown in FIG. 32.

Next, an explanation will be given about that an operation of the power conversion device 3701 is different between a short-circuiting of AC line and a short-circuiting of DC line.

When AC line is short-circuited, if the power conversion device 3701 is outputting a voltage to the AC line, a short-circuit current flows. Therefore, when the AC line is short-circuited, as with the general power conversion device, an x-phase high-side switching device 3502, a y-phase high-side switching device 3504, an x-phase low-side switching device 3503 and a y-phase low-side switching device 3505, each constituting respective unit full-bridge cells 3400, are all turned OFF in order to prevent the short-circuit current, and as a result, an overcurrent in the AC line can be prevented.

When the DC line is short-circuited, charges stored in the energy storage device 3506 in each full-bridge cell 3400 are discharged in the DC line, and the current ID increases. If the current ID is detected by a current censor 3123 set in the DC line and the current ID exceeds a predetermined threshold value, it is determined that the DC line is in trouble, and the x-phase high-side switching device 3502 as well as the y-phase high-side switching device 3504 of each unit full-bridge cell 3400 are turned OFF and the x-phase low-side switching device 3503 as well as the y-phase low-side switching device 3505 of each unit full-bridge cell 3400 are turned ON, or the x-phase high-side switching device 3502 as well as the y-phase high-side switching device 3504 are turned ON and the x-phase low-side switching device 3503 as well as the y-phase low-side switching device 3505 are turned OFF. A diode is connected to each of the x-phase high-side switching device 3502, the y-phase high-side switching device 3504, the x-phase low-side switching device 3503 and the y-phase low-side switching device 3505 in anti-parallel. Since the diode has a reverse blocking characteristic, a DC voltage of the energy storage device 3506 is electrically insulated from the DC line, and as a result, the overcurrent flowing into the DC transmission cable 3150 can be suppressed.

As described above, since the protection operation of the power conversion device 3701 is different between the short-circuiting of AD line and the short-circuiting of DC line, it is required to distinguish the short-circuiting of AD line from the short-circuiting of DC line.

When the AC line is short-circuited, a detected current value detected by a current censor set in the primary winding side or the secondary winding side of the transformer 3600 increases. Therefore, if the current detected by the current censor set in the primary winding side or the secondary winding side of the transformer 3600 exceeds a predetermined threshold value, it is determined that the AC line is in trouble.

In addition, current censors are set in the positive converter group 3112 and the negative converter group 3116 for respective phases, and if a difference between current values detected by the current censor set in the positive converter group 3112 and the negative converter group 3116 exceeds a predetermined threshold value, it may be determined that the AC line is in trouble.

On the other hand, when the DC line is short-circuited, if a current detected by the current censor 3123 set in the DC line exceeds a predetermined threshold value, it is determined that the DC line is in trouble.

In addition, a current censor is set in the a-terminal or the b-terminal of converter arm of each phase, and if a sum of currents of three phases flowing in respective converter arms exceeds a predetermined threshold value, it may be determined that the DC line is in trouble.

In addition, when it is determined that the DC line is in trouble, the power conversion device 3701 outputs a voltage having a reverse phase of the voltage of the three-phase AC power system 3100 or 3170 in order to make the DC terminal voltage be zero. Then, the current ID flowing in the DC output terminal can be reduced.

When it is determined that the AC line or DC line is in trouble, the power conversion device 3701 is disconnected from the three-phase AC power system 3100 or 3170 in a short time (generally, several tens of milliseconds to several hundreds of milliseconds) by the breaker 3124.

Meanwhile, the present embodiment can also be applied to a power conversion device interconnected with a single-phase or a multiphase system by increasing or decreasing the number of converter arms, in addition to the three-phase AC power system.

In addition, in the embodiment, the primary winding and the secondary winding of the transformer are both delta-connected. However, the present invention is not limited to the delta connection with respect to a winding feature of a transformer.

In addition, in the present embodiment, a midpoint-grounded two-line DC transmission method that connects two power conversion devices in series to respective sides of the DC transmission system and grounds the connection points thereof was adopted. However, the embodiment may also be applied to other DC transmission methods such as, a two-line DC transmission method that connects only one power conversion device to respective sides of the DC transmission system, and a midpoint-grounded three-line DC transmission method that connects two power conversion devices in series to respective sides of the DC transmission system, while grounding the respective connection points and connecting the connection points to each other by a cable.

In addition, in the present embodiment, the explanation has been given using a DC transmission system as an example. However, the embodiment can be applied to a power conversion device, such as, a reactive power compensating device and a motor drive power conversion device that connect one end thereof to a three-phase AC power system and convert AC power into DC power.

POTENTIAL FOR INDUSTRIAL APPLICATION

The power conversion device of the present invention is applicable to, for example, a reactive power compensation device (STATCOM), a Back-to-Back system (for example, frequency conversion device), a DC transmission system (HVDC) and a motor drive.

In addition, other than the DC transmission system (HVDC) that transmits electric power by converting AC power into DC power once, the present invention is applicable to a power conversion device, for example, a reactive power compensation device and a motor drive power conversion device that connect one end thereof to a three-phase AC power system and convert AC power to DC power.

EXPLANATION FOR REFERENCE NUMBER 100, 500, 1600, 1601 Three-phase power system
101, 600, 800, 1000, 1200, 1700, 1900, 2100, 2300, 2500, 2700 Power conversion device
102 R-phase terminal
103 S-phase terminal
104 T-phase terminal
105, 601, 801, 1001, 1201, 1701, 1901, 2101, 2301, 2501 Transformer
106, 1202 u-phase positive terminal
107, 1203 v-phase positive terminal
108, 1204 w-phase positive terminal
109, 1205 u-phase negative terminal
110, 1207 w-phase negative terminal
111, 1206 v-phase negative terminal
112 Positive converter group
113 u-phase positive converter arm
114 v-phase positive converter arm
115 w-phase positive converter arm
116, 2701 Negative converter group
117 u-phase negative converter arm
118 v-phase negative converter arm
119 w-phase negative converter arm
120 Unit converter
121 Positive output terminal
122, 402 Negative output terminal
200 Primary winding
201, 700, 900, 1300, 2000, 2400 Secondary winding
202, 203, 204 Iron core
205 Winding between R-phase and S-phase
206 Winding between S-phase and T-phase
207 Winding between T-phase and R-phase 208, 901, 2401 u-phase winding
209, 902, 2402 v-phase winding
210, 903, 2403 w-phase winding
300 x-terminal
301 y-terminal
302 x-phase high-side switching device
303 x-phase low-side switching device
304 y-phase high-side switching device
305 y-phase low-side switching device
306, 405 DC capacitor
400 Bidirectional unit chopper converter
401 x-phase output terminal
403 High-side switching device
404 Low-side switching device
501 Electric power substation
502 Electric power substation busbar
503 Load
802, 1902, 2302 u-phase terminal
803, 1903, 2303 v-phase terminal
804, 1904, 2304 w-phase terminal
805, 1905 Neutral point terminal
1301 u-phase positive winding
1302 v-phase positive winding
1303 w-phase positive winding
1304 u-phase negative winding
1305 v-phase negative winding
1306 w-phase negative winding
1602 Submarine cable
2404 Compensating winding
2405 u-phase compensating winding
2406 v-phase compensating winding
2407 w-phase compensating winding
3100, 3170 Three-phase AC power system
3101, 3401, 3601, 3701 Power conversion device
3102 R-phase terminal
3103 S-phase terminal
3104 T-phase terminal
3105, 3600, 3805 Transformer
3106 u-phase positive terminal
3107 v-phase positive terminal
3108 w-phase positive terminal
3109 u-phase negative terminal
3110 v-phase negative terminal
3111 w-phase negative terminal
3112 Positive converter group
3113 u-phase positive converter arm
3114 v-phase positive converter arm
3115 w-phase positive converter arm
3116 Negative converter group
3117 u-phase negative converter arm
3118 v-phase negative converter arm
3119 w-phase negative converter arm
3120 Unit chopper cell
3121 Positive DC output terminal
3122 Negative DC output terminal
3123 Current censor
3124 Breaker
3134 u-phase positive winding
3135 v-phase positive winding
3136 w-phase positive winding
3137 u-phase negative winding
3138 v-phase negative winding
3139 w-phase negative winding
3150, 3807 DC transmission cable
3161, 3806 Neutral point
3200 Secondary winding
3201 Primary winding
3202, 3203, 3204 Iron core
3301 x-terminal
3302 y-terminal
3303 High-side switching device
3304 Low-side switching device
3305, 3506 Energy storage device
3400 Unit full-bridge device
3500 x-phase output terminal
3501 y-phase output terminal
3502 x-phase high-side switching device
3503 x-phase low-side switching device
3504 y-phase high-side switching device
3505 y-phase low-side switching device
3602 Positive reactor group
3603 Negative reactor group
3604 Positive u-phase reactor
3605 Positive v-phase reactor
3606 Positive w-phase reactor
3607 Negative u-phase reactor
3608 Negative v-phase reactor
3609 Negative w-phase reactor
3800 DC transmission system
3801 Three-phase full-bridge power conversion device
3802, 3803 Capacitor
3804 DC reactor
3901 Connection point
4000 IGBT
4001 Diode
4002 Cooling fin
4100 IGBT heat generation simulated current source
4101 IGBT heat resistance between junction and case
4102 IGBT heat capacity between junction and case
4103 IGBT heat resistance between case and cooling fin
4104 IGBT heat capacity between case and cooling fin
4105 IGBT heat resistance between cooling fin and the air
4106 IGBT heat capacity between cooling fin and the air
4107 Air temperature simulated voltage source
4110 Diode heat generation simulated current source
4111 Diode heat resistance between junction and case
4112 Diode heat capacity between junction and case
4113 Diode heat resistance between case and cooling fin
4114 Diode heat capacity between case and cooling fins.

What is claimed is:

1. A power conversion device comprising at least three series circuits in parallel with each other, each comprised of a voltage source and a controlled current source, connected in series,
wherein the at least three series circuits of the voltage source and the controlled current source are connected in parallel, and parallel connection points of the series circuits connected in parallel form output terminals, and wherein:
in each of the at least three series circuits, the voltage source includes a secondary winding of a transformer, the secondary winding including a first winding and a second winding;
the transformer includes a primary winding which is connected to an alternating current power system;
the controlled current source is comprised of a plurality of unit converters cascade-connected to one another; and
the secondary winding is wound on an iron core of the transformer so as to have a first magnetomotive force cancel a second magnetomotive force to suppress a direct current bias magnetism of the iron core, the first magnetomotive force being generated by a direct current component of a current flowing through the first winding, and the second magnetomotive force being generated by a direct current component of a current flowing through the second winding.

2. The power conversion device according to claim 1, wherein the voltage sources each contain only a differential mode (or normal phase/reverse phase) component, and the controlled current sources each transmit and receive electric power to and from the corresponding voltage source by controlling the differential mode (or normal phase/reverse phase) component and transmit and receive electric power to and from a load device connected to the output terminals or a power source by controlling a common mode (or zero-phase) component.

3. A power conversion device comprising at least three series circuits in parallel with each other, each comprised of a voltage source and a controlled current source, connected in series, wherein the at least three series circuits of the voltage source and the controlled current source are connected in parallel, and parallel connection points of the series circuits connected in parallel form output terminals, and further configured by connecting a circuit that star-connects three of said controlled current sources to respective phases of a three-phase voltage source from which a neutral point of the three-phase voltage source is drawn out, wherein a neutral point of the three controlled current sources and the neutral point of the three-phase voltage source form output terminals, and wherein:

in each of the at least three series circuits, the voltage source includes a secondary winding of a transformer, the secondary winding including a first winding and a second winding;

the transformer includes a primary winding which is connected to an alternating current power system;

the controlled current source is comprised of a plurality of unit converters cascade-connected to one another; and the secondary winding is wound on an iron core of the transformer so as to have a first magnetomotive force cancel a second magnetomotive force to suppress a direct current bias magnetism of the iron core, the first magnetomotive force being generated by a direct current component of a current flowing through the first winding, and the second magnetomotive force being generated by a direct current component of a current flowing through the second winding.

4. A power conversion device comprising a single-phase or multiphase transformer and a plurality of converter arms, wherein in the power conversion device, the transformer includes a plurality of secondary windings;

each phase of a primary winding of the single-phase or multiphase transformer forms an input terminal;

neutral points are drawn out from the secondary windings of the single-phase or multiphase transformer;

at least three series circuits, each comprised of one of the secondary windings of the transformer and one of the converter arms are connected in parallel; and a parallel connection point of the series circuits and the neutral point of the secondary windings form output terminals, and further wherein:

in each of the at least three series circuits, the secondary winding of the transformer comprises a voltage source, and the secondary winding includes a first winding and a second winding;

the primary winding of the transformer are each connected to an alternating current power system;

the converter arms each include a controlled current source comprised of a plurality of unit converters cascade-connected to one another; and the secondary windings are each wound on an iron core of the transformer so as to have a first magnetomotive force cancel a second magnetomotive force to suppress a direct current bias magnetism of the iron core, the first magnetomotive force being generated by a direct current component of a current flowing through the first winding, the second magnetomotive force being generated by a direct current component of a current flowing through the second winding.

5. The power conversion device according to claim 4, wherein each of the converter arms transmits and receives an electric power to and from a single-phase or multiphase power system connected to the primary winding of the transformer by controlling a differential mode (normal phase/reverse phase) current, and transmits and receives an electric power to and from a load device connected to the output terminal or a power source by controlling a common mode (zero-phase) component.

6. The power conversion device according to claim 4, wherein the transformer comprises a winding structure or a method that makes a magnetomotive force caused by a common mode (zero-phase) current flowing in the secondary winding be substantially zero.

7. A power conversion device comprising at least three series circuits in parallel with each other, each comprised of a voltage source and a controlled current source, connected in series, wherein the at least three series circuits of the voltage source and the controlled current source are connected in parallel, and parallel connection points of the series circuits connected in parallel form output terminals, and further configured by connecting a three-phase transformer, where a neutral point is drawn out from a secondary winding of the three-phase transformer, and a circuit that star-connects three converter arms to respective phases of the secondary winding, wherein each phase of a primary winding of the three-phase transformer forms an input terminal, and a neutral point of the three converter arms and the neutral point of the secondary winding form output terminals, and further wherein:

in each of the at least three series circuits, the voltage source comprises the secondary winding of the transformer, and the secondary winding includes a first winding and a second winding;

the primary winding of the transformer are each connected to an alternating current power system;

the converter arms each include the controlled current source comprised of a plurality of unit converters cascade-connected to one another; and the secondary windings are each wound on an iron core of the transformer so as to have a first magnetomotive force cancel a second magnetomotive force to suppress a direct current bias magnetism of the iron core, the first magnetomotive force being generated by a direct current component of a current flowing through the first winding, the second magnetomotive force being generated by a direct current component of a current flowing through the second winding.

8. A power conversion device comprising at least three series circuits in parallel with each other, each comprised of a voltage source and a controlled current source, connected in series, wherein the at least three series circuits of the voltage source and the controlled current source are connected in parallel, and parallel connection points of the series circuits connected in parallel form output terminals, and further interconnected with a three-phase power system through a transformer, wherein a primary winding of the transformer is connected to the three-phase power system;

a neutral point of secondary windings of the transformer is drawn out, forming a neutral terminal;

a circuit that star-connects three converter arms is connected to respective phases of the secondary windings other than the neutral point; and a neutral point of the three converter arms and the neutral point of the secondary windings form output terminals of the power conversion device, and further wherein:

in each of the at least three series circuits, the voltage source comprises the secondary winding of the transformer, and the secondary winding includes a first winding and a second winding;

the primary windings of the transformer are each connected to the three-phase power system;

the converter arms each include the controlled current source comprised of a plurality of unit converters cascade-connected to one another; and the secondary windings are each wound on an iron core of the transformer so as to have a first magnetomotive force cancel a second magnetomotive force to suppress a direct current bias magnetism of the iron core, the first magnetomotive force being generated by a direct current component of a current flowing through the first winding, the second magnetomotive force being generated by a direct current component of a current flowing through the second winding.

9. A power conversion device comprising a plurality of series circuits each comprised of a voltage source and a controlled current source, wherein at least two of said series circuits of the voltage source and the controlled current source are connected in parallel to one another, and parallel connection points of the series circuits connected in parallel form output terminals, wherein the at least three series circuits of the voltage source and the controlled current source are connected in parallel, and parallel connection points of the series circuits connected in parallel form output terminals, and further, wherein the voltage sources each contain only a differential mode (or normal phase/reverse phase) component, and the controlled current sources each transmit and receive electric power to and from the corresponding voltage source by controlling the differential mode (or normal phase/reverse phase) component and transmit and receive electric power to and from a load device connected to the output terminals or a power source by controlling a common mode (or zero-phase) component.

10. A power conversion device comprising a single-phase or multiphase transformer and a converter arm, wherein in the power conversion device, each phase of a primary winding of the single-phase or multiphase transformer forms an input terminal;

a neutral point is drawn out from a secondary winding of the single-phase or multiphase transformer;

series circuits of the secondary winding of the transformer and the converter arm are connected in parallel; and a parallel connection point of the series circuits and the neutral point of the secondary winding form output terminals;

wherein the converter arm transmits and receives an electric power to and from a single-phase or multiphase power system connected to the primary winding of the transformer by controlling a differential mode (normal phase/reverse phase) current, and transmits and receives an electric power to and from a load device connected to the output terminal or a power source by controlling a common mode (zero-phase) component.

11. A power conversion device comprising a single-phase or multiphase transformer and a converter arm, wherein in the power conversion device, each phase of a primary winding of the single-phase or multiphase transformer forms an input terminal;

a neutral point is drawn out from a secondary winding of the single-phase or multiphase transformer;

series circuits of the secondary winding of the transformer and the converter arm are connected in parallel; and a parallel connection point of the series circuits and the neutral point of the secondary winding form output terminals;

wherein the transformer comprises a winding structure or a method that makes a magnetomotive force caused by a common mode (zero-phase) current flowing in the secondary winding be substantially zero.

* * * * *